(12) United States Patent
Tuken et al.

(10) Patent No.: US 6,990,855 B2
(45) Date of Patent: *Jan. 31, 2006

(54) SYSTEM FOR ESTIMATING A QUANTITY OF PARASITIC LEAKAGE FROM A FUEL INJECTION SYSTEM

(75) Inventors: Taner Tuken, Cedar Falls, IA (US); Donald J. Benson, Columbus, IN (US); John T. Carroll, III, Columbus, IN (US); Yul J. Tarr, Columbus, IN (US); David M. Carey, Lino Lakes, MN (US)

(73) Assignee: Cummins, Inc., Columbus, IN (US)

( * ) Notice: Subject to any disclaimer, the term of this patent is extended or adjusted under 35 U.S.C. 154(b) by 4 days.

This patent is subject to a terminal disclaimer.

(21) Appl. No.: 10/721,662

(22) Filed: Nov. 25, 2003

(65) Prior Publication Data
US 2004/0134268 A1    Jul. 15, 2004

Related U.S. Application Data

(63) Continuation-in-part of application No. 10/417,829, filed on Apr. 17, 2003, now Pat. No. 6,823,834, which is a continuation-in-part of application No. 09/565,010, filed on May 4, 2000, now Pat. No. 6,557,530.

(51) Int. Cl.
*G01M 15/00*    (2006.01)

(52) U.S. Cl. .................... 73/118.1; 73/49.7; 73/119 A
(58) Field of Classification Search .................. 73/116, 73/117.2, 117.3, 118.1, 119 A, 119 R, 40, 73/46, 47, 49.7
See application file for complete search history.

(56) References Cited

U.S. PATENT DOCUMENTS

| | | | |
|---|---|---|---|
| 5,773,716 A * | 6/1998 | Antonioli et al. ......... 73/119 A |
| 6,557,530 B1 * | 5/2003 | Benson et al. ............. 123/480 |
| 6,823,834 B2 * | 11/2004 | Benson et al. ............. 123/299 |

* cited by examiner

*Primary Examiner*—Eric S. McCall
(74) *Attorney, Agent, or Firm*—Barnes & Thornburg LLP

(57) ABSTRACT

A system for estimating a quantity of parasitic leakage of a fluid from a fluid collection unit includes a pressure sensor and a control circuit. The pressure sensor is coupled to the fluid collection unit and configured to produce a pressure value indicative of the pressure of the fluid collection unit. The control circuit is operable to determine a change in pressure value of the fluid collection unit and estimate the quantity of parasitic leakage based on the change in pressure value. The control circuit may also be operable to determine a bulk modulus value of the fluid and estimate the quantity of parasitic leakage based on the change in pressure value and the bulk modulus value.

61 Claims, 33 Drawing Sheets

308

IF PE > PE THRESHOLD1 ; PE STATE = HIGH

IF PE < PE THRESHOLD2 ; PE STATE = LOW

IF PE THRESHOLD2 ≤ PE ≤ PE THRESHOLD1 ;
PE STATE = NORMAL

| CYL # | PE STATE | FE STATE | SE STATE | FAULT |
|---|---|---|---|---|
| 1 | LOW | HIGH | HIGH | OVERFUELING |
| 2 | NORMAL | NORMAL | NORMAL | CYL #1 |
| 3 | NORMAL | NORMAL | NORMAL | |
| ⋮ | ⋮ | ⋮ | ⋮ | ⋮ |
| 1 | NORMAL/LOW | HIGH | NORMAL | CONTINUOUSLY |
| 2 | NORMAL/LOW | HIGH | NORMAL | OVERFUELING |
| 3 | NORMAL/LOW | HIGH | HIGH | CYL # 3 |
| ⋮ | ⋮ | ⋮ | ⋮ | ⋮ |

FIG. 22

| | FUEL TEMPERATURE VALUE 1 | FUEL TEMPERATURE VALUE 2 | ... | FUEL TEMPERATURE VALUE n |
|---|---|---|---|---|
| FUEL PRESSURE VALUE 1 | $\beta_{11}$ | $\beta_{12}$ | | $\beta_{1n}$ |
| FUEL PRESSURE VALUE 2 | $\beta_{21}$ | $\beta_{22}$ | | $\beta_{2n}$ |
| FUEL PRESSURE VALUE 3 | $\beta_{31}$ | $\beta_{32}$ | | $\beta_{3n}$ |
| FUEL PRESSURE VALUE 4 | $\beta_{41}$ | $\beta_{42}$ | | $\beta_{4n}$ |
| FUEL PRESSURE VALUE 5 | $\beta_{51}$ | $\beta_{52}$ | | $\beta_{5n}$ |
| ... | ... | ... | ... | ... |
| FUEL PRESSURE VALUE m | $\beta_{m1}$ | $\beta_{m2}$ | | $\beta_{mn}$ |

FIG 34

SYSTEM FOR ESTIMATING A QUANTITY OF PARASITIC LEAKAGE FROM A FUEL INJECTION SYSTEM

CROSS-REFERENCE TO RELATED U.S. PATENT APPLICATION

This is a continuation-in-part of U.S. patent application Ser. No. 10/417,829, filed Apr. 17, 2003 now U.S. Pat. No. 6,823,834, and entitled SYSTEM FOR ESTIMATING AUXILIARY-INJECTED FUELING QUANTITIES which is a continuation-in-part of U.S. patent application Ser. No. 09/565,010, filed on May 4, 2000, now U.S. Pat. No. 6,557,530, and entitled FUEL CONTROL SYSTEM INCLUDING ADAPTIVE INJECTED FUEL QUANTITY ESTIMATION.

FIELD OF THE DISCLOSURE

The present invention relates generally to fuel injection systems for internal combustion engines, and more specifically to techniques for estimating pilot and/or post-injected fuel-quantities and minimizing variations between such fuel quantities.

BACKGROUND OF THE DISCLOSURE

In recent years, advances in fuel systems for internal combustion engines, and particularly for diesel engines, have increased dramatically. However, in order to achieve optimal engine performance at all operating conditions with respect to fuel economy, exhaust emissions, noise, transient response, and the like, further advances are necessary. As one example, operational accuracy with electronically controlled fuel systems can be improved by reducing variations in injected fuel quantities.

A number of techniques, are known for reducing injected fuel quantity variations such as, for example, robust system design, precision manufacturing, precise component matching, and electronic control strategies. However, conventional manufacturing approaches for improving performance, such as tightening tolerances and the like, are typically cost prohibitive, and conventional control approaches such as open-loop look-up tables have become increasingly complex and difficult to implement as the number of degrees of freedom to control have increased, particularly with multiple-input, multiple-output (MIMO) control systems. In fact, both of these approaches improve accuracy only during engine operation immediately after calibration in a controlled environment, and neither compensate for deterioration or environmental noise changes, which affect subsequent performance. Closed-loop control systems for controlling injected fuel quantity variations are accordingly preferable, but typically require additional sensors to measure appropriate control parameters.

One known technique for implementing such a closed-loop control system without implementing additional sensors is to leverage existing information to estimate injected fuel quantity; i.e., implementation of a so-called "virtual sensor." One example of a known control system 10 including such a virtual sensor is illustrated in FIG. 3. Referring to FIG. 3, system 10 includes a two-dimensional look-up table 14 receiving an engine speed/position signal via signal line 12 and a desired fuel injection quantity value from process block 16 via signal path 18. Table 14 is responsive to the engine speed/position signal and the desired fuel injection quantity value to produce an initial fueling command as is known in the art. The virtual injected fuel quantity sensor in system 10 typically comprises a two-dimensional look-up table 20 receiving the engine speed/position signal via signal path 12 and a fuel pressure signal from signal path 22. Table 20 is responsive to the fuel pressure and engine speed/position signals to produce an injected fuel quantity estimate that is applied to summing node 24. Node 24 produces an error value as a difference between the desired fuel injection quantity and the injected fuel quantity estimate and applies this error value to a controller 26. Controller 26 is responsive to the error value to determine a fuel command adjustment value, wherein the Initial fueling command and the fuel command adjustment value are applied to a second summing node 28. The output of summing node 28 is the output 30 of system 10 and represents a final fueling command that is the initial fueling command produced by table 14 adjusted by the fuel command adjustment value produced by controller 26.

While system 10 of FIG. 3 provides for a closed-loop fuel control system utilizing a virtual sensor to achieve at least some control over variations in injected fuel quantities, it has a number of drawbacks associated therewith. For example, a primary drawback is that prior art systems of the type illustrated in FIG. 3 are operable to compensate for variations in only a single operating parameter. Control over variations in additional parameters would require prohibitively large and difficult to manage multi-dimensional look-up tables, wherein such tables would be limited to only operating parameters capable of compensation via look-up table techniques. For operating parameters that deteriorate or change with time, for example, compensation via look-up tables simply does not work without some type of scheme for updating such tables to reflect changes in those operating parameters.

As another drawback of prior art systems of the type illustrated in FIG. 3, such systems are not closed-loop with respect to injector-to-injector fueling variations. For example, referring to FIG. 16, a plot 35 of measured fuel injection quantity vs. injector actuator commanded on-time (i.e., desired fueling command) for each injector (cylinder) of a six-cylinder engine, is shown wherein the between-cylinder fueling variations are the result of various mismatches in the fueling system hardware. As is apparent from plot 35, the between-cylinder fuel injection quantity variations are quite pronounced and generally unacceptable in terms of accurate fueling control. While known cylinder balancing techniques could reduce such cylinder-to-cylinder fueling variations, the fuel control system of FIG. 3 would be ineffective in reducing such variations. Moreover, the fuel control system of FIG. 3 would further be ineffective in reducing engine-to-engine fueling variations. Referring to FIG. 17, for example, plots of average injected fuel vs. injector on-time for three engine fueling extremes are illustrated. Nominal engine fueling requirements are illustrated by curve 36, minimum engine fueling conditions are illustrated by curve 38 and maximum engine fueling conditions are illustrated by curve 40. While engines of the same type may be designed for identical fueling requirements, their actual fueling requirements may fall anywhere between curves 38 and 40. Unfortunately, the prior art fuel control system of FIG. 3 cannot compensate for such engine-to engine fueling variations. In general, if such control parameter variations are not attributable to the operating parameter for which the system is designed to compensate for, but are instead attributable to other error sources for which the control system of FIG. 3 is not designed to compensate for, the system performance may actually be worse than would otherwise be the case with conventional fuel control techniques.

By the nature of their uses in a wide variety of applications, engines are typically required over their operating lifetimes to work in environments wherein many internal and external parameters that affect engine performance may vary, cannot be controlled and/or cannot be, or typically are not, measured. Heretofore, known control systems have attempted to improve injected fueling accuracy using a parameter that is both measurable and controllable. Such systems typically operate by making control changes, based on an estimated sensitivity in the fueling quantity, to this measurable and controllable parameter using assumed values for other internal and/or external parameters rather than taking into account performance effects and interactions of these other parameters. By contrast, if the injected fueling quantity can be estimated utilizing a sensor or virtual sensor that is independent of many of the internal and external parameters that affect the engine's injected fueling quantity, a robust closed-loop fueling quantity control can be performed directly on the estimated fuel quantity rather than on only one of the control parameters that affect the fueling quantity. What is therefore needed is an improved strategy for adaptively estimating injected fuel quantities based on real-time performance of certain fuel system operating conditions throughout an injection event to thereby allow for robust and accurate operation as well as straightforward integration into complex fuel control systems. Ideally, such a strategy should be capable of minimizing between-cylinder and between-engine fueling variations.

SUMMARY OF THE DISCLOSURE

The present invention may comprise one or more of the following features or combinations thereof. A system for estimating a quantity of parasitic leakage of a fluid from a fluid collection unit may include a pressure sensor coupled to the fluid collection unit and configured to produce a pressure value indicative of a pressure of the fluid collection unit and a control circuit operable to determine a change in pressure value based on the pressure value. The control circuit may further be operable to estimate the quantity of parasitic leakage based on the change in pressure value.

A method for estimating a quantity of parasitic leakage of a fluid from a fluid collection unit may includes the steps of hydraulically locking the fluid collection unit, determining a change in pressure value of the fluid collection unit, and estimating the quantity of parasitic leakage of the fluid based on the change in pressure value.

In an alternative embodiment, a method for estimating a quantity of parasitic leakage of a fuel from a fuel collection unit of a fuel supply system for an internal combustion engine may include the steps of determining an operating condition of the internal combustion engine, discontinuing pumping of the fuel into the fuel collection unit in response to the operating condition, determining a temperature value of the fuel, determining a pressure value of the fuel collection unit, determining a change in pressure of the fluid collection unit based on the pressure value, determining a bulk modulus value of the fuel based on the temperature value and the pressure value, and estimating the quantity of parasitic leakage based on the change in pressure and the bulk modulus value.

These and other objects of the present invention will become more apparent from the following description of the illustrative embodiments.

BRIEF DESCRIPTION OF THE DRAWINGS

FIG. 21 is a diagrammatic illustration of one embodiment of step 308 of the algorithm of FIG. 20, in accordance with the present invention;

FIG. 22 is a diagrammatic illustration of one embodiment of step 310 of the algorithm of FIG. 20, in accordance with the present invention;

FIG. 34 is a diagrammatic illustration of one embodiment of a bulk modulus table for use with the software algorithm of FIG. 33.

DESCRIPTION OF THE ILLUSTRATIVE EMBODIMENTS

Figure 1A:
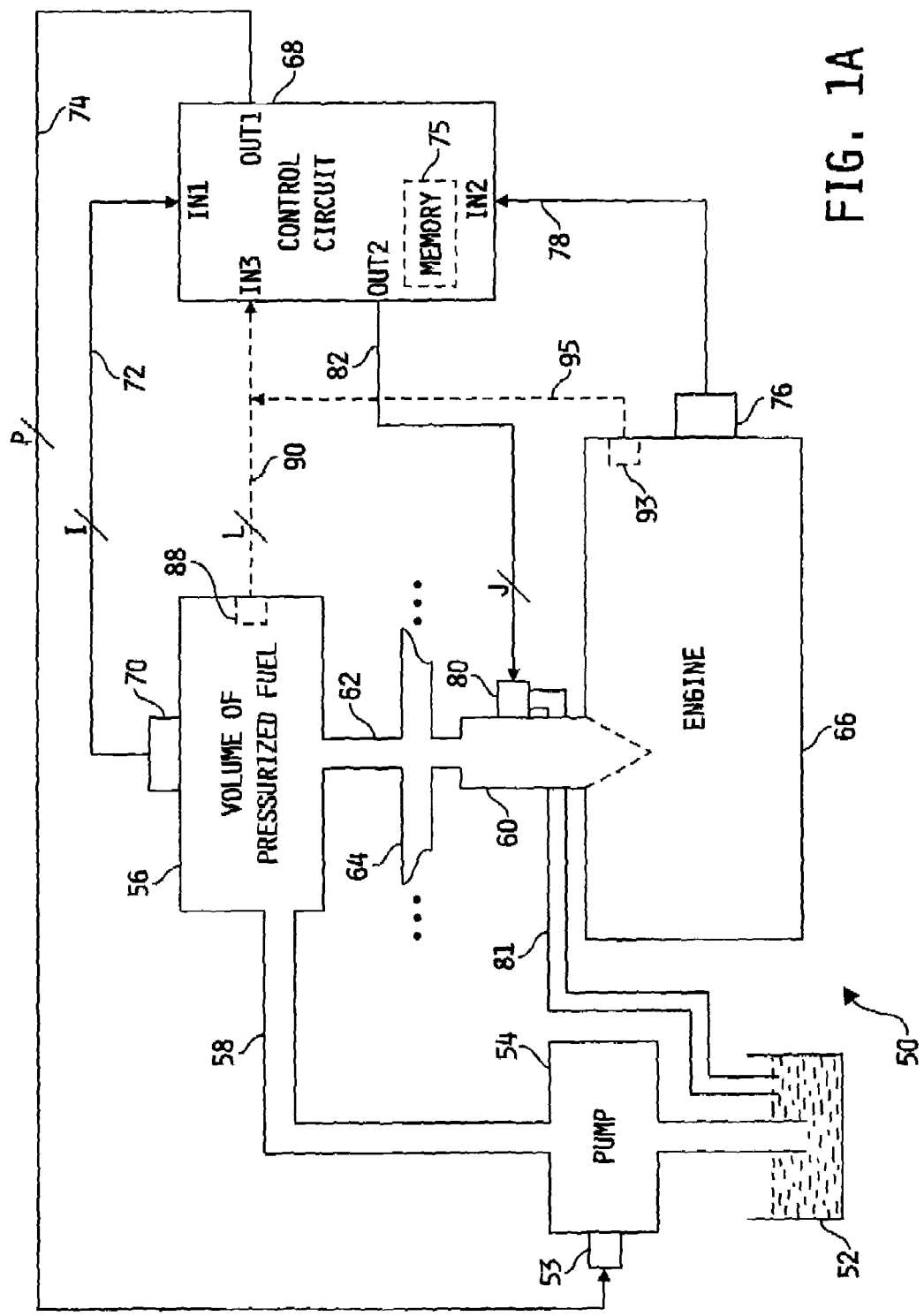
FIG. 1A is a diagrammatic illustration of one embodiment of a system for controlling fuel injection to an internal combustion engine, in accordance with the present invention.

For the purposes of promoting an understanding of the principles of the invention, reference will now be made to a number of illustrative embodiments shown in the drawings and specific language will be used to describe the same. It will nevertheless be understood that no limitation of the scope of the invention is thereby intended.

Referring now to FIG. 1A, one preferred embodiment of an electronic fuel control system 50, in accordance with the present invention, is shown. Fuel control system 50 includes a source of fuel 52; e.g. diesel engine fuel, having an inlet port of a fuel pump 54 in fluid communication therewith. In one embodiment, fuel pump 54 is a high pressure pump configured to supply high pressure fuel from fuel supply 52, which may typically be a low pressure fuel supply pump operable to supply low pressure fuel from a fuel source to,fuel pump 54, to at least one outlet port thereof in a cyclic fashion. It is to be understood, however, that the present invention contemplates that pump 54 may alternatively be configured to supply pressurized fuel in a non-cyclic fashion. In any case, in the system 50 of FIG. 1A, pump 54 is configured to supply pressurized fuel to a fuel collection unit 56 via supply passage 58. Fuel collection unit 56 is fluidly connected to a fuel injector 60 via supply passage 62, and fuel injector 60 is configured to be mounted to an internal combustion engine 66 in fluid communication with a combustion chamber thereof as is known in the art. Fuel collection unit 56 is fluidly coupled to any number of additional fuel injectors via supply passage 64, and in typical applications a dedicated fuel injector is provided for each of the number of cylinders of the engine 66. In the embodiment shown in FIG. 1A, the fuel collection unit 56 is conventionally referred to as a fuel accumulator or fuel storage unit.

Central to the electronic control of pump 54 and injector 60 is a control circuit 68 having a memory unit 75 associated therewith. In one embodiment, control circuit 68 is a control computer of known construction, wherein such a circuit 68 is typically referred to by those skilled in the art as an electronic (or engine) control module (ECM), engine control unit (ECU) or the like, although the present invention contemplates that control circuit 68 may alternatively be any circuit capable of performing the functions described hereinafter with. respect to circuit 68. In any case, control circuit 68 is operable, at least in part, to control the fueling of engine 66 in accordance with one or more software algorithms stored within memory unit 75.

System 50 includes a number of sensors and/or sensor subsystems for providing control circuit 68 with operational information relating to some of the components of system 50 as well as certain engine operating information. For example, fuel collection unit 56 includes a pressure sensor 70 electrically connected to an input IN1 of control circuit 68 via a number, I, of signal paths 72, wherein I may be any positive integer. Sensor 70 is preferably a known sensor operable to sense the pressure of the volume of pressurized fuel within collection unit 56 and provide a fuel pressure signal corresponding thereto to input IN1 of control circuit 68 via signal paths 72, as is known in the art. System 50 further includes an engine speed/position sensor 76 electrically connected to an input IN2 of control circuit 68 via signal path 78. In one embodiment, sensor 76 is a known engine speed/position sensor including a Hall effect sensor disposed proximate to a toothed gear or wheel rotating synchronously with the crankshaft of the engine (not shown). Preferably, the toothed gear or wheel includes a number of equi-angularly spaced teeth as well as an extra tooth disposed between adjacent ones of the equi-angularly spaced teeth. Sensor 76 is operable to produce an engine speed/position signal including information relating to the rotational speed of the engine crank shaft (not shown) based on the passage thereby of the equi-angularly spaced teeth, as well as information relating to engine position relative to a reference engine position (e.g., angle of the crank shaft (crank angle) relative to a top-dead-center (TDC) position of the engine cylinder in question based on passage thereby of the extra tooth. Alternatively, system 50 may substitute the sensor 76 just described with one or more known sensors producing equivalent information in the form of one or more electrical signals.

System 50 optionally includes an engine temperature sensor operable to sense the operating temperature of engine 66 and provide a corresponding engine temperature signal to an input IN3 of control circuit 68 via a number, L, of signal paths 90, wherein L may be any positive integer. In one embodiment, the engine temperature sensor is a known fuel temperature sensor 88, 20 as shown in phantom in FIG. 1A, wherein sensor 88 is suitably located (e.g., within fuel collection unit 56) so as to provide a signal to input IN3 of control circuit 68 indicative of the temperature of the pressurized fuel supplied by pump 54. Alternatively, the engine temperature sensor may be a known coolant fluid sensor 93 as shown in phantom in FIG. 1A, wherein sensor 93 is suitably located so as to provide a signal to input IN3 of control circuit 68 via signal path 95 that is indicative of the temperature of engine coolant fluid. Those skilled in the art will recognize that other known sensors or sensor subsystems may be used in place of sensor 88 or sensor 93, wherein any such sensor or sensor subsystem is operable to produce one or more signals from which engine operating temperature may be determined or estimated, and that any such sensor or sensor subsystem for determining or estimating engine operating temperature is intended to fall within the scope of the present invention.

Control circuit 68 includes a number of outputs by which certain components of system 50 may be electronically controlled. For example, output OUT1 of control circuit 68 is electrically connected to an actuator 53 of fuel pump 54 via a number, P, of signal paths 74, wherein P may be any positive integer and wherein actuator 53 may be a solenoid or other known actuator. In any case, actuator 53 of pump 54 is responsive to a pump command signal produced by control circuit 68 on signal path 74 to cause the pump 54 to supply fuel from fuel supply 52 to fuel collection unit 56. Output OUT2 of control circuit 68 is electrically connected to an actuator 80 (e.g., solenoid) of fuel injector 60 via a number, J, of signal paths 82, wherein J may be any positive integer, whereby actuator 80 is responsive to a fuel command or injector on-time signal produced by control circuit 68 on signal path 82 to actuate injector 60 to thereby dispense a quantity of fuel from fuel collection unit 56 into a combustion chamber of engine 66. Additionally, actuator 80 is operable to direct unused (non-injected) fuel supplied thereto to fuel source 52 via fuel passageway 81, as is known in the art.

It is to be understood that in the embodiment illustrated in FIG. 1A, system 50 may include any number of fuel pumps 54, fuel collection units 56, fuel injectors 60 and associated passageways as indicated by the integer designations of signal paths 72, 74, 80 and 90. As one specific example, system 50 configured for a 6 cylinder engine may include a pair of fuel pumps 54, a pair of fuel collection units 56 and six fuel injectors 60 wherein one fuel pump 54 and associated fuel collection unit 56 is operable to supply pressurized fuel to a first bank of three fuel injectors (e.g., front bank) and the other fuel pump 54 and associated fuel collection unit 56 is operable to supply pressurized fuel to a second bank of three fuel injectors (e.g., rear bank). Those skilled in the art will recognize other combinations of fuel pump 54, fuel collection unit 56, fuel injector 60 and associated passageways, and that other such combinations are intended to fall within the scope of the present invention.

Figure 1B:
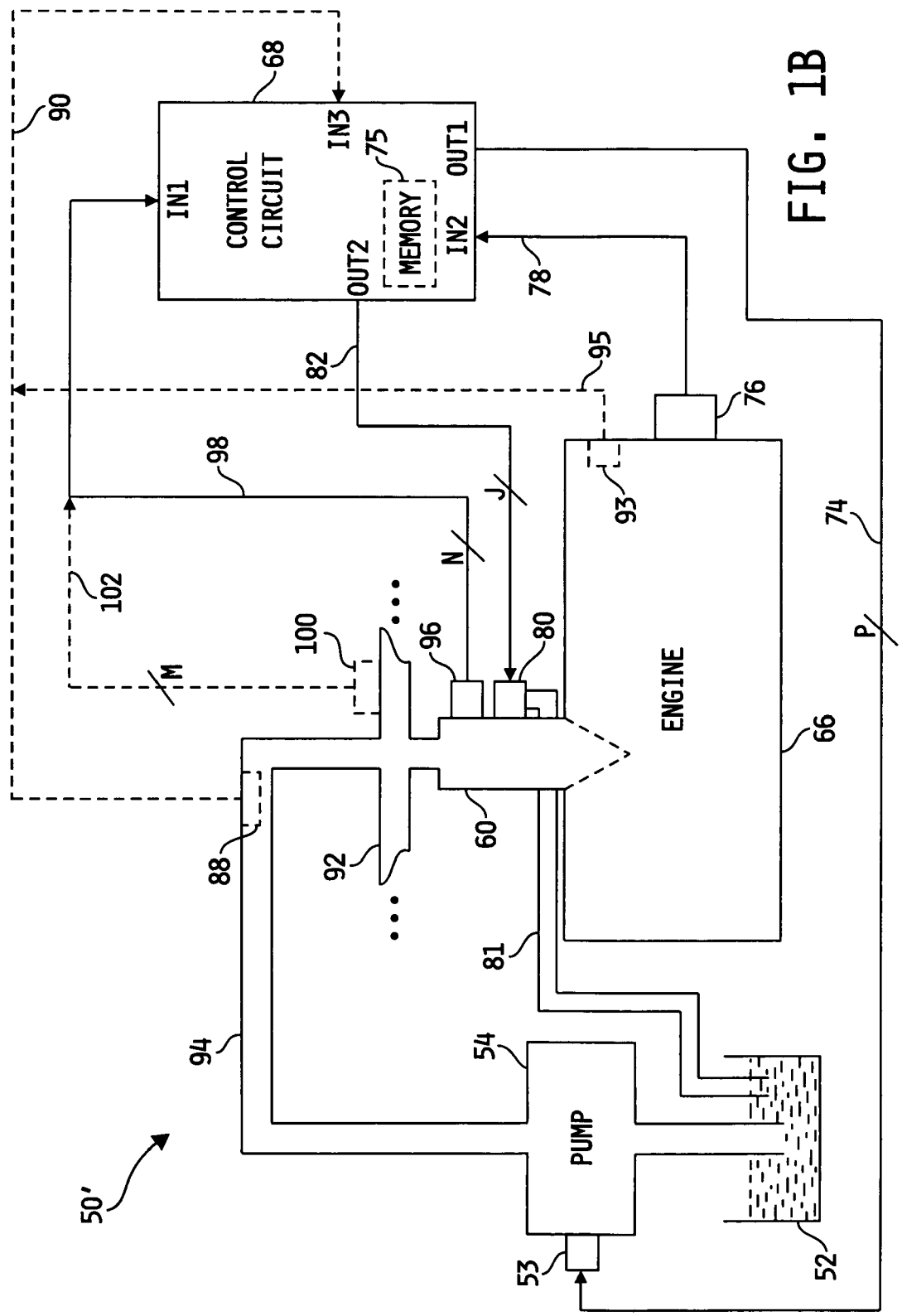
FIG. 1B is a diagrammatic illustration of an alternate embodiment of a system for controlling fuel injection to an internal combustion engine, in accordance with the present invention.

Referring now to FIG. 1B, an alternative embodiment of an electronic fuel control system 50', in accordance with the present invention, is shown. System 50' is identical in many respects to system 50 of FIG. 1A, and like reference numbers are therefore used to identify like components. System 50' of FIG. 1B differs from system 50 of FIG. 1A in that fuel pump 54 is fluidly connected directly to a so-called fuel "rail" 92 via supply passage 94, wherein the fuel rail 92 is fluidly connected to injector 60 and optionally to a number of additional fuel injectors. In one embodiment of the fuel control system 50' illustrated in FIG. 1B, the "fuel collection unit", as this term is used hereinabove, is comprised of the fuel rail 92, whereby a pressure sensor 100 suitably located relative to rail 92 is electrically connected to input IN1 of control circuit 68 via a number, M, of signals path 102 as shown in phantom in FIG. 1B. In this embodiment, pressure sensor 100 is operable to sense the pressure of fuel within fuel rail 92 and provide a corresponding number, M, of fuel pressure signals corresponding thereto, wherein M may be any positive integer. In an alternative embodiment of the fuel control system 50' of FIG. 1B, the "fuel collection unit" is comprised of the fuel storage portion of fuel injector 60, whereby a pressure sensor 96 suitable located relative to injector 60 is electrically connected to input IN1 of control circuit 68 via a number, N, of signal paths 98 as shown in phantom in FIG. 15. In this embodiment, pressure sensor 96 is operable to sense the pressure of fuel within injector 60 and provide a corresponding number, N, of fuel pressure signals corresponding thereto, wherein N may be any positive integer. It is to be understood that in either embodiment of the fuel control system 50' of FIG. 1B, any number of fuel pumps 54, fuel injectors 60 and fuel rails 94 may be provided and fluidly connected to any desired combinations or groupings of fuel injectors 60, as described with respect to FIG. 1A, to thereby accommodate any desired fuel pump/fuel rail/injector combinations or groupings. In any case, it should now be readily apparent that the term "fuel collection unit", as it relates to the present invention, may be understood to identify any of an accumulator-type storage unit, such as unit 56 of FIG. 1A, a fuel rail-type storage unit, such as fuel rail 94, or a fuel injector-type storage unit, such as the fuel storage portion of injector 60, and that the term "fuel storage pressure" refers to the pressure of fuel stored within any of the foregoing fuel collection units.

Figure 2:
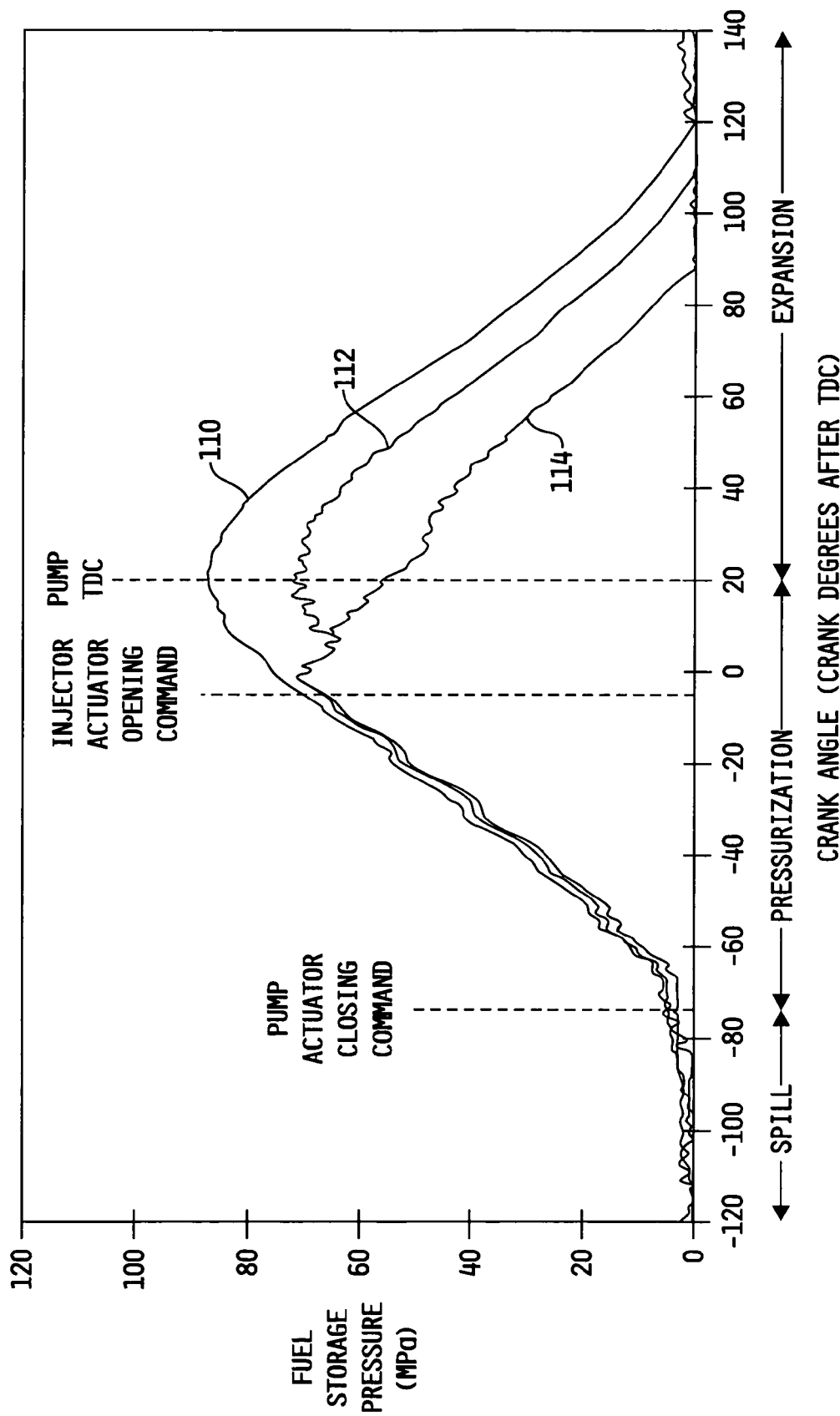
FIG. 2 is a plot of fuel storage pressure vs. crank angle for different fuel injection quantities.

Referring now to FIG. 2, some of the basic principles of the present invention will now be described. FIG. 2 shows a plot of fuel storage pressure vs. crank angle, wherein the illustrated fuel storage pressure curves 110, 112 and 114 correspond to signals provided by any of the fuel pressure sensors 70, 96 or 100 (FIGS. 1A and 1B) and are thus representative of fuel pressures within the "fuel collection unit" as this term is defined hereinabove. The fuel storage pressure curves 110,112,114 are plotted against crank angle throughout the conventional spill, pressurization and expansion phases of fuel injection (i.e., a fuel injection event), wherein pump actuator opening command (i.e., control signal to the pump actuator 53 on signal path 74), injector actuator closing command (i.e., control signal to the injector actuator 80) and pump TDC (i.e., top dead center position of fuel pump 54 relative to a reference pump position) indicators are included for reference. The fuel pump 54 spills low-pressure fuel until control circuit 68 produces a pump command on signal path 74 instructing the fuel pump actuator 53 to close. The earlier in the cycle that the pump actuator 53 is closed, the higher the generated pressure will be in the fuel collection unit. After the actuator 53 is closed, the pump starts to increase the fuel pressure in the collection unit until the pump plunger (not shown) retracts during the expansion phase of the cycle. A fuel injection event can be positioned either during the pressurization phase, expansion phase or both, and is controlled by the injector's control actuator 80. In FIG. 2, fuel storage pressure curve 110 corresponds to fuel storage pressure when no fuel injection occurs, fuel storage pressure curve 112 corresponds to fuel storage pressure when a medium quantity of fuel is injected and fuel storage pressure curve 114 corresponds to fuel storage pressure when a large quantity of fuel is injected.

In accordance with the present invention, estimation of injected fuel quantities for fuel systems which store pressurized fuel is based on the principle that the quantity of fuel removed from the fuel collection unit (i.e., fuel storage device) is reflected in the magnitude of the change in energy of the fuel collection unit across a fuel injection event. In the embodiments of system 50 and 50' of FIGS. 1A and 1B respectively, this change in energy of the fuel collection unit across a fuel injection event is measured as a change in fuel pressure by monitoring any of the fuel pressure sensors 70, 96 and 100.

However, those skilled in the art will recognize that other known mechanisms may be used to measure the change in energy of the fuel collection unit across a fuel injection event, and that such other mechanisms are intended to fall within the scope of the present invention. Examples of such other known mechanisms may include, but are not limited to, known devices for determining changes in fuel mass, fuel volume or strain of the fuel collection unit across a fuel injection event. In any case, the governing principle of the injected fuel quantity estimation technique of the present invention is based on a change in the amount of energy stored in the fuel collection unit across an injection event being equal to the net energy received from the fuel pump 54 minus the energy removed from the fuel collection unit pursuant to a fuel injection event minus any energy losses. For purposes of the description of the present invention hereinafter, the change in fuel collection unit energy across an injection event will be limited to changes in fuel pressure of the fuel collection unit, it being understood that other known mechanisms, such as those listed above, for example, may alternatively be used to measure changes in fuel collection unit energy across a fuel injection event.

Figure 4:
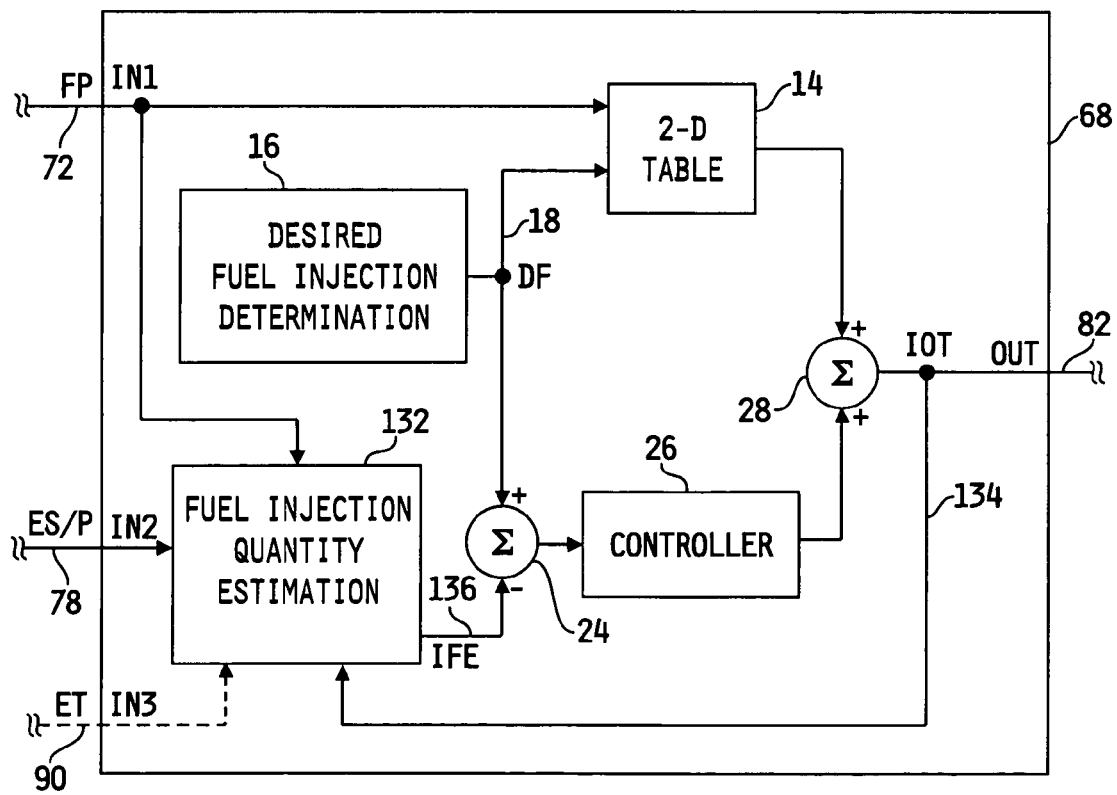
FIG. 4 is a diagrammatic illustration of one embodiment of an improved closed-loop fuel injection control strategy including a fuel injection quantity estimation technique, in accordance with the present invention.

Referring now to FIG. 4, some of the internal features of control circuit 68, as they relate to fuel system control in accordance with the present invention, are shown. It is to be understood that not all such internal features are intended to represent physical structures within control circuit 68, but are rather intended to represent a control strategy that may be executed by control circuit 68 via one or more software algorithms stored in memory 75 of control circuit 68.

Figure 3:
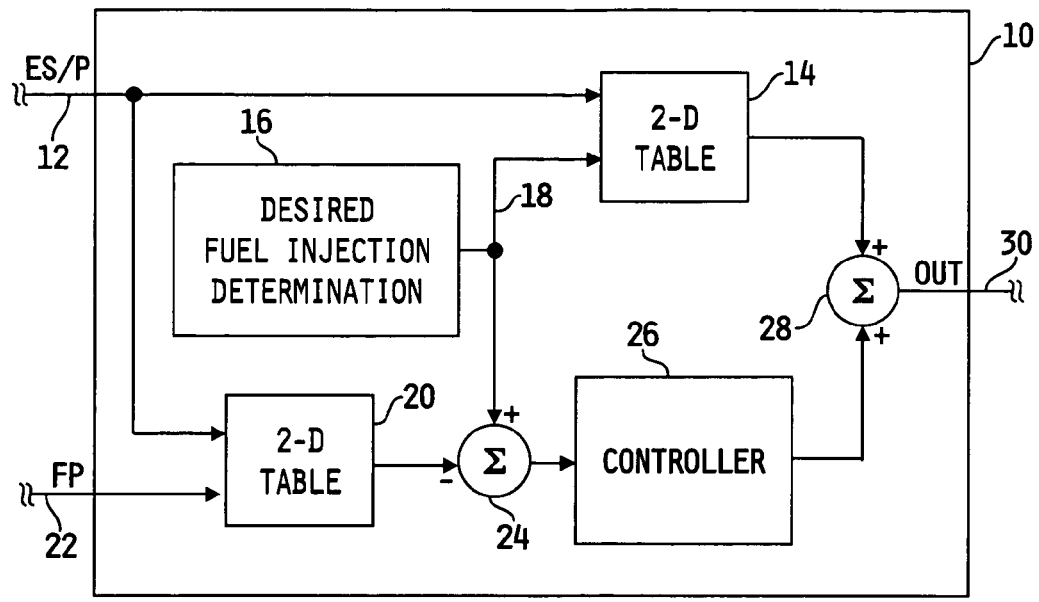
FIG. 3 is a diagrammatic illustration of a prior art closed-loop fuel injection control strategy including a known open-loop fuel quantity estimation technique, for a known fuel injection system.

The internal features of control circuit 68 shown in FIG. 4 are similar in many respects to the internal features of the prior art control circuit 10 of FIG. 3, and like features are accordingly identified with like reference numbers. An exception includes replacing the 2-dimensional look up table 20 of FIG. 3 with a fuel injection quantity estimation block 132 in FIG. 4, wherein block 132 is configured to receive a fuel pressure signal (FP) via signal path 72, an engine speed/position signal (ES/P) via signal path 78 and a commanded fuel signal (in terms of an injector on-time signal produced by control circuit 68 on signal path 82) via signal path 134. Optionally, as will be described in greater detail hereinafter, fuel injection quantity estimation block 132 may additionally receive an engine temperature signal via signal path 90. An injected fuel estimate (IFE) value is produced by fuel injection quantity estimation block 132 and is directed to a subtractive input of summing node 24 via signal path 136. In accordance with the present invention, the fuel injection quantity estimation block 132 thus serves as a virtual sensor operable to estimate injected fuel quantities.

In the operation of the portion of control circuit 68 illustrated in FIG. 4, two-dimensional look-up table 14 receives a fuel pressure signal (FP) via signal line 72 and a desired fuel injection quantity value (DF) from process block 16 via signal path 18. Table 14 is responsive to the fuel pressure signal and the desired fuel injection quantity value to produce an initial fueling command as is known in the art. The fuel injection estimation block 132 is responsive to at least the fuel pressure signal on signal path 72, the engine speed/position signal (ES/P) on signal path 78 and a final fueling command (injector on-time signal (IOT)) on signal path 134 to estimate an injected fuel quantity and supply a corresponding injected fuel quantity estimate (IFE) to a subtractive input of summing node 24 via signal path 136. Node 24 produces an error value as a difference between the desired fuel injection quantity (DF) and the injected fuel quantity estimate (IFE) and applies this error value to a controller 26. Controller 26 is responsive to the error value to determine a fuel command adjustment value, wherein the initial fueling command and the fuel command adjustment value are applied to additive inputs of a second summing node 28. The output of summing node 28 is the output 82 of control circuit 68 and represents a final fueling command that is the initial fueling command produced by table 14 adjusted by the fuel command adjustment value produced by controller 26.

Figure 5:
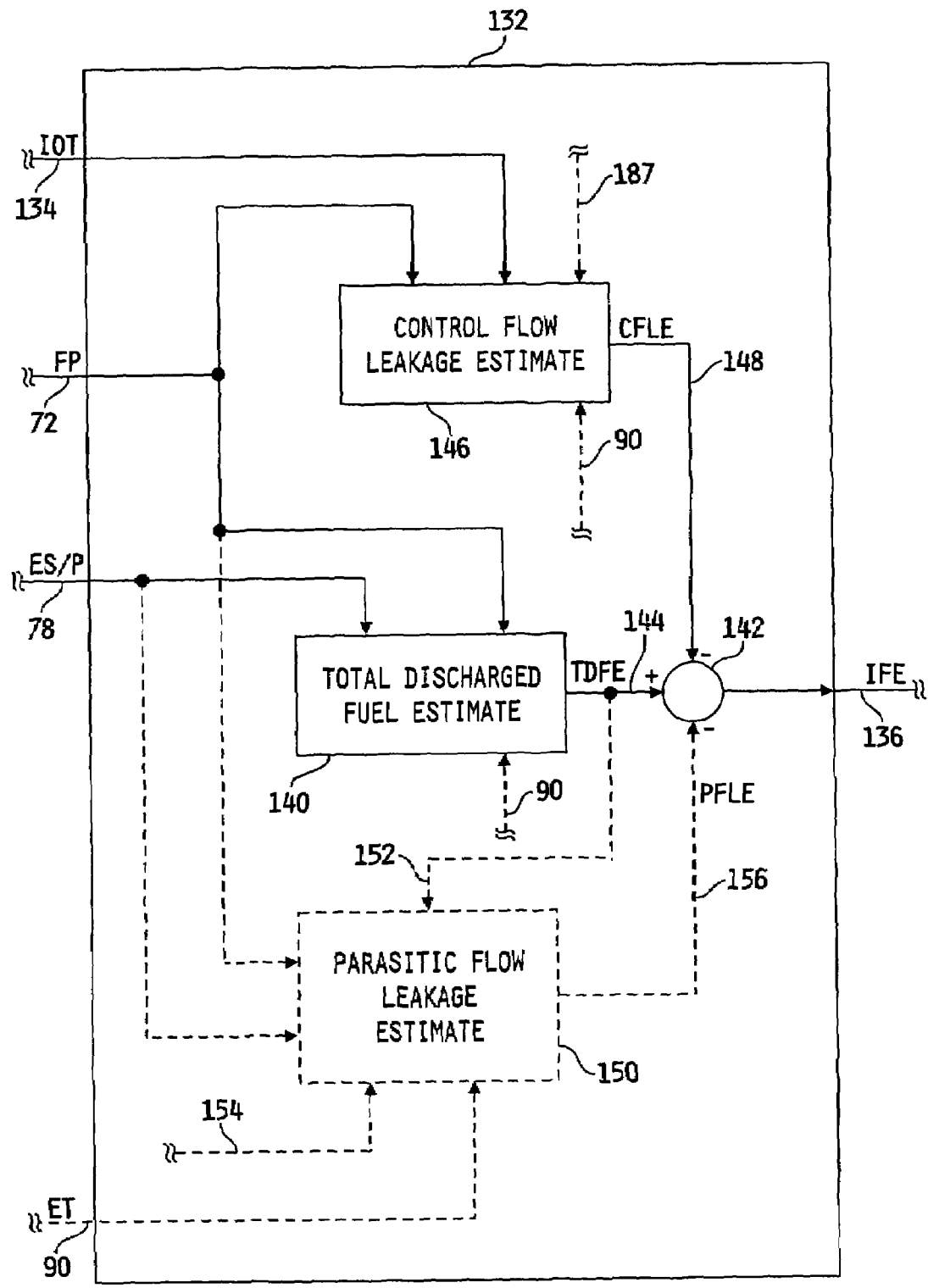
FIG. 5 is a diagrammatic illustration of one embodiment of the fuel injection quantity estimation block of FIG. 4, in accordance with the present invention.

Referring now to FIG. 5, one preferred embodiment of the fuel injection quantity estimation block 132 of FIG. 4 is shown. Block 132 includes a total discharged fuel estimate block 140 receiving the fuel pressure signal (FP) via signal path 72 and the engine speed/position (ES/P) signal via signal path 78. Optionally, block 140 may be configured to receive the engine temperature (or fuel temperature) signal (ET) via signal path 90, as shown in phantom in FIG. 5. Block 140 is operable, as will be more fully described hereinafter, to process the fuel pressure and engine speed/position signals (and optionally the engine/fuel temperature signal ET) and produce a total discharged fuel estimate value (TDFE) on signal path 144 corresponding to an amount of pressurized fuel removed from the fuel collection unit 56 pursuant to a fuel injection event.

Fuel injector control actuator 80 of fuel injector 60 is controlled by control circuit 68 to direct or spill at least some of the pressurized fuel supplied by fuel collection unit 56 to fuel injector 60 back to fuel supply 52 via a hydraulic path or fuel passageway 81 in order to cause an actual fuel injection event to occur, as is known in the art. In such cases, the fuel injection quantity estimation block 132 of the present invention accordingly includes a control flow leakage estimate block 146 operable to estimate such a fuel spill amount, as will be described more fully hereinafter, so that the fuel spill amount can be subtracted from the total discharged fuel estimate value (TDE) in determining the injected fuel estimate (IFE). The fuel pressure signal (FP) on signal path 72 and the final fueling command (in terms of injector on-time IOT) on signal path 134 are provided to the control flow leakage estimate block 146. Optionally, as shown in phantom in FIG. 5, the engine temperature (or fuel temperature) signal ET may be provided to block 146 via signal path 90. In any case, the control flow leakage estimate block 146 is operable to'process these signals and produce a control flow leakage estimate value (CFLE) on signal path 148. Optionally, as shown in phantom in FIG. 5, one or more additional signals may be supplied to block 146 via signal path 187, wherein block 146 is operable to process such signals along with the IOT and FP signals to produce the control flow leakage estimate (CFLE). Examples of signals available on signal path 187 include, but are not limited to, engine speed/position, engine timing, and the like. In any case, signal path 144 is supplied to an additive input of a summing node 142, and signal path 148 is supplied to a subtractive input of summing node 142. An output of summing node 142 forms the output 136 of the fuel injection quantity estimation block 132 and accordingly carries the injected fuel estimate value (IFE).

Those skilled in the art will recognize that the control flow leakage estimate block 146 is necessarily included in fuel systems having so-called indirect control (e.g., injectors defining a hydraulic link between the injector inlet port and outlet drain) over fuel injector delivery time or "on-time" as this term is used herein. Conversely, it should also be recognized that fuel systems are known that include structure providing for direct control over fuel injector delivery time or on-time. In these types of fuel systems, spill valves of the type just described are therefore unnecessary and no control flow exists to create an actual injection event. In such systems, the control flow leakage estimate block 146 can therefore be omitted.

Optionally, as shown in phantom in FIG. 5, the fuel injection quantity estimation block 132 may include a parasitic flow leakage estimate block 150 receiving the fuel pressure signal (FP) and engine speed/position signal (ES/P) via signal paths 72 and 78, respectively. Additionally, block 150 receives an engine temperature signal (ET) via signal path 90 and the total discharged fuel estimate value TDFE on signal path 144 via signal path 152. Finally, block 150 may be configured to receive one or more additional signals via signal path 154 as will be more fully described hereinafter. The parasitic flow leakage estimate block 150 is operable to process the foregoing information and produce a parasitic flow leakage estimate (PFLE) on signal path 156 which is supplied to a subtractive input of summing node 142. The injected fuel estimate (IFE) of block 132 is, in this case, is the total discharged fuel estimate (TDFE) minus the control flow leakage estimate (CFLE) and the parasitic flow leakage estimate (PFLE).

In some fueling systems, the parasitic leakage on the injected fuel and quantity estimate (IFE) may be negligible. In other systems, non-negligible parasitic leakage levels may be minimized by reading pre- and post-injection fuel pressure values very close to the injection event itself. In any such fuel system embodiments wherein such parasitic leakage may be negligible, the parasitic flow leakage estimate block 150 may be omitted from the fuel injection quantity estimation block 132, with the injected fuel estimate (IFE) then being computed as a difference between the total discharged fuel estimate (TDFE) and the control flow leakage estimate (CFLE) in fuel systems having a control flow of fuel as described above, or simply as the total discharged fuel estimate (TDFE) in fuel systems having no control flow. In other fuel systems, the parasitic flow leakage estimate (PFLE) may contribute significantly to the injected fuel estimate (IFE), in which case the parasitic flow leakage estimate block 150 should be included for accuracy. In any case, preferred embodiments and operation of the parasitic flow leakage estimate block 150 will be more fully described hereinafter.

Figure 6:
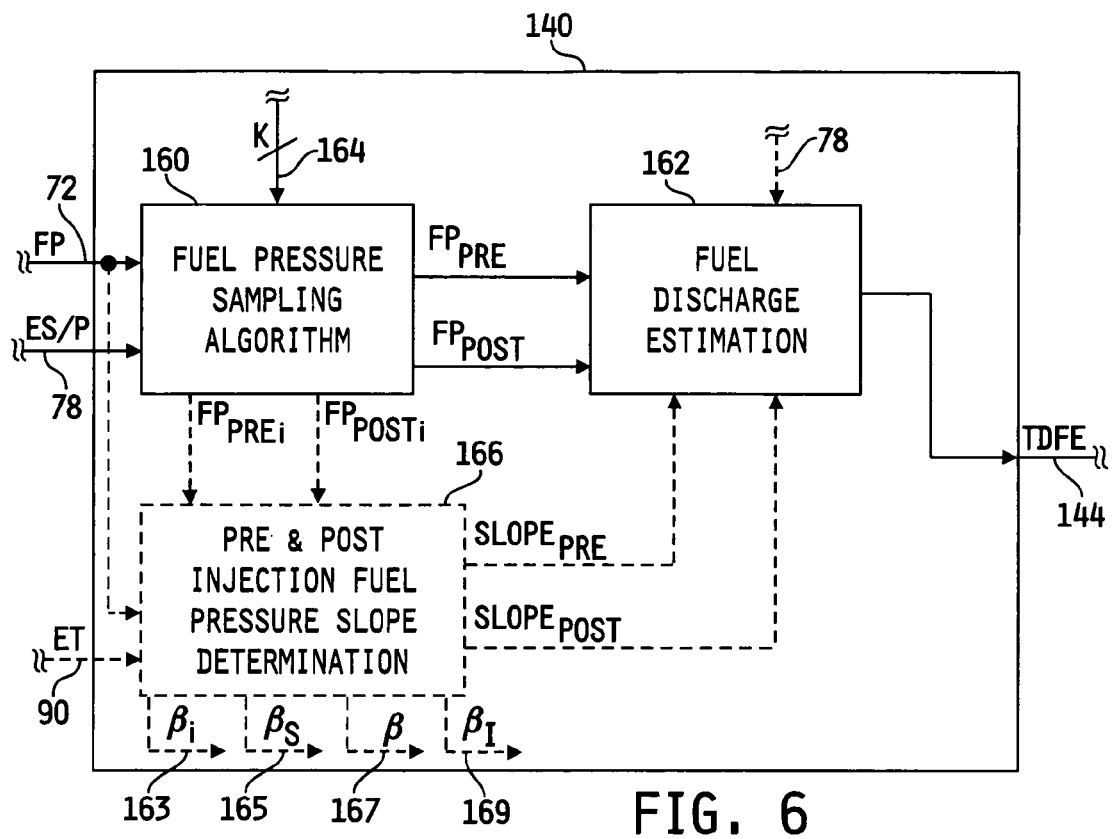
FIG. 6 is a diagrammatic illustration of one embodiment of the total discharged fuel estimation block of FIG. 5, in accordance with the present invention.

Referring now to FIG. 6, one preferred embodiment of the total discharged fuel estimate block 140 of FIG. 5, in accordance with the present invention, is shown. Block 140 includes a fuel pressure sampling algorithm 160 that is responsive to the fuel pressure signal (FP) on signal path 72 and the engine speed/position signal (ES/P) on signal path 78 to sample fuel pressure across a fuel injection event and produce a pre-injection fuel pressure value ($FP_{PRE}$) and a post-injection fuel pressure ($FP_{POST}$). Preferably, the fuel pressure sampling algorithm 160 is operable to compute $FP_{PRE}$ and $FP_{POST}$ as average fuel pressures over predefined crank angle windows relative to crank TDC. For example, in one embodiment algorithm 160 is operable to sample the fuel pressure signal on signal path 72 every 2 degrees of crank angle, and to compute $FP_{PRE}$ as the average of eight fuel pressure values between −30 to −46 crank angle degrees prior to cylinder TDC, and $FP_{POST}$ as the average of eight fuel pressure values between 46 and 60 crank degrees after cylinder TDC. These sampling ranges are particularly desirable in one embodiment since the pre-injection sampling range occurs during the pressurization phase and slightly precedes the most advanced injection event, and the post-injection sampling range occurs during the expansion phase and slightly follows the end of the most retarded and longest injection event (see FIG. 2). It is to be understood, however, that other sampling ranges of any desired crank angle window can be used to provide the pre- and post-injection fuel pressure values $FP_{PRE}$ and $FP_{POST}$, respectively.

Optionally, the fuel pressure sampling algorithm 160 may be configured to receive a number, K, of additional signals or values via signal path 164, wherein algorithm 160 is responsive to such signals or values, in one embodiment, to more accurately match fuel pressure samples with actual crank angle values. An example of one such system operable to provide additional signals or values to algorithm 160 via signal paths 164 is described in U.S. Pat. No. 6,353,791, entitled APPARATUS AND METHOD FOR DETERMINING ENGINE STATIC TIMING ERRORS AND OVERALL SYSTEM BANDWIDTH, which is assigned to the assignee of the present invention, and the disclosure of which are incorporated herein by reference. In accordance with the teachings of the foregoing reference, algorithm 160 is operable, in one embodiment, to receive a combined engine static timing and fuel pump phasing error value EST/FPP and an overall system bandwidth value BW via signal paths 164, whereby algorithm 160 is responsive to the EST/FPP and BW values to accurately match fuel pressure samples with crank angles at which such samples actually occur and thereby compensate for between-engine variations in such data.

The total discharged fuel estimate block 140 further includes a fuel discharge estimation block 162 operable to produce a total discharged fuel estimate (TDFE) on signal path 144 based on at least the pre- and post-injection fuel pressure values $FP_{PRE}$ and $FP_{POST}$ and optionally on the engine speed/position signal (ES/P) provided on signal path 78 as shown in phantom in FIG. 6. In one particular embodiment, block 162 comprises a regression-derived equation that produces the total discharged fuel estimate (TDFF) as a function of $FP_{PRE}$ and $FP_{POST}$ and also as a function of the engine speed/position signal (ES/P). For example, in this embodiment, the total discharged fuel estimate value (TDFE) is computed by block 162 in accordance with the equation $$TDFE = a + b*FP_{PRE} + c*FP_{PRE}*FP_{PRE} + d*FP_{POST} + e*FP_{POST}*FP_{POST} + f*(ES/P),$$

wherein a–f are regression parameters. Those skilled in the art will recognize that the foregoing regression equation parameters for estimating the total discharged fuel based at least on fuel pressure values may be determined using known and common curve-fitting techniques, and that other curve-fitting equations, model-based equations or other desired equations that are a function of at least, or only, $FP_{PRE}$ and $FP_{POST}$ may be substituted for the foregoing regression equation for determining TDFE, and that such alternate equations are intended to fall within the scope of the present invention. Examples of other curve-fitting techniques, for example, include, but are not limited to, least squares data-fitting techniques, and the like. In any case, signal path 144 is the output of block 162 and carries the total discharged fuel estimate (TDFE) produced by block 140.

In an alternative embodiment, the total discharged fuel estimate block 140 may be configured to include as part of the total discharged fuel estimate (TDFE) effects thereon of changes in the bulk modulus of the fuel contained in the fuel collection unit (as this term is defined hereinabove). For example, the relationship between energy stored in the fuel collection unit and the change in fuel volume is known to be dependent upon the effective bulk modulus of the system. In accordance with one aspect of the present invention, an estimate of the effective bulk modulus of the fuel system may thus be used to improve the total discharged fuel estimate (TDFE) of block 140.

The bulk modulus of a system expresses the resistance to volumetric reduction by pressure; i.e., the reciprocal of compressibility. The pressure developed in a fluid compression system depends on factors such as the system volume, the fluid's bulk modulus characteristics, the container compliance, flow rates into and out of the system, the rate of compression, and heat transferred to and from the system. When a liquid is subjected to compression, the volume occupied by the liquid is reduced as the pressure increases, wherein this relationship is given by the equation $\partial P = -\beta \partial V/V$.

Figure 7:
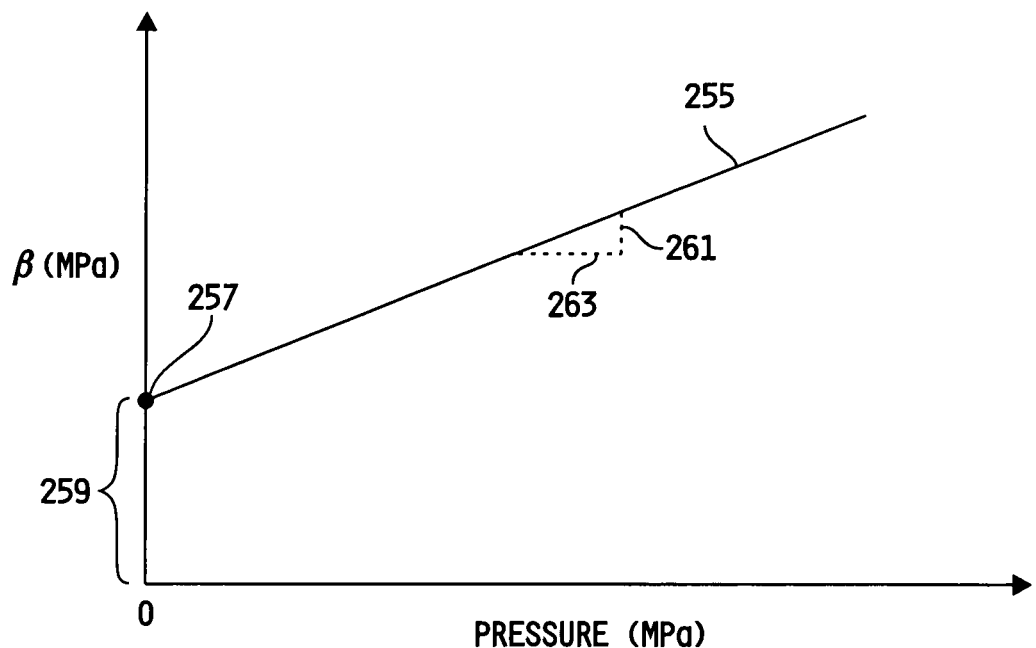
FIG. 7 is a plot of bulk modulus vs. fluid pressure for an example fluid illustrating a slope and offset value associated therewith.
Figure 8:
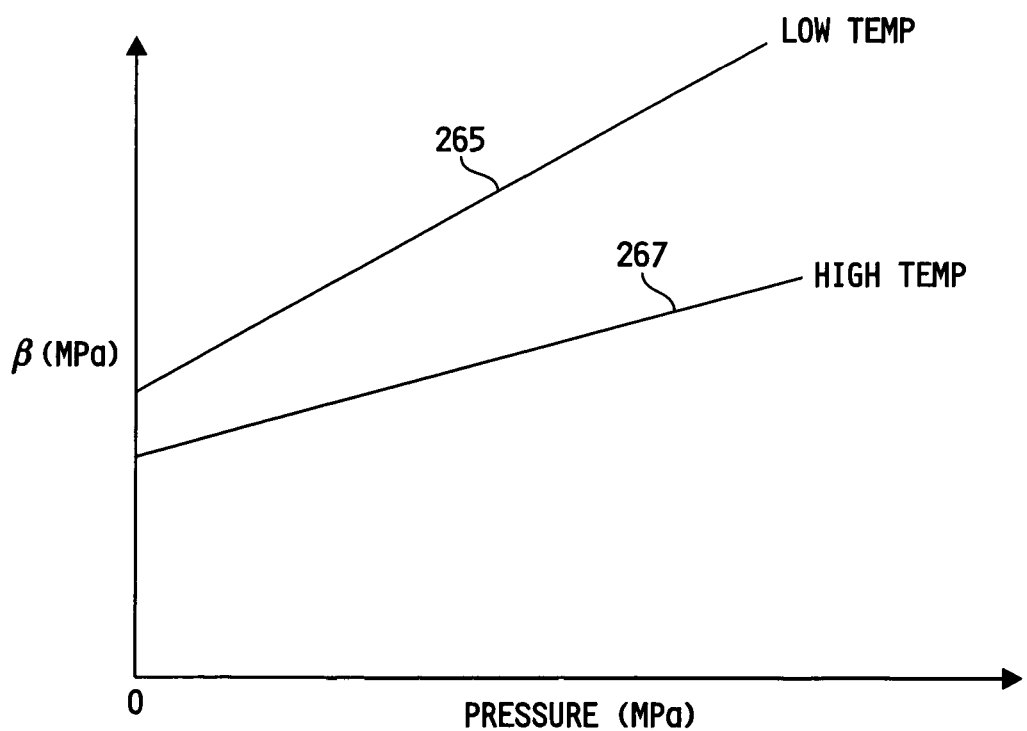
FIG. 8 is a plot of bulk modulus vs. fluid pressure for an example fluid illustrating a temperature dependency thereof.

A number of techniques for characterizing the bulk modulus of fluids and fuels are known such as, for example, using a P-V-T (pressure-volume-temperature) technique or using an ultrasonic velocity technique. As a result of these techniques, the bulk modulus of a fluid has been found to vary with pressure, temperature and molecular structure. For fluids such as diesel fuel, the bulk modulus value has been observed to increase almost monotonically with pressure, and decrease as fuel temperature increases. For example, referring to FIG. 7, a plot of bulk modulus (β) 255 of a fluid such as diesel fuel is shown vs. fluid pressure, wherein the bulk modulus function 255 intercepts the zero pressure line at intercept 257 producing a bulk modulus offset value 259. The slope of the bulk modulus function 255 is shown as a unit change in β divided by a unit change in pressure. Referring to FIG. 8, plots of bulk modulus (β) vs. fluid pressure are shown for two different fluid temperatures. Bulk modulus function 265 represents the bulk modulus value at a low fluid temperature and bulk modulus function 267 represents the bulk modulus value at a high fluid temperature. It should be readily apparent from FIG. 8 that not only is the bulk modulus of the fluid higher at low temperatures for any given fluid pressure than at high temperatures, but that the slopes and zero-pressure intercepts are also different for the two temperature extremes.

Moreover, the bulk modulus of a fluid blend has been found to be directly proportional to the bulk moduli of the fluid components. For example, water has a higher bulk modulus than diesel fuels which results in an increase in the bulk moduli of diesel fuel blends as the water fraction increases. The bulk modulus also increases with an increase in the specific gravity of the fuel.

In accordance with the present invention, fuel system components that are packaged in the general form a fluid pressurizing pump connected to a high-pressure energy storage device connected to one or more electronically operable injector nozzles have been determined through experimentation to have similar characteristics to the P-V-T bulk modulus measurement technique. As the fluid (e.g., diesel fuel) is pressurized by a pumping element, the current operating bulk modulus characteristics of the system can, in accordance with the present invention, be estimated at each pressurization or injection cycle using information relating to changes in fuel pressure across a fuel injection event.

Figure 9:
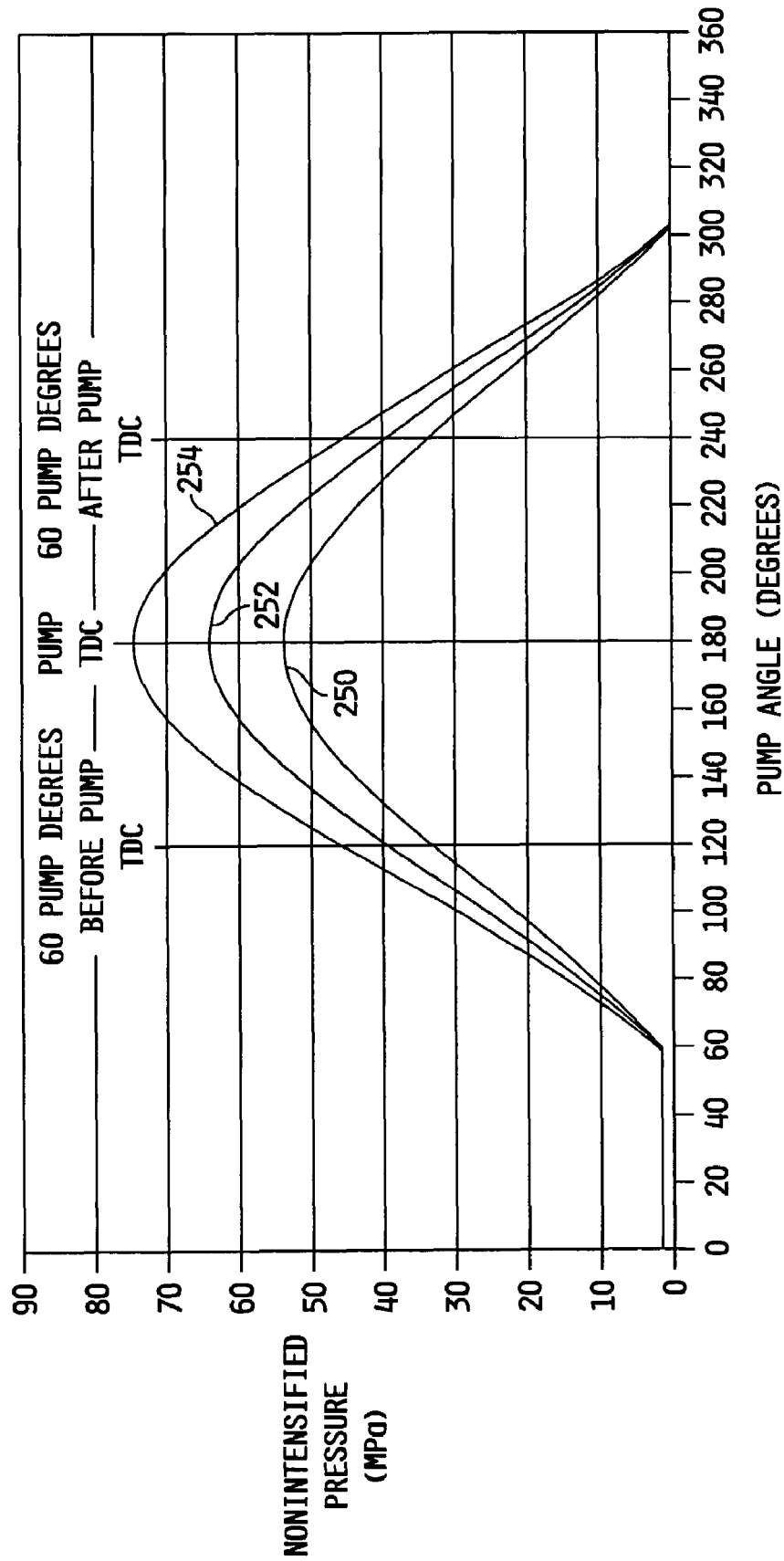
FIG. 9 is a plot of fuel pump pressure vs. pump angle for fluids having different bulk modulus values.

Referring now to FIG. 9, the effect of an offset in the tangent bulk modulus of fuel contained in the fuel collection unit as a function of fuel pressure on the pressurization and depressurization of a fuel system is shown. FIG. 9 shows three pressure curves as a function of an angle of fuel pump 54 relative to a reference pump position; i.e., pump top-dead-center (TDC). Each of the three pressure curves corresponds to a different tangent bulk modulus value of the fuel contained within the fuel collection unit. For example, fuel pressure curve 250 has a tangent bulk modulus value of 1,000 MPa, fuel pressure curve 252 has a tangent bulk modulus value of 1,200 MPa, and fuel pressure curve 254 has a tangent bulk modulus value of 1,400 MPa.

Figure 10:
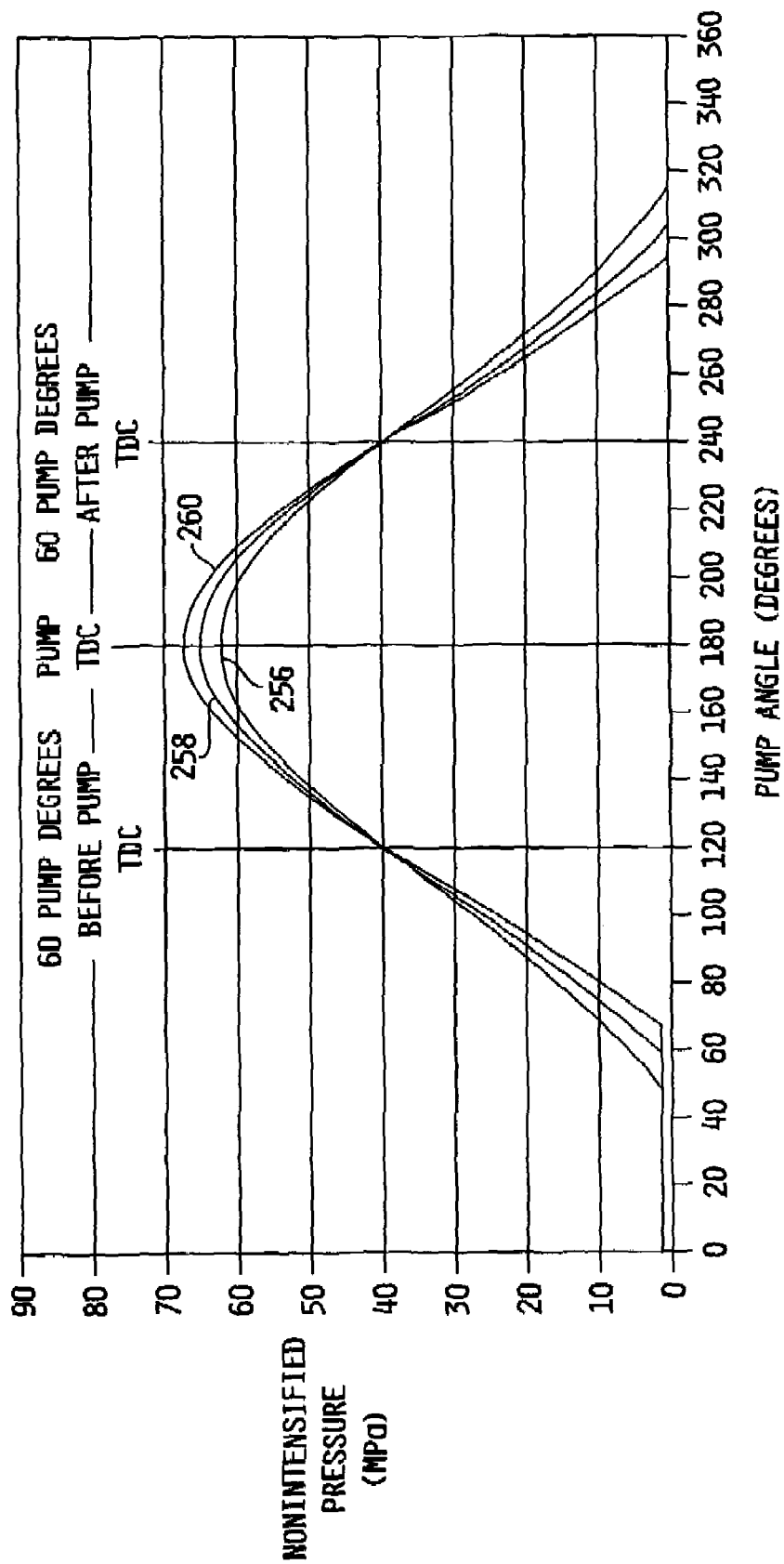
FIG. 10 is a plot of the fuel pump pressure vs. pump angle of FIG. 9 with the start of pressurization values adjusted for equal pressure values at 60 degrees before and after pump TDC.

The offsets in tangent bulk modulus illustrated in FIG. 9 may be the result of any of a number of factors such as, for example, a change in temperature or a change in the pressurized volume, but could also be the result of changes in fuel properties. In any case, the pressure curves 250, 252 and 254 illustrate that fuel is pressure increases as the tangent bulk modulus increases. In most fuel systems, the start of pressurization can be controlled, whereby the start of pressurization can be adjusted in order to obtain the same pressure at a pump position for the different tangent bulk modulus values. For example, referring now to FIG. 10, pressure curves 256, 258 and 260 correspond directly to pressure curves 250, 252 and 254 of FIG. 9 with the start of pressurization adjusted in order to obtain the same pressure at 60 pump degrees before pump TDC. Although the pressures are the same at the specified pump position, it can be seen that the rate of change of fuel pressure as a function of the pump position differs for each tangent bulk modulus value.

Figure 11:
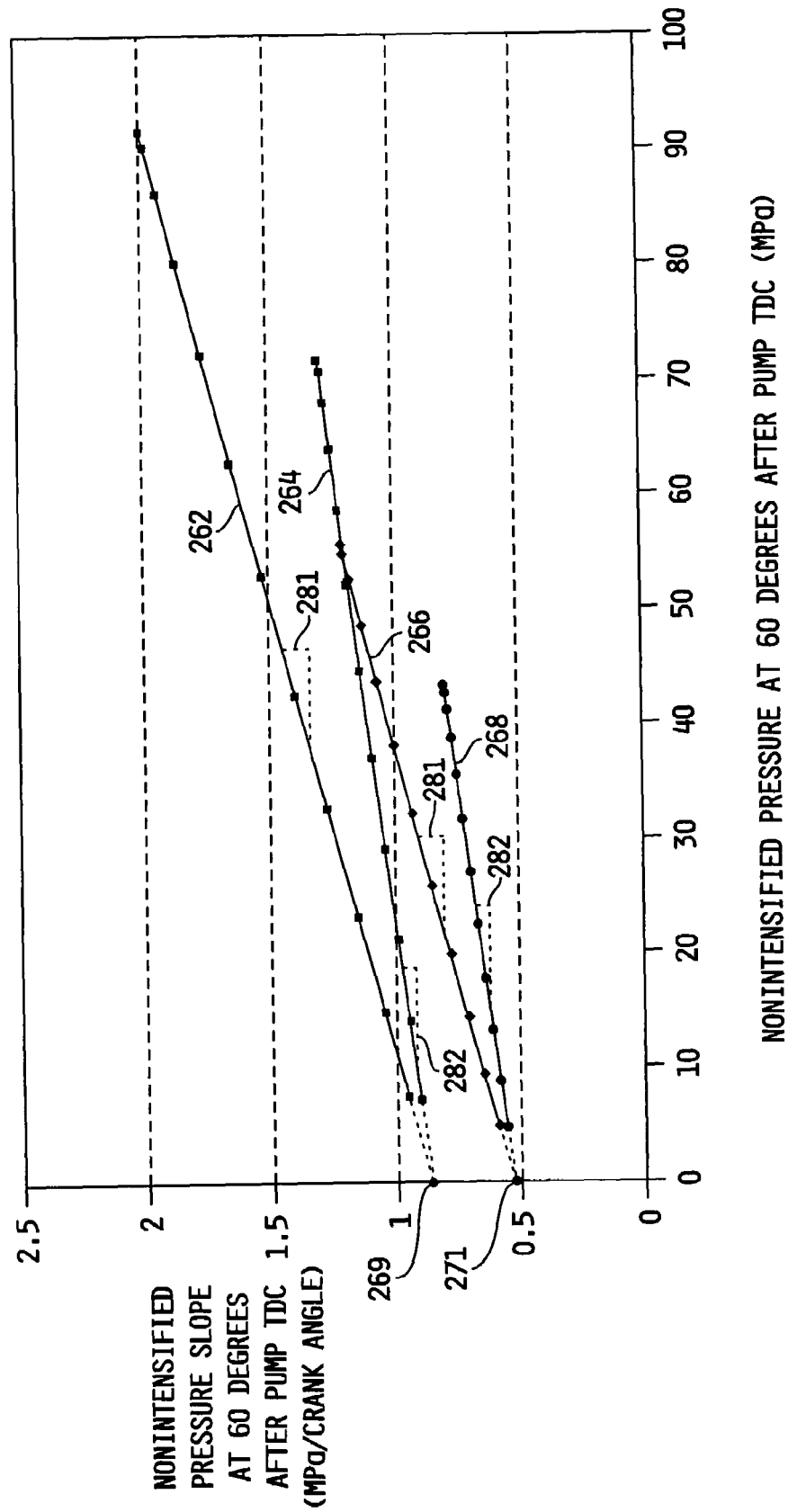
FIG. 11 is a plot of fuel pump pressure slope vs. fuel pump pressure at 60 degrees after pump TDC, illustrating distinct pressure and rate of pressure change characteristics for different bulk modulus values.
Figure 12A:
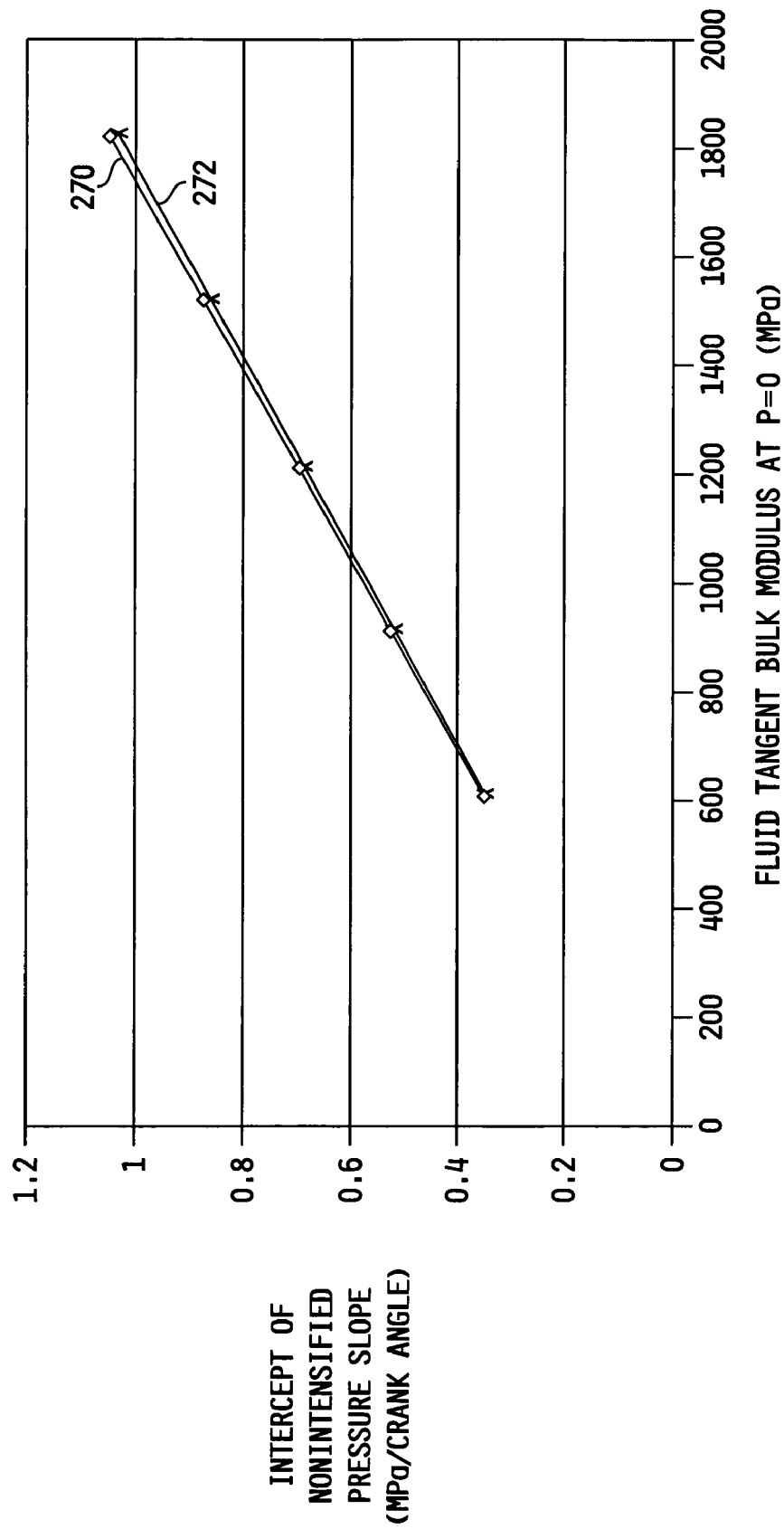
FIG. 12A is a plot of the intercept of the curve of the fuel pump pressure slope vs. fuel pump pressure illustrating the relationship of the intercept of the fuel pump pressure slope curve to the tangent bulk modulus offset.
Figure 12B:
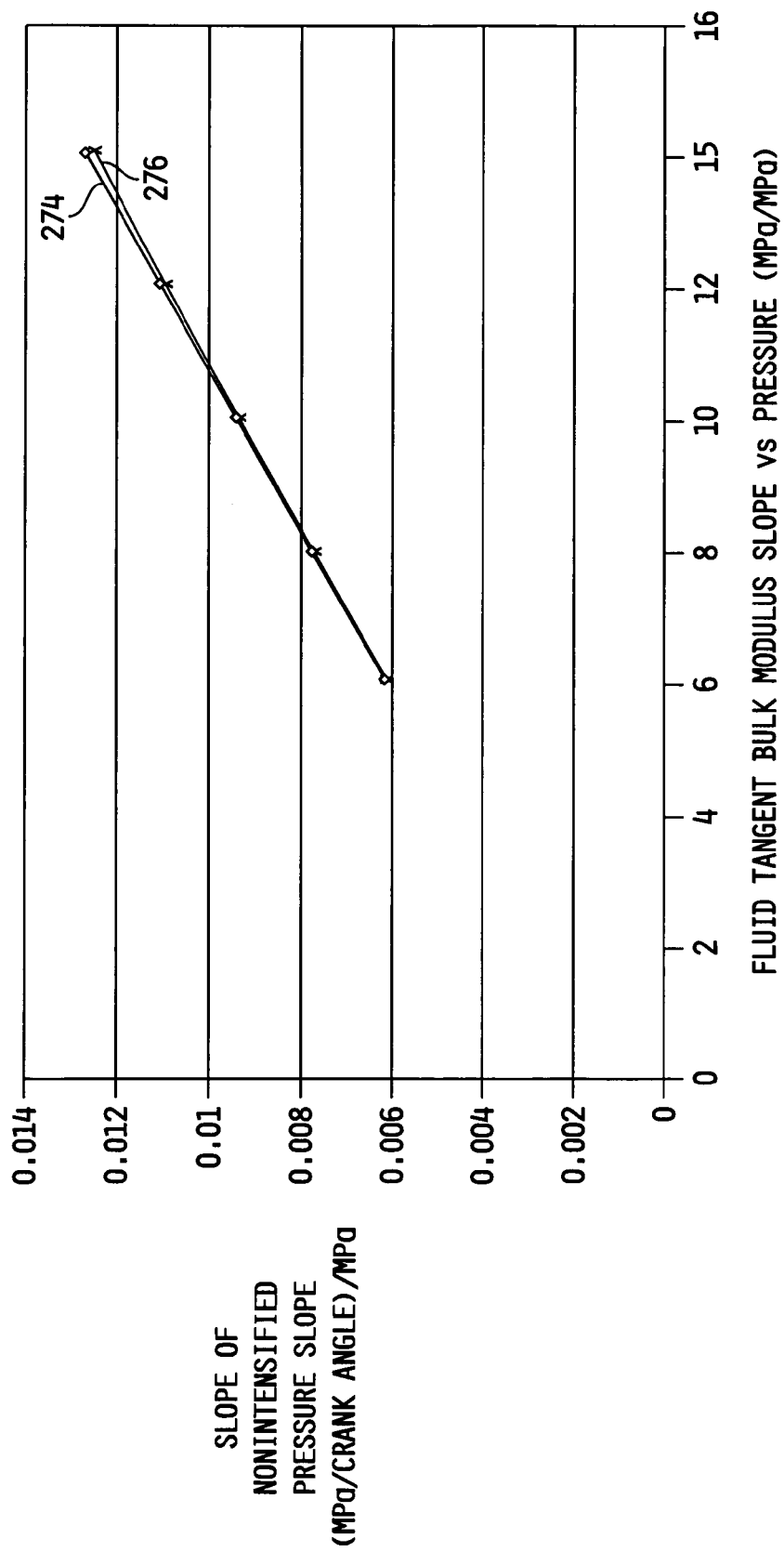
FIG. 12B is a plot of the slope of the fuel pump pressure vs. fuel pump pressure illustrating the relationship of the fuel pump pressure slope to the tangent bulk modulus slope.

In accordance with the present invention, test cases were modeled for different bulk modulus characteristics as the start of pump pressurization and the volume of fluid removed from the system were varied. Results of these tests are shown in FIG. 11, which illustrates that for each bulk modulus curve as a function of pressure, a unique combination of pressures and rate of changes of pressure result. For the system modeled, these combinations of pressure and rate of changes of pressure were found to be on unique lines for each bulk modulus combination. Increasing the tangent bulk modulus at 0 MPa (a bulk modulus offset) produced an offset in the pressure slope as a function of pressure at a sampled pump position. Increasing the tangent bulk modulus slope as a function of pressure produced an increase in the slope of the curve of the. pressure slope as a function of pressure at the selected pump sampling position. Within FIG. 11, for example, lines 262 and 266 had a tangent bulk modulus slope versus fuel pressure value of 14, whereas line 262 has a tangent bulk modulus at 0 MPa of 1,500 MPa and line 266 has a tangent bulk modulus at 0 MPa of 900 MPa. By contrast, line 264 has a tangent bulk modulus at 0 MPa of 1,500 MPa, yet has a tangent bulk modulus slope versus fuel pressure of 6. Likewise, line 268 has a tangent bulk modulus slope versus fuel pressure of 6, yet has a tangent bulk modulus at 0 MPa of 900 MPa. From FIG. 11, it is apparent that a combination of pressure and the rate of change in pressure at a specified pump position can be used to estimate the effective bulk modulus of a system and the bulk modulus of a fluid. For the system modeled, the intercepts (e.g., points 269 and 271 in FIG. 11) of the curve of the pressure slope as a function of the fuel pressure are related to the tangent bulk modulus offset. Referring to FIG. 12A, this relationship is shown wherein line 270 corresponds to 60 pump degrees after pump TDC and line 272 corresponds to 60 degrees prior to pump TDC. Similarly, the slopes (e.g., slopes 281 and 282 in FIG. 11) of the curve of the pressure slope as a function of the fuel pressure are related to the tangent bulk modulus slope. Referring to FIG. 12B, the slope of the curve of the fuel pressure slope as a function of the fuel pressure, as shown in FIG. 11, is shown to be related to the tangent bulk modulus slope as a function of fuel pressure wherein line 274 corresponds to 60 pump degrees after pump TDC and line 276 corresponds to 60 pump degrees prior to pump TDC.

Referring back to FIG. 6, the total discharged fuel estimate block 140 may be modified in accordance with concepts just described, to take into account in the calculation of the total discharged fuel estimate (TDFE) effects of changes in bulk modulus of the fuel. For example, block 140 may include a pre- and post-injection fuel pressure slope determination block 166 receiving the individual pre-injection fuel pressure values $FP_{PREi}$ and individual post-injection fuel pressure values $FP_{POSTi}$ from the fuel pressure sampling algorithm 160. Optionally, block 166 may be configured to receive the engine temperature (or fuel temperature) signal via signal path 90, as shown in phantom. In any case, block 166 is operable to determine in accordance with well-known equations, the slope of the pre-injection fuel pressure signal during the predefined crank angle window ($SLOPE_{PRE}$) and the post-injection slope of the fuel pressure signal during the predefined crank angle window ($SLOPE_{POST}$) respectively. The fuel pressure slope values are then provided to the fuel discharge estimation block 162 wherein block 162 is configured, in this embodiment, to compute TDFE as a function of at least $FP_{PRE}$, $FP_{POST}$, $SLOPE_{PRE}$ and $SLOPE_{POST}$. In one embodiment, for example, fuel discharge estimation block 162 is operable to compute the discharged fuel estimate TDFE in accordance with a regression equation of the type described hereinabove with respect to the previous embodiment of block 140, wherein at least the values $SLOPE_{PRE}$ and $SLOPE_{POST}$ are used in addition to the values $FP_{PRE}$ and $FP_{POST}$ (e.g., TDFE=$a+b*FP_{PRE}+c*FP_{PRE}*FP_{PRE}+d*FP_{POST}+e*FP_{POST}*FP_{POST}+f*SLOPE_{PRE}+g*SLOPE_{PRE}*SLOPE_{PRE}+h*SLOPE_{POST}+i*SLOPE_{POST}*SLOPE_{POST}+j$ (ES/F), wherein a–j are regression parameters. As with the previously discussed embodiment of block 162, however, those skilled in the art will recognize that the foregoing equation parameters may be determined using known and common curve-fitting techniques, and that other curve-fitting equations, model-based equations or other desired equations that are a function of at least $FP_{PRE}$, $FP_{POST}$, $SLOPE_{PRE}$ and $SLOPE_{POST}$ may be substituted for the foregoing regression equation for determining TDFE, and that such alternate equations are intended to fall within the scope of the present invention. Examples of other curve-fitting techniques, for example, include, but are not limited to, least squares data-fitting techniques, and the like. In any case, signal path. 144 is the output of block 162 and carries the total discharged fuel estimate (TDFE) produced by block 140.

Block 166 may additionally be configured to produce an instantaneous bulk modulus value $\beta_i$ on signal path 163 corresponding to the instantaneous bulk modulus of the pressurized fuel, a bulk modulus slope value $\beta_S$ on signal path 165 corresponding to a slope of the bulk modulus function over a range of fuel pressure values, a bulk modulus intercept value $\beta_I$ corresponding to a zero-pressure bulk modulus value of the bulk modulus function on signal path 169 and a bulk modulus function $\beta$.

Figure 13:
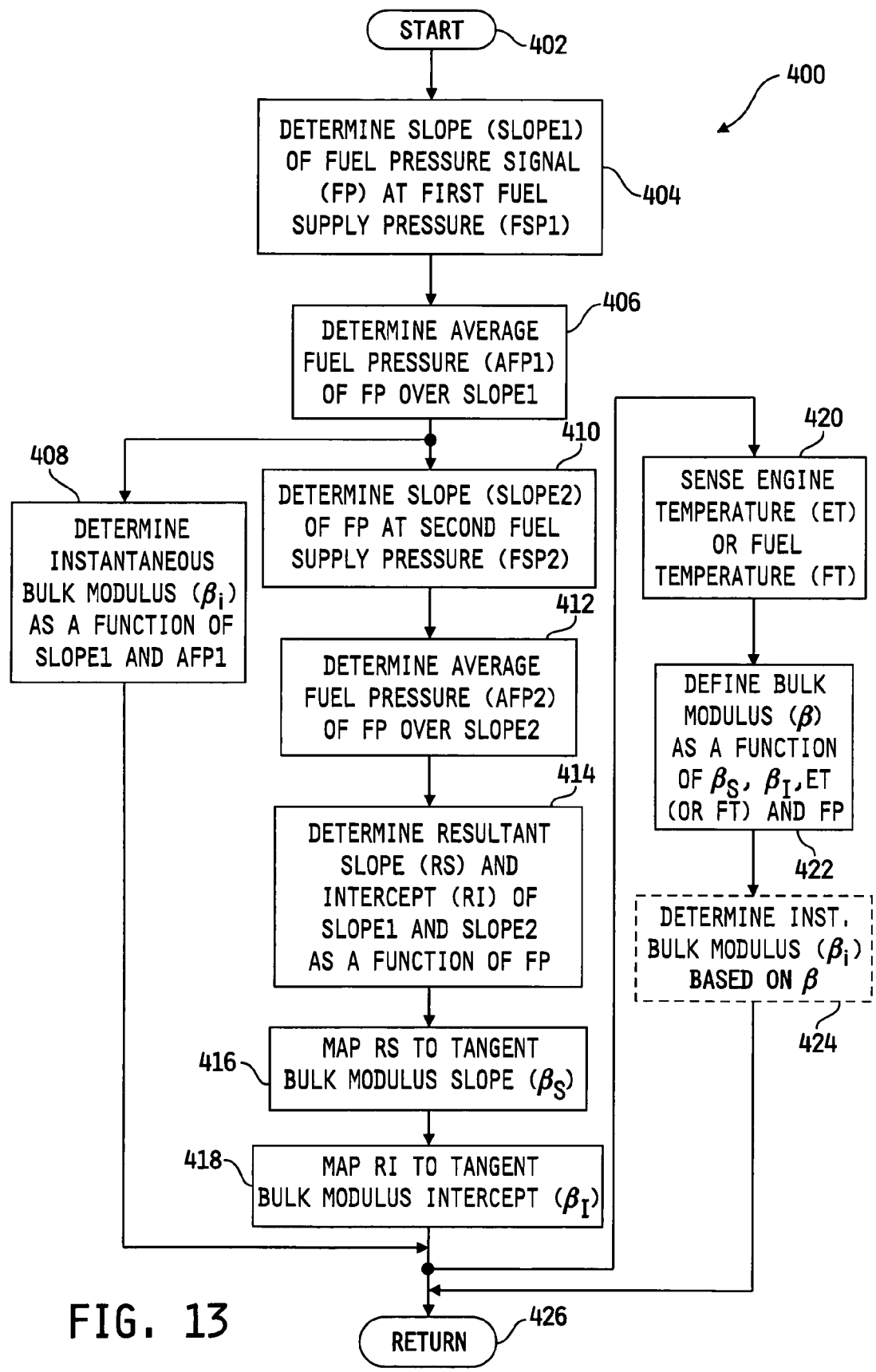
FIG. 13 is a flowchart illustrating one preferred embodiment of a software algorithm for determining bulk modulus properties of the fuel within fueling system 50 or 50', in accordance with another aspect of the present invention.

Referring to FIG. 13, one preferred embodiment of a software algorithm 400 for determining the foregoing bulk modulus information, in accordance with another aspect of the present invention, is shown. Algorithm 400 is preferably stored within memory 75 and is executable via control circuit 68. Algorithm 400 begins at step 402 and at step 404 control circuit 68 is operable to determine the slope (SLOPE1) or rate of change of the fuel pressure signal (FP) at a first-fuel supply pressure (FSP1). Generally, control circuit 68 is operable at step 404 to determine SLOPE1 anywhere along the cyclically varying fuel pressure signal on signal path 72, although as a practical matter, some fuel pressure ranges may be better suited than others for determining the slope value, wherein the particular fuel system configuration will typically dictate such fuel pressure ranges. In one known fuel system, for example, the post-injection portion of the fuel pressure signal on signal path 72 is less noisy than the pre-injection portion and the slope values SLOPE1 of step 404 is therefore preferably determined along a crank angle window corresponding to the post-injection portion of the fuel pressure signal on signal path 72. In this embodiment, fuel pressure samples for determining SLOPE1 are preferably taken during vehicle motoring conditions (i.e., zero-fueling conditions) so that fluid volumes remain relatively constant during the post-injection area of the fuel pressure signal. As this embodiment relates to fuel system 50 or 50' of the present invention, control circuit 68 may be operable at step 404 to either sample the fuel pressure signal FP during a desired post-injection crank angle window, or may alternatively use the already available $FP_{POST}$ values. In either case, control circuit 68 is operable to compute SLOPE1 from the number of fuel pressure samples using well-known equations. In other fuel systems, the pre-injection portion of the fuel pressure signal on signal path 72 may be less noisy than other portions of the fuel pressure signal, and it may therefore be preferable to compute SLOPE1 at step 404 during a desired crank angle window corresponding to the pre-injection portion of the fuel pressure signal FP. In this embodiment, the fuel pressure signal samples need not be taken under motoring conditions and may instead be taken under normal operating conditions. As this embodiment relates to fuel system 50 or 50' of the present invention, control circuit 68 may be operable at step 404 to either sample the fuel pressure signal FP during a desired pre-injection crank angle window, or may alternatively use the already available $FP_{PREi}$ values. Those skilled in the art will recognize that other portions of the fuel pressure signal on signal path 72 may be sampled for subsequent calculation of SLOPE1 at step 404, and that such alternative fuel pressure sampling strategies are intended to fall within the scope of the present invention.

From step 404, algorithm 400 advances to step 406 where control circuit 68 is operable to determine an average fuel pressure value (AFP1) of the fuel pressure values used in the determination of SLOPE1 at step 404. In one embodiment, for example, control circuit 68 is operable at step 406 to determine AFP1 as a mean pressure value over the range of pressure values used in the determination of SLOPE1 at step 404. In any case, algorithm 400 preferably follows two separate branches from step 406. Along a first branch, algorithm execution advances from step 406 to step 408 where control circuit 68 is operable to compute an instantaneous bulk modulus value, $\beta_i$ as a known function of SLOPE1 and AFP1. For example, control circuit 68 is operable in one embodiment to determine the instantaneous bulk modulus value $\beta_i$ from the relationship $\partial P = -\beta \partial V/V$ described hereinabove. Algorithm 400 advances from step 408 to step 426 where execution of algorithm 400 awaits return to its calling routine.

Along a second branch, algorithm 400 advances from step 406 to step 410 where control circuit 68 is operable to determine a slope (SLOPE2) of the fuel pressure-signal (FP) at a second fuel supply pressure (FSP2) using any of the techniques described hereinabove with respect to step 404. Preferably, control circuit 68 is operable to determine the SLOPE1 and SLOPE2 values at identical crank angle windows with two discernibly different fuel supply pressures. In any case, algorithm 400 advances from step 410 to step 412 where control circuit 68 is operable to determine an average fuel pressure value (AFP2) of the fuel pressure values used to determine SLOPE2. In one embodiment, control circuit 68 is operable to determine AFP2 as a mean value of the pressure samples used to compute SLOPE2. From step 412, algorithm execution advances to step 414.

At step 414, control circuit 68 is operable to determine a resultant slope (RS) of the fuel pressure slope and a resultant intercept (RI) of the fuel pressure slope as a function of fuel pressure. In one embodiment, control circuit 68 is operable to execute step 414 by computing a first-order equation of pressure slope vs. average pressure value using SLOPE1, SLOPE2, AFP1 and AFP2. The slope of this first order equation is the resultant slope (RS), and the resultant intercept (RI) is the value of the first-order equation at zero pressure. Alternatively, the present invention contemplates using other known mathematical techniques for determining RS and RI, and such other known techniques should be understood to fall within the scope of the present invention.

In any case, algorithm execution continues from step 414 to 15 416 wherein control circuit 68 is operable map the resultant slope of the fuel pressure slope determined at step 414 to a tangent bulk modulus slope ($\beta_S$). In one embodiment, memory unit 75 of control circuit 68 has stored therein a relationship between the slope of the fuel pressure slope and tangent bulk modulus slope such as that illustrated in FIG. 12B, whereby control circuit 68 is operable to determine $\beta_S$ directly from this relationship. Those skilled in the art will recognize that the relationship between slope of the fuel pressure slope and tangent bulk modulus slope may be implemented in a number of different forms such as by a table, graph, one or more mathematical equations, or the like.

Algorithm 400 advances from step 436 to step 418 where control circuit 68 is operable to map the resultant intercept (RI) of the fuel pressure slope determined at step 414 to a tangent bulk modulus intercept ($\beta_I$). In one embodiment, memory unit 75 of control circuit 68 has stored therein a relationship between the intercept (RI) of the fuel pressure slope and tangent bulk modulus intercept such as that illustrated in FIG. 12A, whereby control circuit 68 is operable to determine $\beta_I$ directly from this relationship. Those skilled in the art will recognize that the relationship between the intercept of the fuel pressure slope and tangent bulk modulus intercept $\beta_I$ may be implemented in a number of different forms such as by a table, graph, one or more mathematical equations, or the like. In any case, algorithm 400 preferably advances along two separate branches following execution of step 418. Along a first path, step 418 advances to step 426 where algorithm 400 awaits return to its calling routine. Along a second path, step 418 advances to step 420.

By the nature of their use, diesel engines are required to operate over a wide temperature range and with a wide range of fuel blends. If the engine fuel temperature signal is supplied as an input to block 166 via signal path 90, the bulk modulus characteristics of the system and fuel as a function of temperature can easily be determined given the tangent bulk modulus slope $\beta_S$ and tangent bulk modulus intercept $\beta_I$ values determined at steps 416 and 418. At step 420, control circuit 68 is thus operable to sense engine temperature ET or fuel temperature FT, and at step 422 control circuit 68 is operable to define a bulk modulus function $\beta$ using well-known equations, wherein $\beta$ is a function of $\beta_I$, $\beta_S$, ET (or FT) and fuel pressure FP. It should be noted that control circuit 68 determines at step 422 a bulk modulus function $\beta$ similar to that illustrated graphically in FIG. 8 for the fuel (e.g., diesel fuel) supplied by the fuel collection unit. This fluid bulk modulus information can be used, for example, with other engine control functions to obtain additional information about the fuel using known relationships between bulk modulus characteristics and other fluid properties such as, for example, density, viscosity, sonic speed, specific heat and heating value. Information relating to these fuel properties may be leveraged by other engine control systems to improve engine and fuel system performance.

The branch of algorithm 400 including steps 420 and 422 may optionally include a step 424 wherein control circuit 68 is operable to determine an instantaneous bulk modulus value $\beta_i$ based on the bulk modulus function $\beta$ determined at step 422. In any case, algorithm 400 advances from step 424 (or from step 422 if step 424 is omitted) to step 426 where algorithm 400 is returned to its calling routine. It is to be understood that while algorithm 400 is shown and described as executing three distinct branches, control circuit 68 may be configured to execute only any one or combination of the three branches, depending upon the type and amount of information desired. For the embodiment illustrated in FIG. 6, however, block 166 is preferably operable to produce the instantaneous bulk modulus value $\beta_i$ on signal path 163, the bulk modulus slope value $\beta_S$ on signal path 165, the bulk modulus intercept value $\beta_I$ on signal path 169, and the bulk modulus function $\beta$ on signal path 167.

Figure 14:
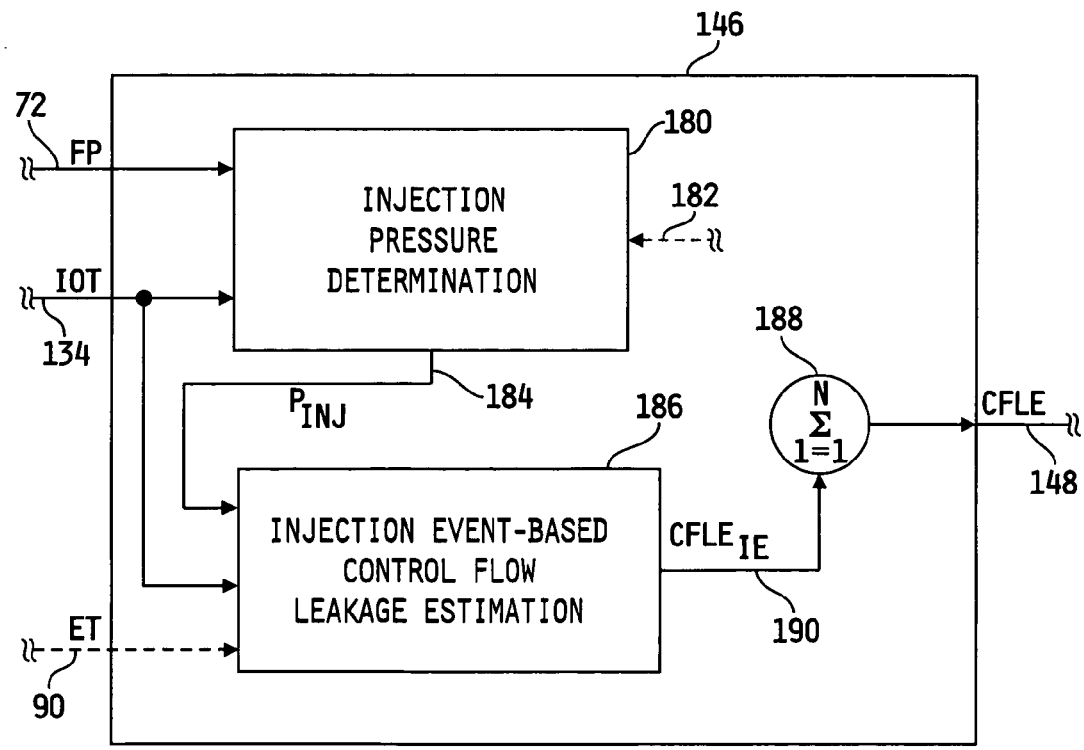
FIG. 14 is a diagrammatic illustration of one embodiment of the control flow estimation block of FIG. 5, in accordance with the present invention.

Referring now to FIG. 14, one preferred embodiment of the control flow leakage estimate block 146 of FIG. 5, in accordance with the present invention, is shown. Block 146 includes a fuel injection pressure determination block 180 receiving the fuel pressure signal (FP) via signal path 72 and the commanded fuel signal (injector on-time signal, IOT) via signal path 134. Additionally, block 180 may receive one or more engine operating signals via signal path 182. Such engine operating signals may include, but are not limited to, an injector timing signal, an injector delay signal, and the like. In any case, block 180 is responsive to at least the fuel pressure signal and the commanded fueling signal (injector on-time signal) to compute a representative fuel injection pressure value ($P_{INJ}$) and provide the $P_{INJ}$ value on signal path 184, wherein $P_{INJ}$ corresponds to an average pressure of fuel injected into a combustion chamber of engine 66 via fuel injector 60 pursuant to a fuel injection event. In one specific embodiment, block 180 is operable to determine $P_{INJ}$ in accordance with the equation:

$$P_{INJ}=(\Sigma^{m2}_{n=m1} \text{ fuel pressure})/(m2-m1+1),$$

wherein m1=0.5*(injector timing+30) and m2=m1+(750/engine speed)*($\Sigma^{4}_{y=1}$IOT+$\Sigma_{n=12,23,34}$ injector delay), and wherein the constant values in the foregoing equations are dictated by the specific engine, vehicle, fuel system, etc. configuration. In cases wherein the fuel injector 60 includes a pressure intensifier, as this term is commonly understood in the art, the estimated fuel injection pressure is computed as a product of $P_{INJ}$ and an intensification ratio of the pressure intensifier. Those skilled in the art will recognize that the determination of $P_{INJ}$ according to the foregoing technique will depend in large part upon the particulars of the engine and fuel system, that the foregoing equation will require modification depending upon the engine and fuel system used, and that such modifications are intended to fall within the scope of the present invention. In a general sense, though, it is to be understood that determination of the average injected fuel pressure $P_{INJ}$ is a measure of the fuel storage pressure signal only during fuel injection events.

The present invention contemplates alternate techniques for determining the representative fuel injection pressure, $P_{INJ}$, and some of these contemplated techniques are set forth in U.S. Pat. No. 6,497,223, entitled FUEL INJECTION PRESSURE CONTROL SYSTEM FOR AN INTERNAL COMBUSTION ENGINE, which is assigned to the assignee of the present invention, and the disclosure of which is incorporated herein by reference. Those skilled in the art will recognize that such alternate techniques for determining $P_{INJ}$ including those described in the foregoing reference are intended to fall within the scope of the present invention.

Figure 16:
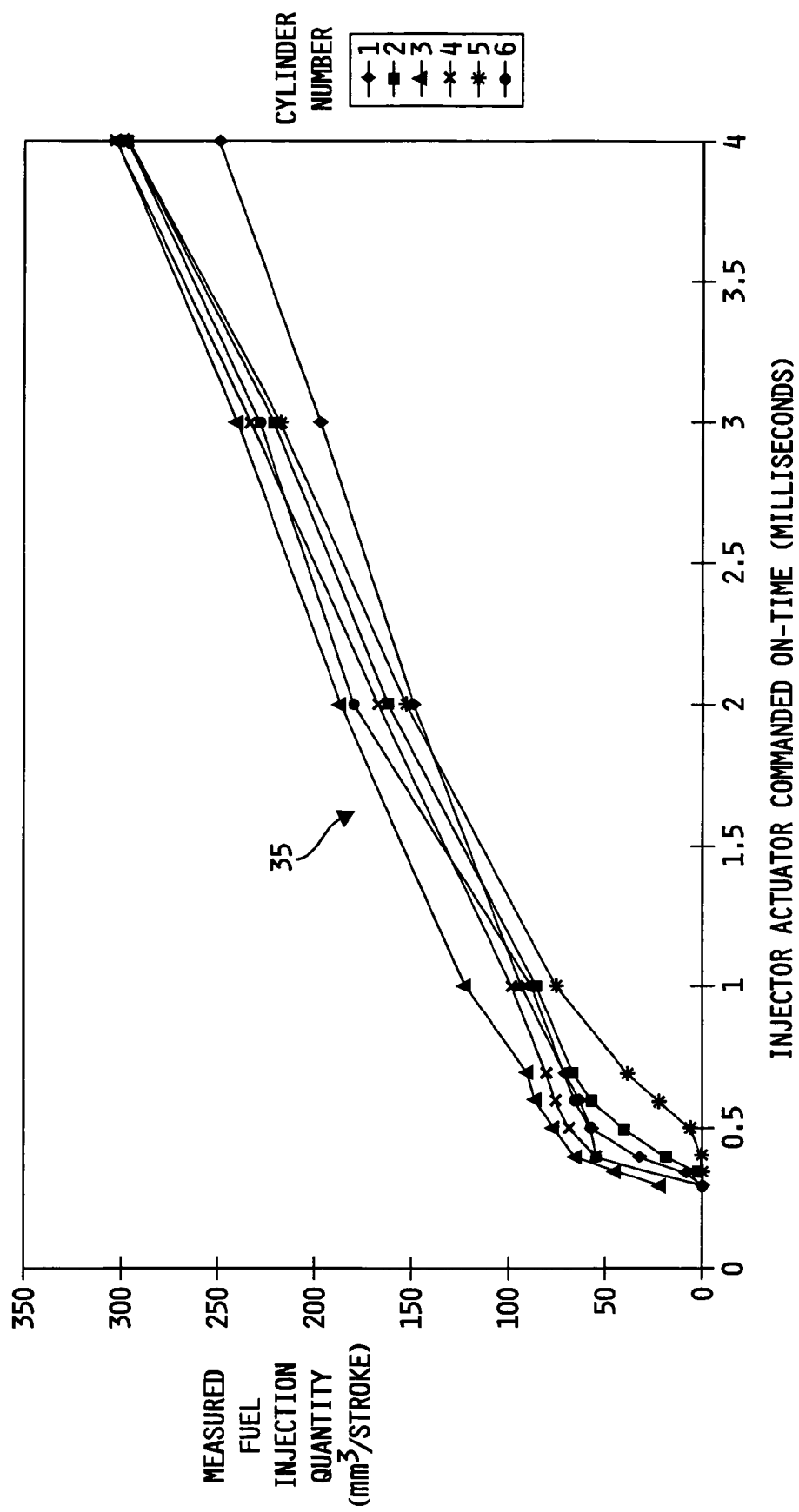
FIG. 16 is a plot of measured fuel injection quantity by cylinder vs. commanded injector on-time for a known fuel injection control system.
Figure 17:
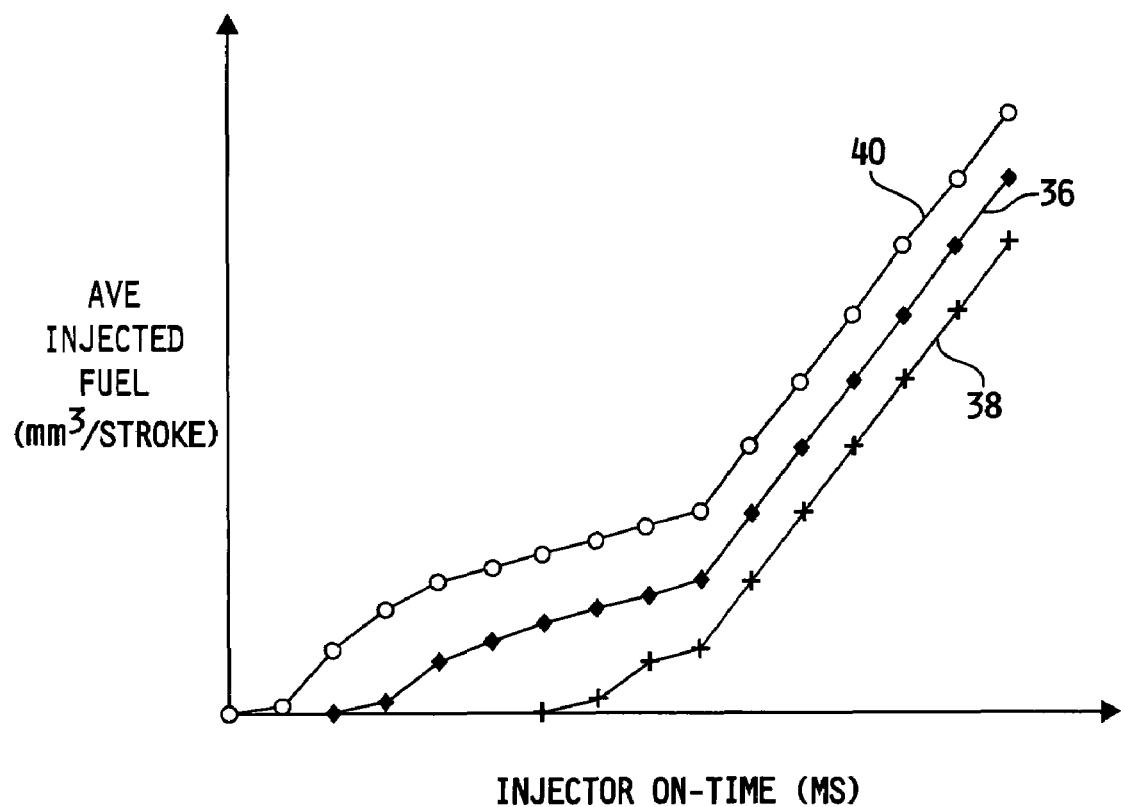
FIG. 17 is a plot of average fuel injection quantity vs. injector on-time illustrating engine fueling extremes for a known fuel injection control system.

Block 146 further includes an injection event-based control flow leakage estimation block 186 that is responsive to the $P_{INJ}$ value on signal path 184 and the commanded fueling signal (injector on-time signal) on signal path 134 to produce a control flow leakage estimate value for each injection event ($CFLE_{IE}$) on signal path 190. In one embodiment, block 186 comprises a two-dimensional look-up table having as table inputs the average injection pressure ($P_{INJ}$) and the injector on-time signal (IOT) and having as the table output the control flow leakage estimate value $CFLE_{IE}$. It is to be understood, however, that such a lookup table represents only one preferred embodiment of block 186, and that the present invention contemplates other techniques for determining the $CFLE_{IE}$ values. Examples of such other techniques include, but are not limited to equations, other tables, graphs and/or the like, wherein such equations, other tables, graphs and/or the like are intended to fall within the scope of the present invention. Optionally, as shown in phantom in FIG. 14, block 186 may be configured to receive the engine temperature (or fuel temperature) signal ET via signal path 90, in which case block 186 may comprise a three-dimensional look-up table or the like. In any case, signal path 190 is connected to an input of a summing node 188, wherein summing node 188 is operable to sum each of a number, N, of individual control flow leakage estimates $CFLE_{IE}$, wherein N may be any positive integer, with N=4 being a typical value. The output of summing node 188 is connected to signal path 148 and is the control flow leakage estimate CFLE that is supplied to summing node 142 of FIG. 5. Preferably, a cylinder balancing algorithm is executed in all embodiments of the present invention that include the control flow leakage estimation block 146, wherein one particularly useful cylinder balancing algorithm is described in U.S. Pat. No. 6,021,758, which is assigned to the assignee of the present invention, and the disclosure of which are incorporated herein by reference. While a cylinder balancing algorithm is not required with the present invention, such an algorithm will act to tighten up the distribution of between-cylinder fuel injection amounts illustrated in FIG. 16.

Figure 15:
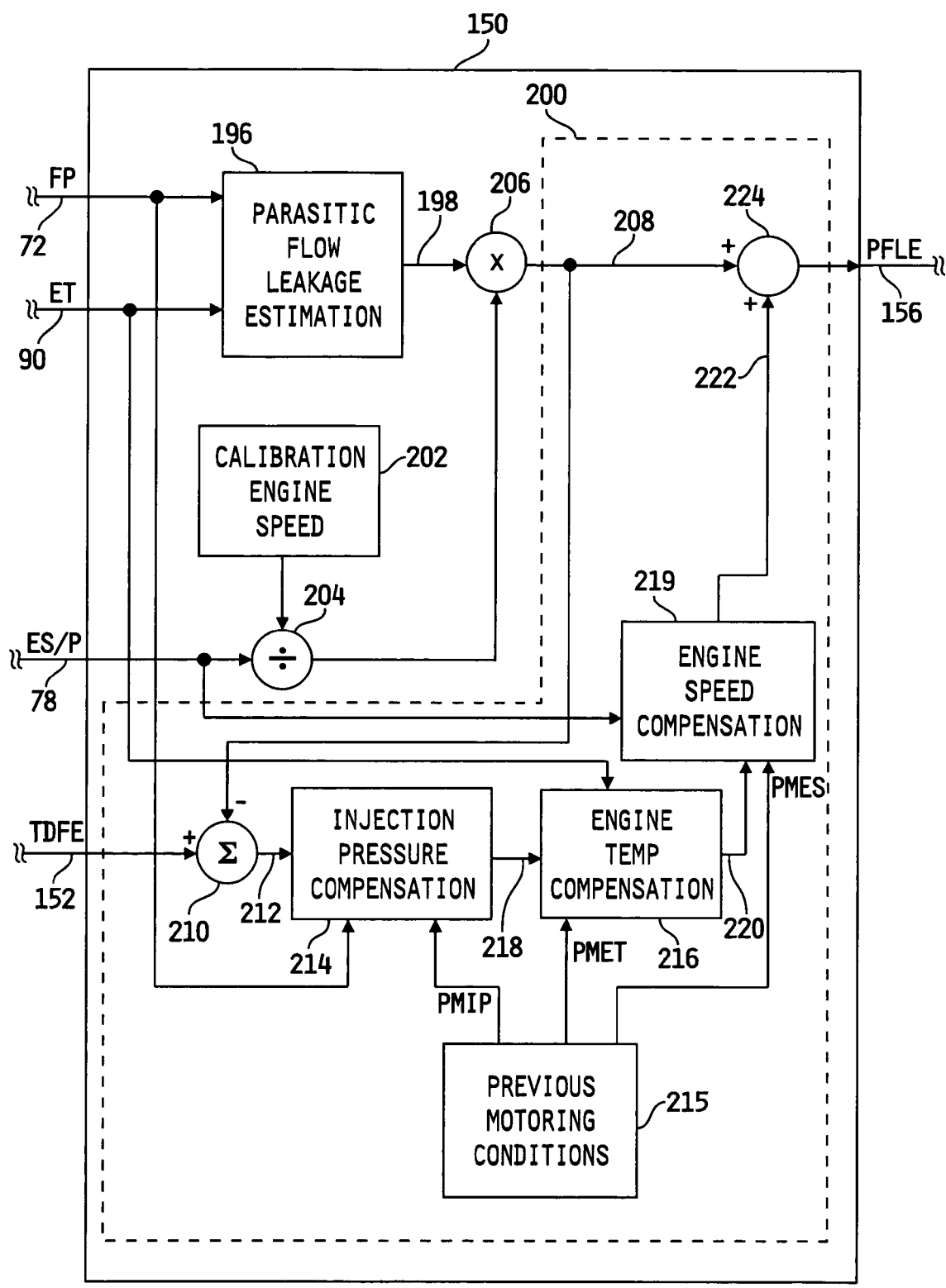
FIG. 15 is a diagrammatic illustration of one embodiment of the parasitic flow leakage estimation block of FIG. 5, in accordance with the present invention.

Referring now to FIG. 15, one preferred embodiment of the parasitic flow leakage estimate block 150 of FIG. 5, in accordance with the present invention, is shown. In many fuel systems, fuel injector 60 (FIGS. 1A and 1B) includes an intensifier (plunger or the like) as briefly described hereinabove, wherein the intensifier acts to increases fuel pressure beyond that of the fuel collection unit prior to injection. With such injectors, parasitic fuel leakages tend to occur about the intensifier area, wherein such parasitic leakage is typically a function of fuel pressure and engine or fuel temperature. Accordingly, block 150 includes a parasitic flow leakage estimation block 196 receiving the fuel pressure signal (FP) via signal path 72 and the engine temperature signal ET (e.g., fuel temperature signal or engine coolant temperature signal) via signal path 90, and producing a parasitic flow leakage estimate on output signal path 198 as a function of FP and ET. In one embodiment, block 196 is a two-dimensional lookup table having as inputs FP and ET, and producing a parasitic flow leakage estimate value as an output thereof. It is to be understood, however, that such a look-up table represents only one preferred embodiment of block 196, and that the present invention contemplates other techniques for determining the parasitic flow leakage estimate values. Examples of such other techniques include, but are not limited to equations, other tables, graphs and/or the like, wherein such equations, other tables, graphs and/or the like are intended to fall within the scope of the present invention.

In one embodiment, the parasitic flow leakage estimation block 196 is defined at a specific or calibration engine speed value. In this embodiment, that calibration engine speed value is preferably stored in block 202 and provided to one input of a division node 204. Another input of division node 204 receives the engine speed/position signal (ES/P) via signal path 78 such that an output of division node 204 carries a ratio of the calibration engine speed divided by the current engine speed ES/P. This ratio is provided to one input of a multiplication node 206 having another input receiving the parasitic flow leakage estimate value on signal path 198, whereby the output of multiplication node 208 carries the parasitic flow leakage estimate value multiplied by the ratio of the calibration engine speed divided by the current engine speed. In this manner, the parasitic flow leakage estimation value on signal path 208 is adjusted by the current engine speed value ES/P. Those skilled in the art will recognize other techniques for maintaining an accurate parasitic flow leakage estimation with respect to current engine speed, and such other techniques are intended to fall within the scope of the present invention. In any case, signal path 208 is connected, in one embodiment, directly to signal path 156 such that the parasitic flow leakage estimation output of the multiplication node 206 forms the parasitic flow leakage estimation value (PFLE) provided to summing node 142 of FIG. 5.

In an alternate embodiment, the parasitic flow leakage estimate block 150 may additionally include a control structure for adjusting the parasitic flow leakage estimation value produced by multiplication node 206 based on changes in engine operating temperature, total discharged fuel estimate value TDFE and/or engine speed/position ES/P. An example of one embodiment of such a control structure is illustrated in FIG. 15 as encompassed by dashed-lined box 200, wherein the control strategy illustrated therein is operable to collect certain operating parameters during vehicle motoring conditions (i.e., final commanded fueling=zero), and adjust the parasitic flow leakage estimation value produced by block 196. In this embodiment, signal path 208 is connected to an additive input of a summing node 224 and to an subtractive input of another summing node 210. A non-inverting input of summing node 210 receives the total discharged fuel estimate value TDFE via signal path 152 and an output of node 210 provides an error signal, corresponding to the difference between TDFE and the parasitic leakage flow estimation produced at the output of multiplication node 206, to a first input of an injection pressure compensation block 214. A second input of block 214 receives the fuel pressure signal (FP) via signal path 72, and a third input of block 214 receives a previous motoring injection pressure value PMIP from a previous motoring conditions block 215, wherein block 215 is operable, in part, to collect and store the fuel pressure value (FP) from a previous vehicle motoring condition. In one embodiment, the injection pressure compensation block 214 comprises a fuel injection pressure compensation equation of the form $P_{COMP}=1+a^*(FP-PMIP)$, wherein a is a calibratible constant and $P_{COMP}$ is a fuel pressure compensation value output by block 214 on signal path 218. Those skilled in the art will recognize, however, that the foregoing equation may be replaced with one or more other equations, tables, graphs, or the like, and that such other equations, tables, graphs, or the like are intended to fall within the scope of the present invention. Block 214 is operable to multiply the error value on signal path 212 by the fuel pressure compensation value $P_{COMP}$ and produce a first resultant error value on signal path 218.

Signal path 218 is connected to a first input of an engine temperature compensation block 216. A second input of block 216 receives the engine temperature signal ET via signal path 90, and a third input of block 216 receives a previous motoring engine temperature value PMET from the previous motoring conditions block 215, wherein block 215 is operable, in part, to collect and store the ET value from a previous vehicle motoring condition. In one embodiment, the engine temperature signals ET and PMET correspond to fuel temperatures and engine temperature compensation block 216 comprises a fuel temperature compensation equation of the form $FT_{COMP}=1+a^*(ET-PMET)$, wherein a is a calibratible constant and $FT_{COMP}$ is a fuel temperature compensation value output by block 216 on signal path 220. Those to skilled in the art will recognize, however, that the foregoing equation may be replaced with one or more other equations, tables, graphs, or the like, and that such other equations, tables, graphs, or the like are intended to fall within the scope of the present invention. Alternatively, block 216 may be operable to compute an engine temperature compensation value $ET_{COMP}$ and provide $ET_{COMP}$ on signal path 220, wherein ET and PMET are engine coolant temperature values. In any case, block 216 is operable to multiply the first resultant error value on signal path 218 by the fuel temperature compensation value $FT_{COMP}$ (alternatively by the engine temperature compensation value $ET_{COMP}$) to produce a second resultant error value on signal path 220.

Signal path 220 is connected to a first input of an engine speed compensation block 219. A second input of block 219 receives the engine speed/position signal ES/P via signal path 78, and a third input of block 219 receives a previous motoring engine speed value PMES from the previous motoring conditions block 215, wherein block 215 is operable, in part, to collect and store the ES value from a previous vehicle motoring condition. In one embodiment, the engine speed compensation block 219 comprises a multiplier operable to multiply the second resultant error value on signal path 220 by a ratio of ES/P and PMES, and produce as an output on signal path 222 a third resultant error value. Those skilled in the art will recognize, however, that the foregoing table may be replaced with one or more other tables, equations, graphs, or the like, and that such other tables, equations, graphs, or the like are intended to fall within the scope of the present invention.

Signal path 222 is connected to a second additive input of summing node 224, wherein an output of node 224 defines signal path 156 which carries the parasitic flow leakage estimate value PFLE. In this embodiment, summing node 224 thus adds the parasitic flow leakage estimation value produced by multiplication node 206 to the third resultant error value to thereby produce an adjusted parasitic leakage flow estimation value PFLE on signal path 156. Optional block 200 is thus operable to compensate for instantaneous changes in the fuel pressure signal (FP), the engine temperature signal (ET) and the engine speed signal (ES/P) since the most recent vehicle motoring condition, and adjust the parasitic leakage flow estimation value produced by multiplication node 206 accordingly. It is to be understood that, in this embodiment, block 200 operates continuously, and that preferably summing node 210 operates, and block 215 updates, during every vehicle motoring condition.

Figure 18:
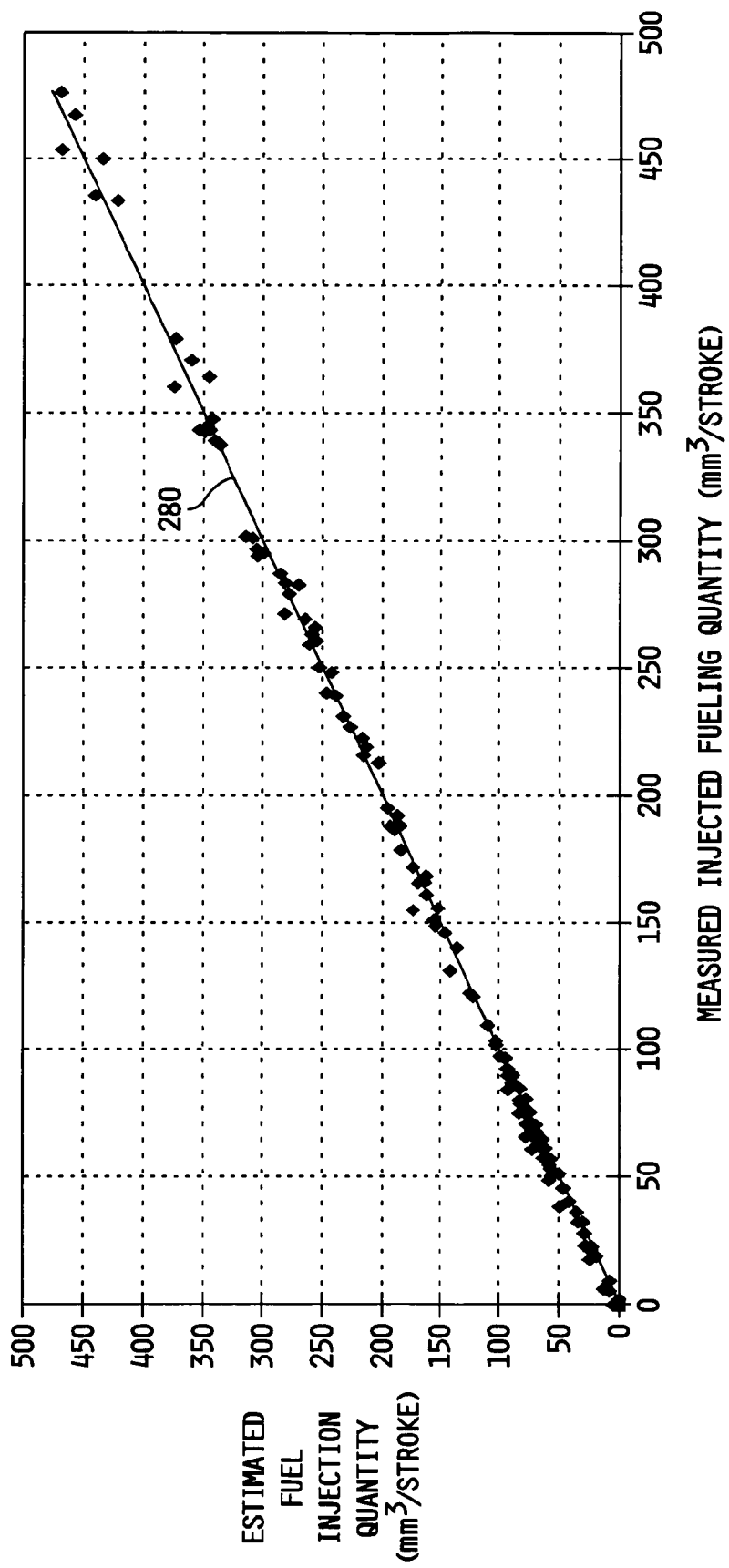
FIG. 18 is a plot of estimated fuel injection quantity vs. measured fuel injection quantity using the fuel injection control strategy of the present invention.
Figure 19:
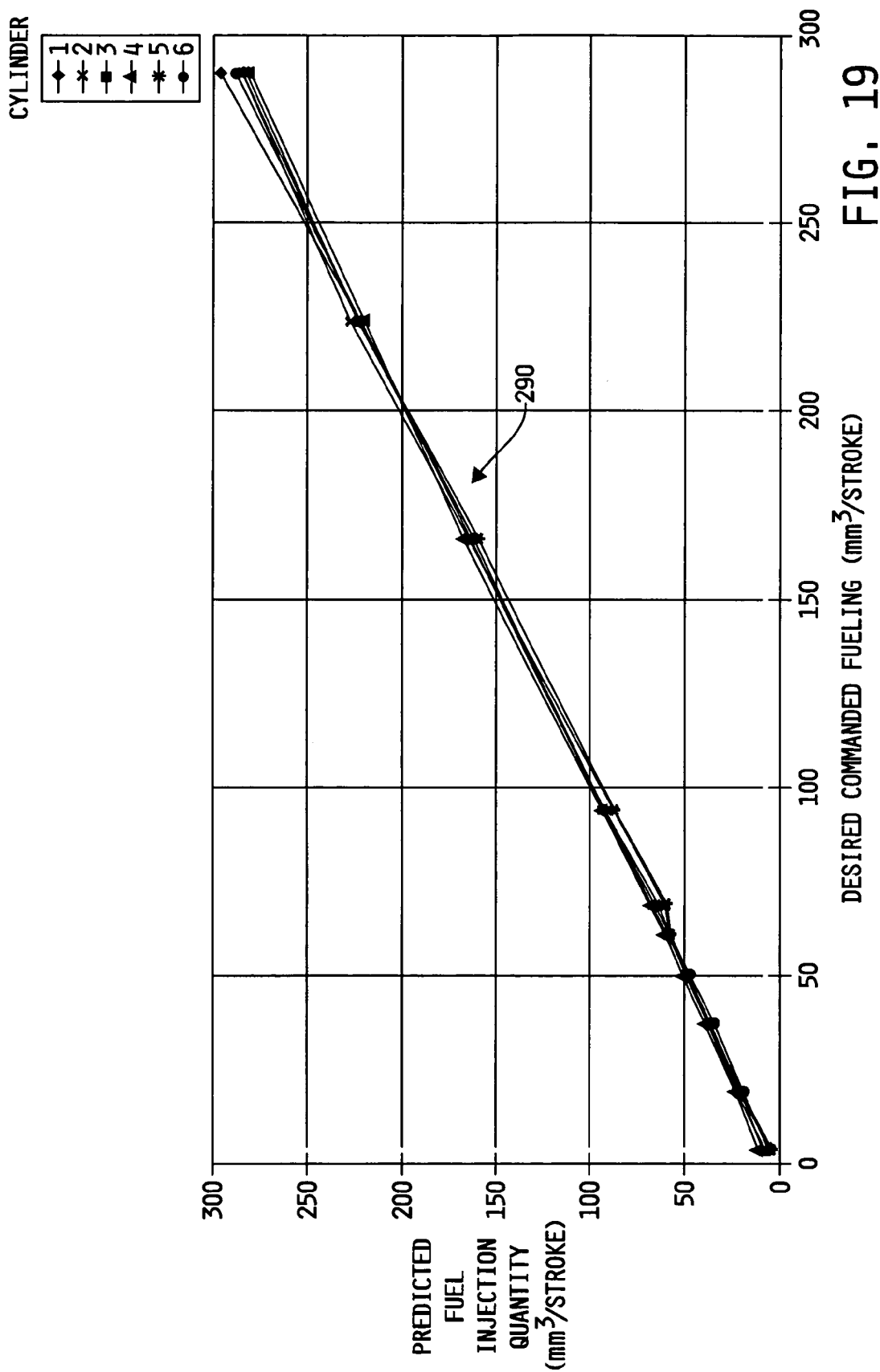
FIG. 19 is a plot of predicted fuel injection quantity vs. desired commanded fueling per cylinder using the fuel injection control strategy of the present invention.

Referring now to FIG. 18, a plot of estimated fuel injection quantity, using the control structure illustrated in FIG. 5 versus measured injected fuel quantity is shown. As is evident from the curve fitted line 280, the control strategy of the present invention for estimating injected fuel quantity tracks very closely with actual (measured) injected fuel quantities. Referring to FIG. 19, predicted fuel injection quantity is plotted against desired commanded fueling for each cylinder of a six-cylinder engine. The six tightly grouped lines 290 indicate that the within engine injected flow variability is quite low using the control concepts of the present invention.

Figure 20:
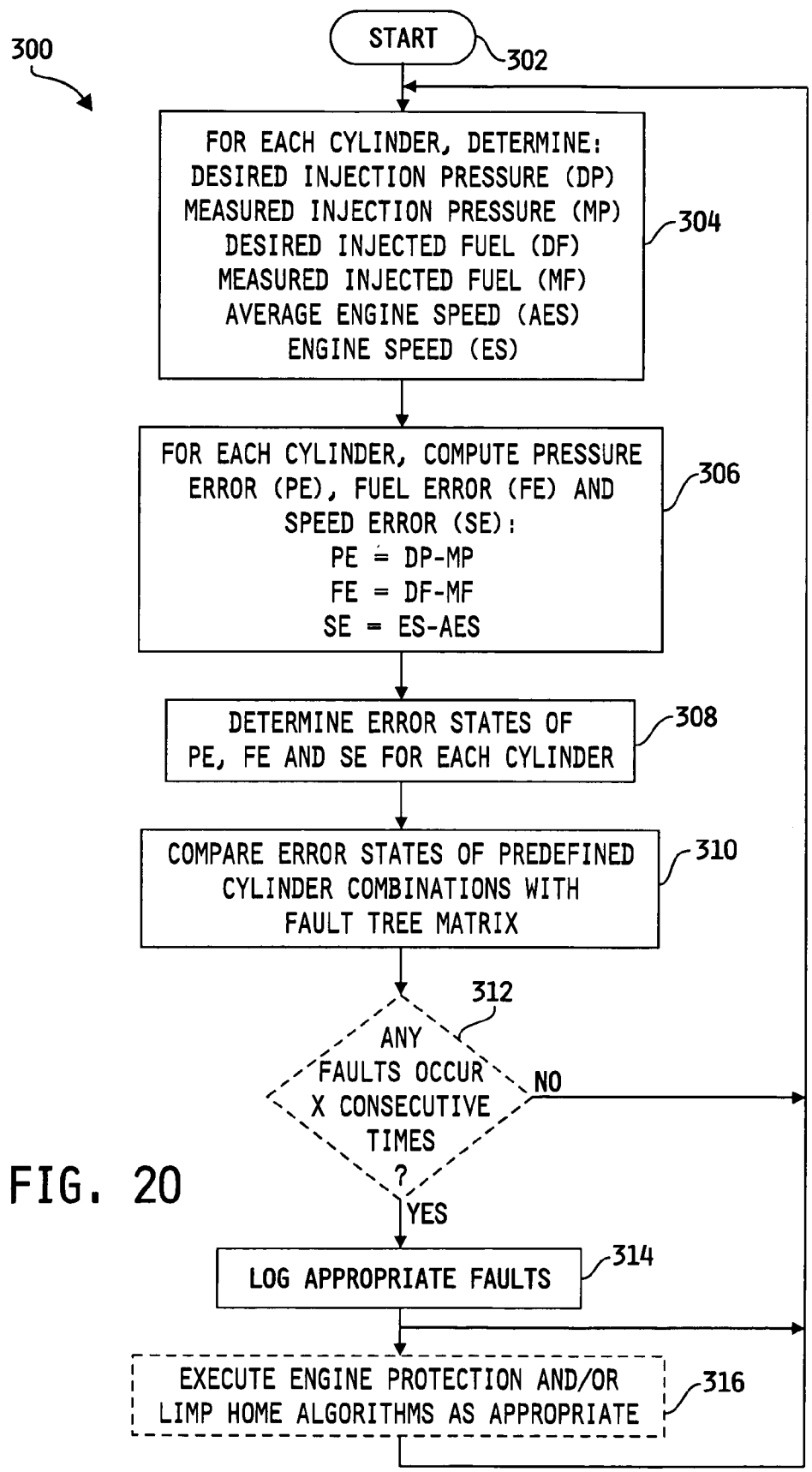
FIG. 20 is a flowchart illustrating one embodiment of a software algorithm for diagnosing operational errors in a fuel injection control system, in accordance with the present invention.

The use of a virtual sensor for estimating injected fuel quantities, such as that shown in FIGS. 4–6 and 14–15, in a system wherein the injected fueling quantity and injection pressure can be changed instantaneously, allows for component level diagnostics with very fast failure detection. Referring to FIG. 20, a software algorithm 300 is illustrated for diagnosing component level fuel system failures which is applicable to any fuel system, such as that described herein, in which accurate measurements of injected fueling and injection pressure are available (either via real or virtual measurements) and in which injection pressure and injected fuel quantity can be changed instantaneously within one firing cycle. Algorithm 300 is preferably stored within memory 75 of control circuit 68, and is preferably executed every firing cycle. Algorithm 300 starts at step 302, and at step 304 control circuit 68 is operable to determine for each cylinder a number of control parameters. For example, control circuit 68 is operable at step 304 to determine a desired injection pressure (DP), which is a value determined by control circuit 68 and used to control pump actuator 53 via signal path 74 as is known in the art. Additionally, control circuit 68 is operable at step 304 to determine a measured injection pressure (MP) which, in one embodiment, is the pressure signal provided by sensor 70, 96 or 100 and multiplied by the intensification ratio of the intensifier associated with fuel injector 60. Control circuit 68 is further operable at step 304 to determine a desired injected fuel value (DF), which is preferably the value produced by block 16 of FIG. 4. Additionally at step 304, control circuit 68 is operable to determining measured injected fuel value (MF) which, in one embodiment, is the injected fuel estimation value (IFE) produced by the fuel injection quantity estimation block 132 of FIG. 4. Alternatively, the system of FIG. 1A or 1B may include known structure for measuring injected fuel quantities wherein control circuit 68 may be operable in such an embodiment to determine MF by directly measuring injected fuel quantities. In any case, control circuit 68 is further operable at step 304 to determine an average engine speed based on the engine speed/position signal ES/P provided by engine speed/position sensor 76 on signal path 78, wherein the average engine speed (AES) is the engine speed averaged over one engine cycle. Additionally, control circuit 68 is operable at step 304 to determine an engine speed value (ES), which is preferably the engine speed determined from engine speed/position signal ES/P on signal path 78 and averaged over one firing cycle of engine 66.

Algorithm execution continues from step 304 at step 306 where the control circuit 68 is operable to determine, for each cylinder, a pressure error (PE), a fuel error (FE) and a speed error (SE). Preferably, PE is determined in step 306 as a difference between DP and MP, FE is determined as a difference between DF and ME, and SE is determined as a difference between ES and AES. Algorithm execution continues from step 306 at step 308 where control circuit 68 is operable to determine error states of the pressure error (PE), fuel error (FE) and speed error (SE) for each cylinder. Referring to FIG. 21, one embodiment of step 308 is illustrated wherein control circuit 68 is operable to determine error states as one of high, low or normal. For example, referring to the pressure error (PE), control circuit 68 is operable at step 308 to determine that the PE state is high if PE is greater than a first pressure error threshold (PE threshold 1), the PE state is low if PE is less than a second pressure error threshold (PE threshold 2), and the PE state is normal if PE is between PE threshold 1 and PE threshold 2. Error states for FE and SE are preferably determined at step 308 in a manner identical to that illustrated with respect to the pressure error state PE.

Referring again to FIG. 20, algorithm 300 continues from step 308 at step 310 where control circuit 68 is operable to compare the error states of predefined cylinder combinations with a fault tree matrix. Referring to FIG. 22, an example of step 310 is illustrated, wherein, for example, control circuit 68 is operable to compare the PE state, FE state, and SE state of cylinders 1, 2 and 3 with predetermined error states therefor to determine various faults. As shown in FIG. 22, for example, normal PE, FE and SE states for cylinders 2 and 3 while the PE state for cylinder 1 is low with the FE and SE states being high corresponds to an over-fueling fault for cylinder 1. As another example, normal/low PE states for cylinders 1, 2 and 3 and high FE states for cylinders 1, 2 and 3 while the SE state for cylinders 1 and 2 is normal with the SE state for cylinder 3 being high corresponds to a continuously over-fueling fault for cylinder 3. Those skilled in the art will recognize that other combinations of PE, FE and SE states for various cylinder combinations can be used to define other fuel system fault, and that other such fault combinations are intended to fall within the scope of the present invention.

Referring again to FIG. 20, algorithm execution continues, in one embodiment, from step 310 at step 314 where control circuit 68 is operable to log appropriate faults as defined and determined at step 310. Alternatively, algorithm 300 may include an optional step 312 wherein control circuit 68 is operable to determine whether any of the faults determined at step 310 occur some number, X, of consecutive times through algorithm 300. If not, algorithm execution continues back to step 304, and if, at step 312, control circuit 68 determines that any faults determined at step 310 have occurred X consecutive times, only then does algorithm execution continue to step 314 where appropriate faults are logged within memory 75 of control circuit 68. In either case, step 314 loops back to step 304 for repeated execution of algorithm 300. In another alternative embodiment, algorithm 300 may include optional step 316 wherein control circuit 68 is operable, after logging appropriate faults at step 314, to execute engine protection and/or limp home algorithms as appropriate and as based on the severity of faults determined at step 310. Algorithm execution loops from step 316 back to step 304 for continued execution of algorithm 300.

Figure 23:
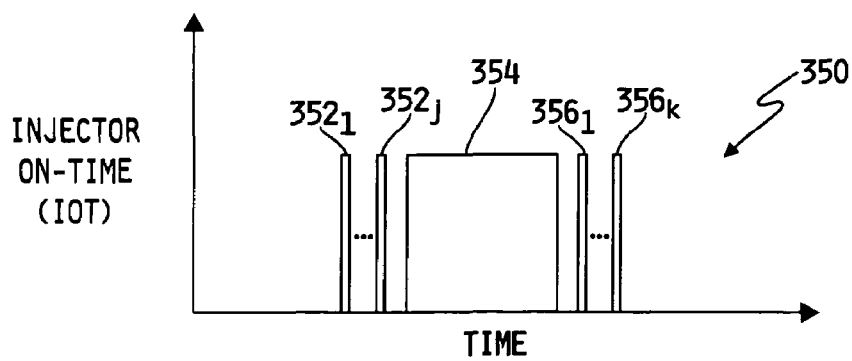
FIG. 23 is a plot of injector on-time vs. time illustrating a main-injection on-time pulse, any number of pilot or pre-injection on-time pulses and any number of post-injection on-time pulses that may comprise a single fuel injection event.

Referring now to FIG. 23, a plot of injector on-time, IOT, vs. time is shown illustrating an injector on-time signal 350 for one fuel injection event by a single fuel injector 60. Each of the fuel injectors carried by engine 66 are responsive to similar injector on-time signals to supply fuel to the engine 66. The injector on-time signal 350 will typically include a so-called main-injection on-time 354, and may further include any number of pre- or pilot-injection on-times $352_1$–$352_j$, and/or any number of post-injection on-times $356_1$–$356_k$, wherein "j" and "k" may be any integers greater than or equal to zero. For example, in the simplest embodiment, j=k=0, and the injector on-time signal 350 includes only the main-injection on-time 354. In another embodiment, j=0 and k=1, and the injector on-time signal 350 accordingly includes the main-injection on-time 354 and a post-injection on-time $356_1$. In yet another embodiment, j=k=1, and the injector on-time signal therefore includes a pre- or pilot-injection on-time $352_1$, the main-injection on-time 354 and a post-injection on-time $356_1$. In general, the injector on-time signal 350 may accordingly include the main-injection on-time 354, and any number of pre- or pilot-injection on-times and/or any number of post-injection on-times.

Figure 24A:
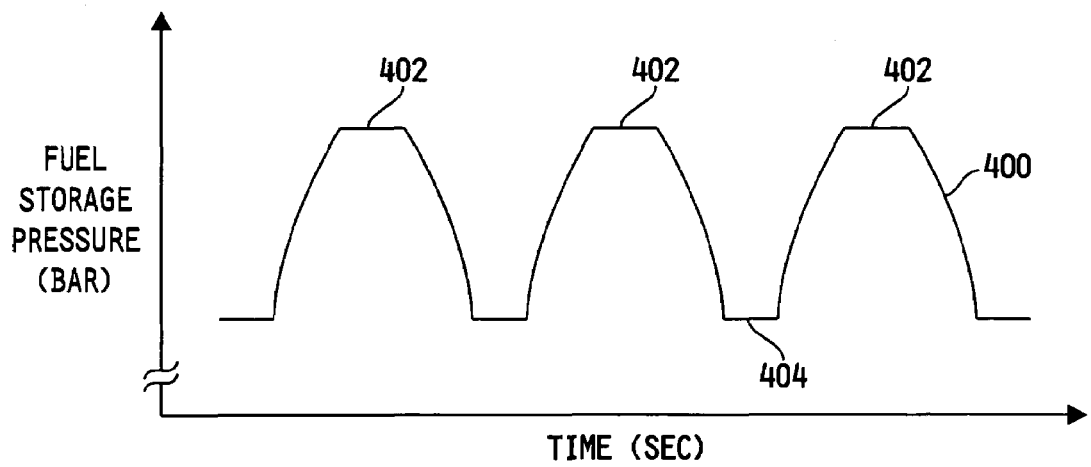
FIG. 24A is a plot of fuel pressure in the fuel collection unit vs. time illustrating cyclic fuel pumping operation at low-to-moderate engine speeds.

Referring now to FIG. 24A, a plot of fuel pressure 400 within the fuel collection unit; e.g., accumulator 56 (FIG. 1A), fuel rail 92 (FIG. 1B), fuel storage portion of fuel injector 60 (FIGS. 1A and 1B), etc., vs. time is shown. Fuel pressure waveform 400 includes periodic peaks 402 and valleys 404 resulting from the cyclic operation of the fuel pump 54 as described hereinabove. In the plot of fuel pressure 400 illustrated in FIG. 23, engine speed is at a low level, and differences in the peaks 402 and valleys 404 of the fuel pressure waveform 400 are sufficiently separated so that no overlap exists between the pumping action of the fuel pump 54 and injection of fuel by any of the fuel injectors 60, even in embodiments where the injector on-time signal, IOT, includes a main-injection on-time, and any number of pre- or pilot-injection on-times and/or any number of post-injection on-times. Hereinafter, any such number of pre- or pilot-injection events and corresponding pre- or pilot-injection on-times and/or post-injection events and corresponding post-injection on-times may be collectively referred to as auxiliary-injection events having corresponding auxiliary-injection on-times.

Figure 24B:
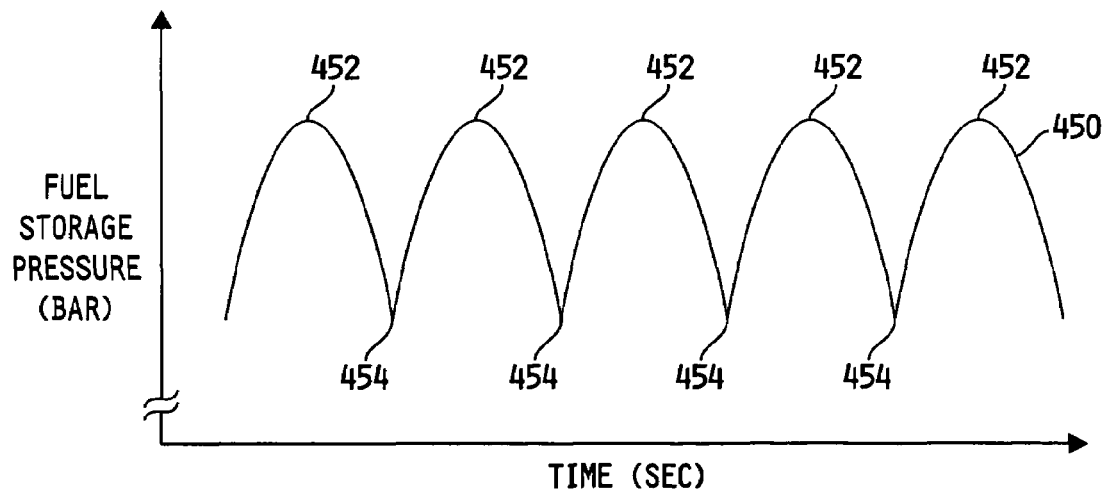
FIG. 24B is a plot of fuel pressure in the fuel collection unit vs. time illustrating cyclic fuel pumping operation at high engine speeds.

Referring to FIG. 24B by contrast, another plot of fuel pressure 450 within the fuel collection unit vs. time is shown, wherein fuel pressure waveform 450 likewise includes periodic peaks 452 and valleys 454 resulting from the cyclic operation of the fuel pump 54. In the plot of fuel pressure 450 illustrated in FIG. 24, engine speed is at a moderate-to-high level, and the injector on-time signal, IOT, includes a main-injection on-time, and may include any number of auxiliary-injection on-times. Under such conditions, the pumping action of the fuel pump 54 may overlap fuel injection by the fuel injectors 60, as illustrated in FIG. 24 by the overlapping valleys 454 in the fuel pressure waveform 450, which results in corruption of the fuel pressure differential measurements describe hereinabove. Consequently, this condition causes inaccuracies in the injected fuel quantity estimations described herein when the injector on-time signals, IOT, include both main- and auxiliary-injection on-times, and which then leads to cylinder-to-cylinder and engine-to-engine post-injection fueling variations, cylinder-to-cylinder engine power output variations and non-optimal emission control strategies in a closed-loop fueling control system. It is therefore desirable to accurately estimate such auxiliary-injected fuel quantities, and to minimize auxiliary-injected fueling variations to improve the accuracy of injected fuel quantity estimates, and accordingly minimize cylinder-to-cylinder and engine-to-engine fueling and power variations, and improve emission control strategies.

Figure 25:
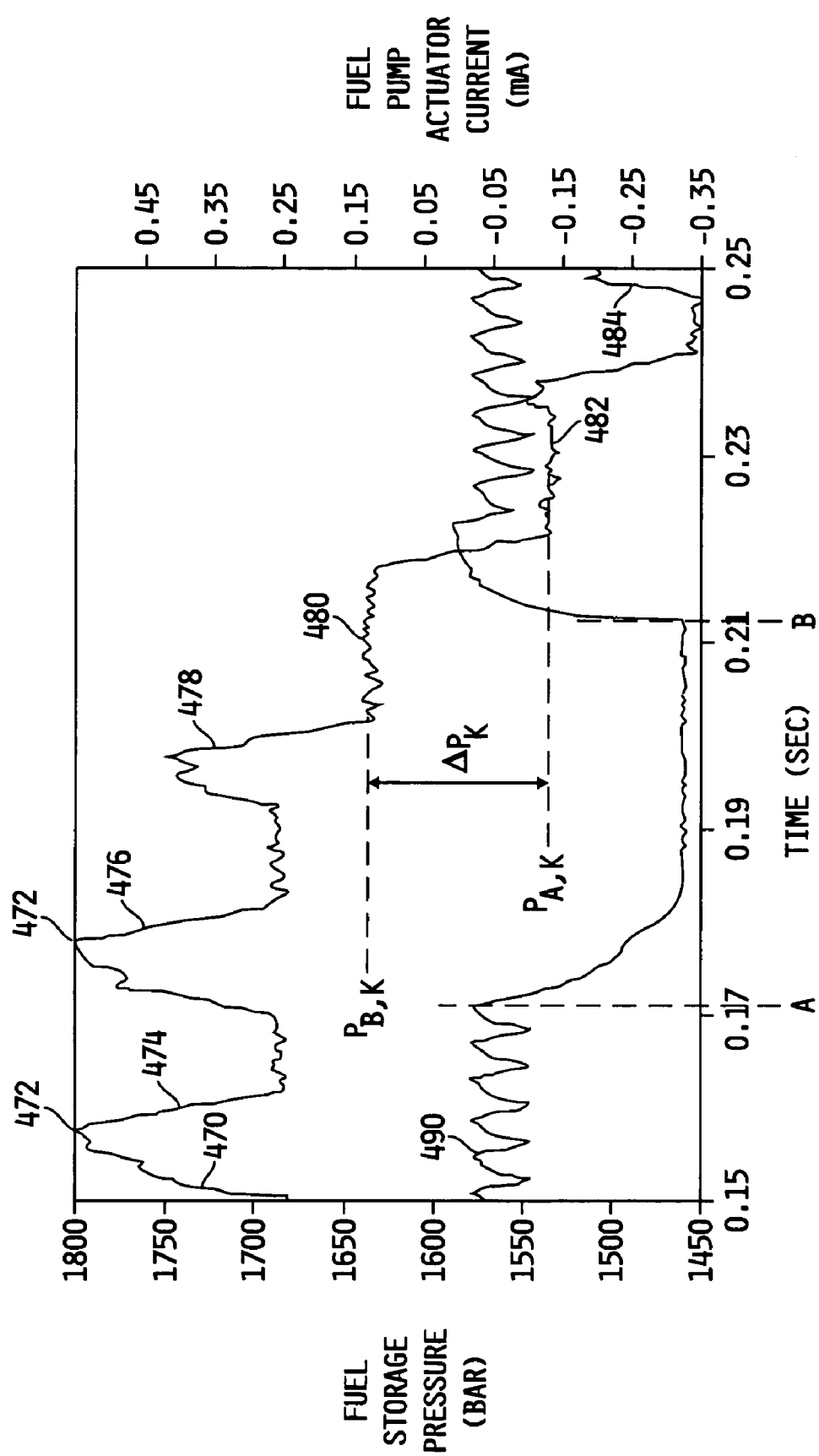
FIG. 25 is a plot of fuel pressure in the fuel collection unit and fuel pump actuator current vs. time illustrating a technique for determining a pressure differential across a single fuel injection event while the fuel pump is disabled.

Referring to FIG. 25, a plot of fuel pressure within the fuel collection unit and fuel pump actuator current vs. time is shown illustrating a technique for estimating auxiliary-injection fuel quantities and minimizing auxiliary-injected fueling variations arising from fuel pumping and fuel injection overlap conditions of the type illustrated and described with respect to FIG. 24. The technique illustrated in FIG. 25 is applicable in systems including both main-injected and auxiliary-injected fueling events; e.g., wherein the injector on-time signal, IOT, includes both main-injection and auxiliary-injection on-times.

In such systems, accurate estimation of such auxiliary-injected fuel quantities and minimization of such auxiliary-injected fueling variations increases the accuracy of overall injected fuel quantity estimations using the techniques described hereinabove with respect to FIGS. 1–19.

In accordance with the technique illustrated in FIG. 25, the control circuit 68 is operable to selectively and momentarily disable operation of the fuel pump 54, and then to measure the fuel pressure in the fuel collection unit just before and just after a fuel injection event of a selected fuel injector while no fuel pumping is occurring. This guarantees that the operation of the fuel pump 54 will not interfere with the isolated fuel injection event, and therefore will not corrupt the fuel pressure measurements for the selected fuel injector. Similar measurements are obtained for each of the fuel injectors, and the fuel pressure measurements for all of the fuel injectors are then used in a closed-loop control system to adjust the on-times of one or more of the fuel injectors in a manner that minimizes auxiliary-injected fueling variations.

In FIG. 25, the fuel pressure within the fuel collection unit is illustrated by waveform 470, and includes a number of pulses 474, 476 and 478 corresponding to periodic pressure increases in the fuel collection unit resulting from the cyclic action of fuel pumping and injection events. The fuel pump actuator current is illustrated by waveform 490, and represents the operational status; e.g., enabled or disabled, of the fuel pump 54. Those skilled in the art will recognize that the response time of the fuel pump 54 to enablement and disablement thereof will typically vary depending upon the particular application, and that the timing of fuel pump disablement and enablement relative to fuel injection by the selected, e.g., Kth, fuel injector will likewise vary. In any case, it is desirable to disable the fuel pump 54 for a sufficient period preceding fuel injection by the Kth fuel injector to insure that the fuel pressure within the fuel collection unit stabilizes prior to fuel injection by the selected, e.g., Kth, fuel injector.

In the example illustrated in FIG. 25, for example, the fuel pump 54 is disabled, as indicated by the fuel pump actuator current curve 490, at a point "A" in time preceding fuel injection by the Kth fuel injector. Relative to the fuel collection unit pressure waveform 470, point "A" happens to coincide with a rising edge of the pressure pulse 476. After pressure pulse reached peak 472, the fuel collection unit pressure returns to its pre-pump pressure value due to fuel injection by a fuel injector preceding the Kth fuel injector in the fuel injection actuation order. In the example illustrated in FIG. 25, the fuel pump 54 thereafter continues to pump a residual amount of fuel represented by fuel pressure pulse 478, even though the fuel pump 54 is disabled as indicated by waveform 490. Thereafter, the fuel collection unit pressure decreases, as a result of fuel injection by another fuel injector preceding the Kth fuel injector in the fuel injection actuation order, to fuel pressure level 480. At this point, the fuel pump 54 is completely disabled and inactive, and the fuel pressure level in the fuel collection unit remains at the fuel pressure level 480 until fuel injection by the Kth fuel injector. The before-injection fuel pressure within the fuel collection unit prior to fuel injection by the Kth injector, $P_{B,K}$, may thus be measured at any time while the fuel pressure within the fuel collection unit remains at the substantially constant level 480.

With the fuel pump 54 in a non-pumping, inactive state, no fuel is pumped by pump 54 to the fuel collection unit just prior to, during, and just following fuel injection by the Kth fuel injector. Fuel injection by the Kth fuel injector accordingly decreases the fuel pressure in the fuel collection unit from the substantially constant before-injection pressure level 480 to the substantially constant after-injection pressure level 482. The after-injection fuel pressure within the fuel collection unit after fuel injection by the Kth injector, $P_{A,K}$, may thus be measured at any time while the fuel pressure within the fuel collection unit remains at the substantially constant level 482.

The fuel pump 54 is actuated to resume the pumping of fuel following fuel injection by the Kth fuel injector. Again, the response time of the fuel pump 54 to enablement thereof will typically vary depending upon the particular application, and the timing of fuel pump enablement relative to fuel injection by the Kth fuel injector will likewise vary. It is desirable to enable the fuel pump 54 to resume pumping of fuel to the fuel collection unit as soon as practicable following fuel injection by the Kth fuel injector while also avoiding any pumping by fuel pump 54 during the period just preceding and just after fuel injection by the Kth injector. In the example illustrated in FIG. 25, the fuel pump 54 is actually enabled at a point "B" in time preceding fuel injection by the Kth fuel injector, but due to the delayed response time of fuel pump 54, fuel pumping thereby does not resume until well after fuel injection by the Kth fuel injector as indicated by the rising edge 484 of the fuel collection unit fuel pressure waveform 470.

It bears pointing out that the concepts just described with respect to FIGS. 23–25, and that will be further described hereinafter with respect to FIGS. 26–32, have been illustrated in FIGS. 23–25 as they relate to one specific fuel pump control configuration. Although the separation between fuel pumping and fuel injection events under certain operating conditions can easily be discerned in fuel pressure waveform illustrated in FIG. 24A, those skilled in the art will recognize that such separation may not be visible with other fuel pump control configurations; e.g., multiple pumping events per fuel injector, asynchronous fuel pumping, and the like. It will be understood, however, that the concepts described herein with respect to FIGS. 23–32 are applicable to any fuel pump control configuration, and any such alternate fuel pump control configurations are intended to fall within the scope of the appended claims.

Figure 26:
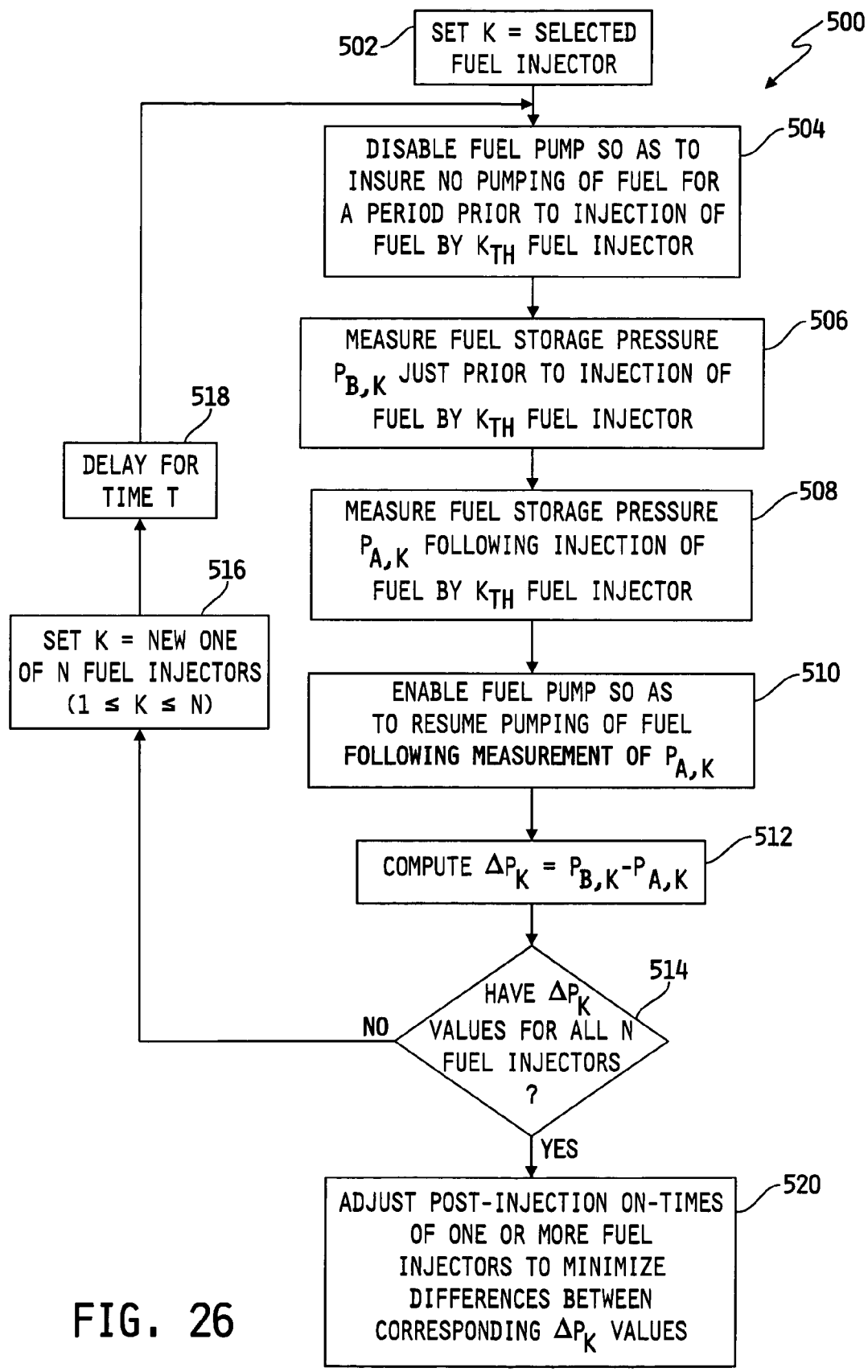
FIG. 26 is a flowchart illustrating one embodiment of a software algorithm for minimizing post-injection fueling variations.

Referring now to FIG. 26, a flowchart is shown illustrating one embodiment of a software algorithm 500 for minimizing post-injected fueling variations in engine 66 using the techniques illustrated and described with respect to FIG. 25. Algorithm 500 may be stored in memory 75 of control circuit 68, and is in any case executed by control circuit 68. Algorithm 500 begins at step 502 where control circuit 68 is operable to set a numerical identifier, "K", equal to a selected one of "N" fuel injectors, wherein K<N. Thereafter, control circuit 68 is operable to disable operation of the fuel pump 54, by appropriately controlling the fuel pump actuator 53, so as to insure no pumping of fuel for a period prior to injection of fuel by the Kth fuel injector 60 as just described with respect to FIG. 25.

Following step 504, control circuit 68 is operable at step 506 to measure the pressure, $P_{B, K}$, in the fuel collection unit after the fuel pressure within the fuel collection unit has stabilized following disablement of the fuel pump 54 and prior to injection of fuel by the Kth fuel injector; e.g., anywhere along the substantially constant fuel pressure line 480 illustrated in FIG. 25. Control circuit 68 is operable to execute step 506 by monitoring the pressure in the fuel collection unit; e.g., via pressure sensor 70 (FIG. 1A), pressure sensor 96 (FIG. 1B) or pressure sensor 100 (FIG. 1B), and capturing $P_{B, K}$ at an appropriate time following disablement of the fuel pump 54; e.g., at point "A" as just described. Thereafter at step 508, control circuit 68 to measure the pressure, $P_{A, K}$, in the fuel collection unit following injection of fuel by the Kth fuel injector and prior to resumed fuel pumping by fuel pump 54; e.g., anywhere along the substantially constant fuel pressure line 482. Control circuit 68 is operable to execute step 508 by monitoring the pressure in the fuel collection and capturing $P_{A, K}$ at an appropriate time following fuel injection by the Kth fuel injector as just described Following step 508, algorithm execution advances to step 510 where control circuit 68 is operable to enable operation of the fuel pump 54 to resume fuel pumping following fuel injection by the Kth fuel injector and measurement of $P_{A, K}$. As described hereinabove with respect to FIG. 25, control circuit 68 may be operable in some embodiments to actually enable the fuel pump 54 before fuel injection by the Kth fuel injector wherein, due to delays in the response to fuel pump 54, it resumes pumping after fuel injection by the Kth fuel injector, and in such embodiments steps 508 and 510 may accordingly be interchanged in their sequence of execution. In any case, control circuit 68 is operable to enable operation of the fuel pump 54 at step 510 by appropriately controlling the fuel pump actuator 53. Thereafter at step 512, control circuit 68 is operable to compute a pressure differential, $\Delta P_K$, according to the equation $\Delta P_K = P_{B, K} - P_{A, K}$. Thereafter at step 514, control circuit 68 is operable to determine whether $\Delta P_K$ values have been obtained for all "N" fuel injectors. If not, algorithm execution advances to step 516 to set the numerical identifier "K" to a new or different one of the "N" fuel injectors, wherein K<N, and to delay for a period T at step 518 before looping back to step 504. If, on the other hand, control circuit 68 determines at step 514 that $\Delta P_K$ values have been obtained for each of the "N" fuel injectors or cylinders, algorithm execution advances to step 520 where control circuit 68 is operable to adjust the post-injection on-time portions of one or more of the injector on-time signals to minimize differences between the "N" $\Delta P_K$ values. In one embodiment, control circuit 68 is operable to execute step 520 according to a conventional closed-loop control strategy that generates error values between the various $\Delta P_K$ values, and uses these error values to drive adjust the post-injection on-time portions of one or more of the injector on-time signals in a manner that drives the error values to zero. Alternatively, control circuit 68 may be configured to implement other known closed-loop, open-loop or other known control strategies to adjust the post-injection on-time portions of one or more of the injector on-time signals in a manner that minimizes differences between the "N" $\Delta P_K$ values.

From the foregoing, it should be apparent that algorithm 500 illustrated in FIG. 26 is operable to adjust one or more of the injector on-time signals, IOT, in a manner that minimizes variations in the pressure differentials across injection events of each of the "N" fuel injectors. This approach ignores any variations in the main-injection on-times, as well as in any pilot-injection on-times, of the various injector on-time signals, and assumes that any such variations are insignificant. In any case, algorithm 500 is operable to minimize cylinder-to-cylinder post-injection fueling variations within engine 66 when such variations are due to differences in post-injected fueling quantities.

Those skilled in the art will recognize that while algorithm 500 is illustrated and described as being operable to minimize post-injection fueling variations, algorithm 500 may be modified to alternatively minimize pre- or pilot-injection fueling variations. For example, step 520 may be modified so that the control circuit 68 is operable to adjust pilot-injection on-times of one or more fuel injectors to minimize differences between corresponding $\Delta P_K$ values. Such a modification would be a mechanical step for a skilled artisan, and control circuit 68 may be configured to implement any known closed-loop, open-loop or other known control strategies to adjust the pilot-injection on-time portions of one or more of the injector on-time signals in a manner that minimizes differences between the "N" $\Delta P_K$ values. This approach ignores any variations in the main-injection on-times, as well as in any post-injection on-times, of the various injector on-time signals, and assumes that any such variations are insignificant. In any case, algorithm 500, modified as just described, is operable to minimize cylinder-to-cylinder pilot-injection fueling variations within engine 66 when such variations are due to differences in pilot-injected fuel quantities.

Figure 27:
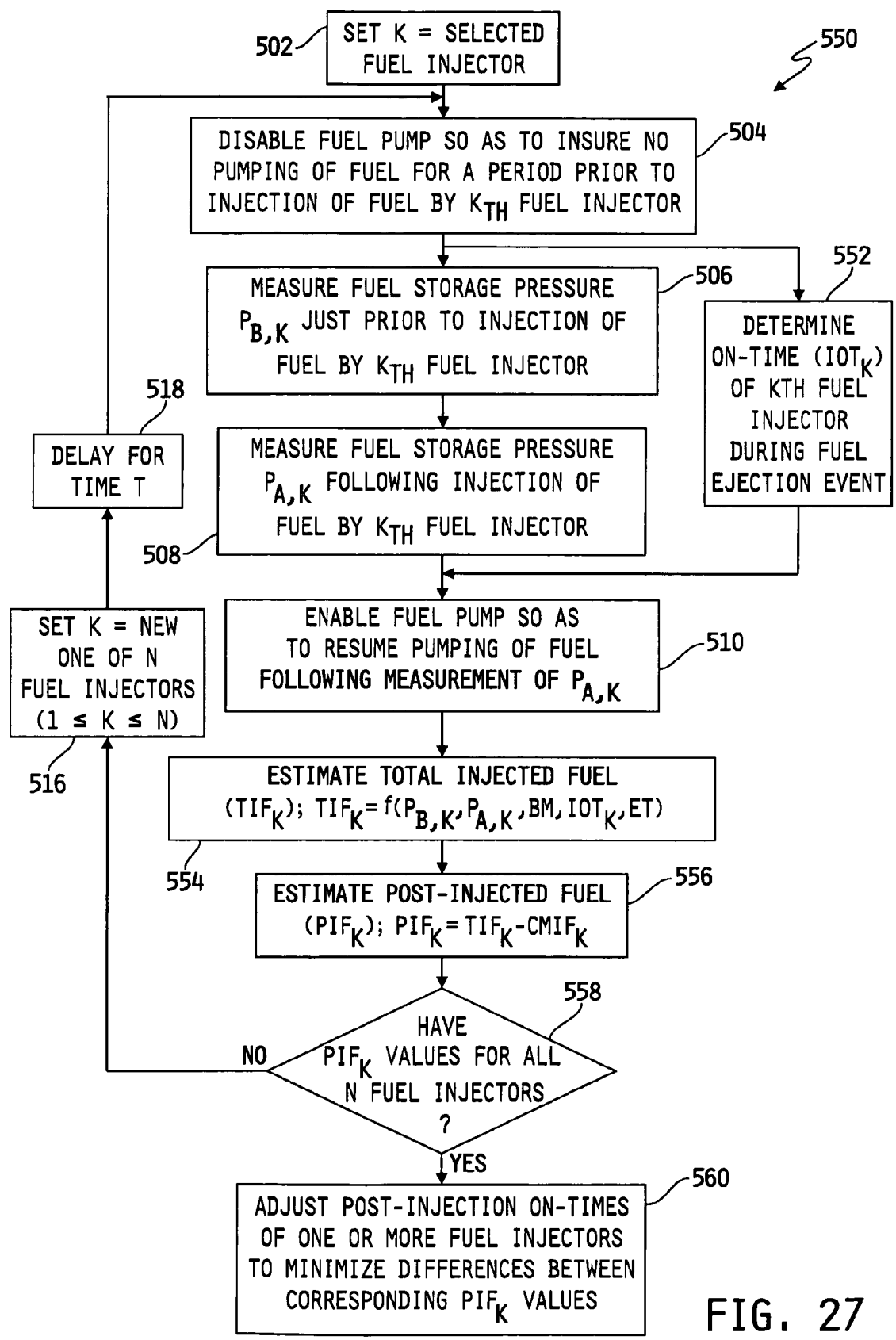
FIG. 27 is a flowchart illustrating an alternate embodiment of a software algorithm for minimizing post-injected fueling variations.

Referring now to FIG. 27, a flowchart is shown illustrating an alternate embodiment of a software algorithm 550 for minimizing post-injection fueling variations using the techniques illustrated and described with respect to FIG. 25. As with algorithm 500, algorithm 550 may be stored in memory 75 of control circuit 68, and is in any case executed by control circuit 68. Algorithm 550 shares many steps in common with algorithm 500, and such common steps are accordingly identified by common reference numbers in the illustration of algorithm 550 in FIG. 27. For example, steps 502–510 and 516–518 of algorithm 550 are identical to steps 502–510 and 516–518 of algorithm 500, and a description of the operation of such steps will not be repeated here for brevity. With regard to steps 502–510, algorithm 550 includes an additional step 552 that is executed in parallel with steps 506 and 508. At step 552, control circuit 68 is operable to determine the on-time, $IOT_K$, of the Kth fuel injector during the fuel injection event wherein the fuel pump 54 is disabled as illustrated and described with respect to FIG. 25. In one embodiment, control circuit 68 is operable to control the injector on-time signal as described hereinabove and particularly with respect to FIG. 4, and in this embodiment control circuit 68 thus has knowledge of $IOT_K$. In embodiments wherein control circuit 68 does not control the injector on-time signal, IOT, control circuit 68 may be configured in a known manner to monitor enablement and disablement of the Kth fuel injector, and to determine $IOT_K$ based on the time difference between enablement and disablement of the Kth fuel injector.

Execution of algorithm 550 advances from step 510 to step 554 where control circuit 68 is operable to estimate a total injected fuel quantity, $TIF_K$, corresponding to the total amount of fuel injected by the Kth fuel injector while the fuel pump 54 is disabled as described hereinabove with respect to FIG. 25. In one embodiment, control circuit 68 is operable at step 554 to estimate $TIF_K$ as a function of $P_{B,K}$, $P_{A,K}$, the bulk modulus value, BM, the injector on-time, $IOT_K$, and the engine temperature value, ET, using any of the techniques described hereinabove with respect to FIGS. 1–19 as they relate to determination of the injected fuel estimate, IFE, produced by the fuel injection quantity estimation logic block first illustrated in FIG. 4. For example, control circuit 68 is operable in this embodiment to estimate a total discharged fuel estimate, $TDFE_K$, as a function of $P_{B,K}$, $P_{A,K}$ and the bulk modulus value, BM, or alternatively only as a function only of $P_{B,K}$ and $P_{A,K}$, to estimate a control flow leakage value, $CFLE_K$, as a function of $P_{B,K}$, $P_{A,K}$ and $IOT_K$, to optionally estimate a parasitic flow leakage value, $PFLE_K$, as a function of $P_{B,K}$, $P_{A,K}$ and the engine temperature value, ET, wherein ET may be the fuel temperature, FT, or the engine coolant temperature, CT, and to compute $TIF_K$ according to the equation $TIF_K = TFD_K - CFLE_K$ or optionally according to the equation $TIF_K = TFD_K - CFLE_K - PFLE_K$, all as described hereinabove with respect to FIGS. 5–19. Alternatively, control circuit 68 may be operable at step 554 to estimate $TIF_K$ in accordance with any known technique for estimating the total fuel injected by the Kth fuel injector while the fuel pump 54 is disabled as described hereinabove with respect to FIG. 25.

In any case execution of algorithm 550 advances from step 554 to step 556 where control circuit 68 is operable at step 556 to estimate a post-injection fuel quantity, $PIF_K$, corresponding to the post-injection fuel quantity injected by the Kth fuel injector between steps 506 and 508 of algorithm 550. In embodiments where the injector on-time signals include post-injection on-times but do not include any pilot-injection on-times, control circuit 68 is operable at step 556 to estimate $PIF_K$ as the total injected fuel quantity, $TIF_K$, estimated at step 554 less a commanded main fuel injection quantity, $CMIF_K$, for the Kth fuel injector, wherein $CMIF_K$ corresponds to a main-injection fuel quantity portion of the desired fuel injection quantity, DF, illustrated and described hereinabove with respect to FIG. 4. Conversely, in embodiments where the injector on-time signals include both post- injection and pilot-injection on-times, control circuit 68 is operable at step 556 to estimate $PIF_K$ as the total injected fuel quantity, $TIF_K$, less the sum of the commanded main fuel injection quantity, $CMIF_K$, and a commanded pilot-injection quantity, $CPLIF_K$, wherein $CPLIF_K$ corresponds to a pilot-injection fuel quantity portion of the desired fuel injection quantity, DF, illustrated and described hereinabove with respect to FIG. 4. In any case, control circuit 68 is operable thereafter at step 558 to determine whether $PIF_K$ values have been determined for all "N" fuel injector or cylinders. If not, algorithm execution loops back to step 504 through steps 516 and 518.

If, on the other hand, control circuit 68 determines at step 558 that $PIF_K$ values have been obtained for each of the "N" fuel injectors or cylinders, algorithm execution advances to step 560 where control circuit 68 is operable to adjust the post-injection on-time portions of one or more of the injector on-time signals to minimize differences between the "N" post-injection fuel quantity values $PIF_K$. In one embodiment, control circuit 68 is operable to execute step 560 according to a conventional closed-loop control strategy that generates error values between the various $PIF_K$ values, and uses these error values to adjust the post-injection on-time portions of one or more of the injector on-time signals in a manner that drives these error values to zero. Alternatively, control circuit 68 may be configured to implement other known closed-loop, open-loop or other known control strategies to adjust the post-injection on-time portions of one or more of the injector on-time signals in a manner that minimizes differences between the "N" $PIF_K$ values.

From the foregoing, it should be apparent that algorithm 550 illustrated in FIG. 27 is operable to adjust one or more of the injector on-time signals, IOT, in a manner that minimizes variations in the estimated post-injection fuel quantity values of each of the "N" fuel injectors. This approach ignores any variations in the main-injection on-time portions, as well as in any pilot-injection on-times, of the various injector on-time signals, and assumes that any such variations are insignificant. In any case, algorithm 550 is operable to minimize cylinder-to-cylinder post-injection fueling variations within engine 66 as well as engine-to-engine post-injection fueling variations when such variations are due to differences in post-injected fuel quantities.

Those skilled in the art will recognize that while algorithm 550 is illustrated and described as being operable to minimize post-injection fueling variations, algorithm 550 may be modified to alternatively minimize pre- or pilot-injection fueling variations. For example, in cases where the injector on-time signals include pilot-injection on-times but not post-injection on-times, step 556 may be modified to estimate a pilot-injected fuel, $PLIF_K$, as a difference between $TIF_K$ and $CMIF_K$. In cases where the injector on-time signals include both a pilot-injection on-time and a post-injection on-time, step 556 may be modified to estimate a pilot-injected fuel, $PLIF_K$ as a difference between the estimated total injected fuel, $TIF_K$, and the sum of the commanded main-injected fuel, $CMIF_K$, and a commanded post-injected fuel, $CPIF_K$, wherein $CPIF_K$ corresponds to a post-injection fuel quantity portion of the desired fuel injection quantity, DF, illustrated and described hereinabove with respect to FIG. 4. In either case, step 560 may be modified so that the control circuit 68 is operable to adjust pilot-injection on-times of one or more fuel injectors to minimize differences between corresponding $PLIF_K$ values. Such modifications would be a mechanical step for a skilled artisan, and control circuit 68 may be configured to implement any known closed-loop, open-loop or other known control strategies to adjust the pilot-injection on-time portions of one or more of the injector on-time signals in a manner that minimizes differences between the "N" $PILF_K$ values. This approach ignores any variations in the main-injection on-time portions, as well as in any post-injection on-times, of the Various injector on-time signals, and assumes that any such variations are insignificant. In any case, this embodiment of algorithm 550 is operable to minimize cylinder-to-cylinder pilot-injection fueling variations within engine 66 as well as engine-to-engine pilot-injection fueling variations when such variations are due to differences in pilot-injected fuel quantities.

In another alternate embodiment, control computer 68 is configured to control operation of the fuel pump 54 and to control the injector on-time signal, IOT, in a manner that provides for the generation of a main-injected fuel quantity estimation model, a post-injected fuel quantity estimation model and a pilot-injected fuel quantity estimation model. These models may then be used under any engine and fuel system operating conditions to estimate post-injected and/or pilot-injected fuel quantities for any of the various fuel injectors carried by engine 66, and such estimates may then be used to minimize post- or pilot-injected fueling variations in any one or more of the various fuel injectors carried by engine 66. In one embodiment, such models may be generated, in a manner to be described hereinafter, at the engine production facility, and thereafter used during operation of the engine to estimate post-injected and/or pilot-injected fuel quantities for any one or more of the various fuel injectors carried by engine 66. In this embodiment, the models may be periodically or otherwise updated at a service facility by operating the engine in a manner to be described hereinafter. In an alternative embodiment, the models may be continually or periodically updated during operation of the engine in a manner to be described hereinafter.

Figure 28:
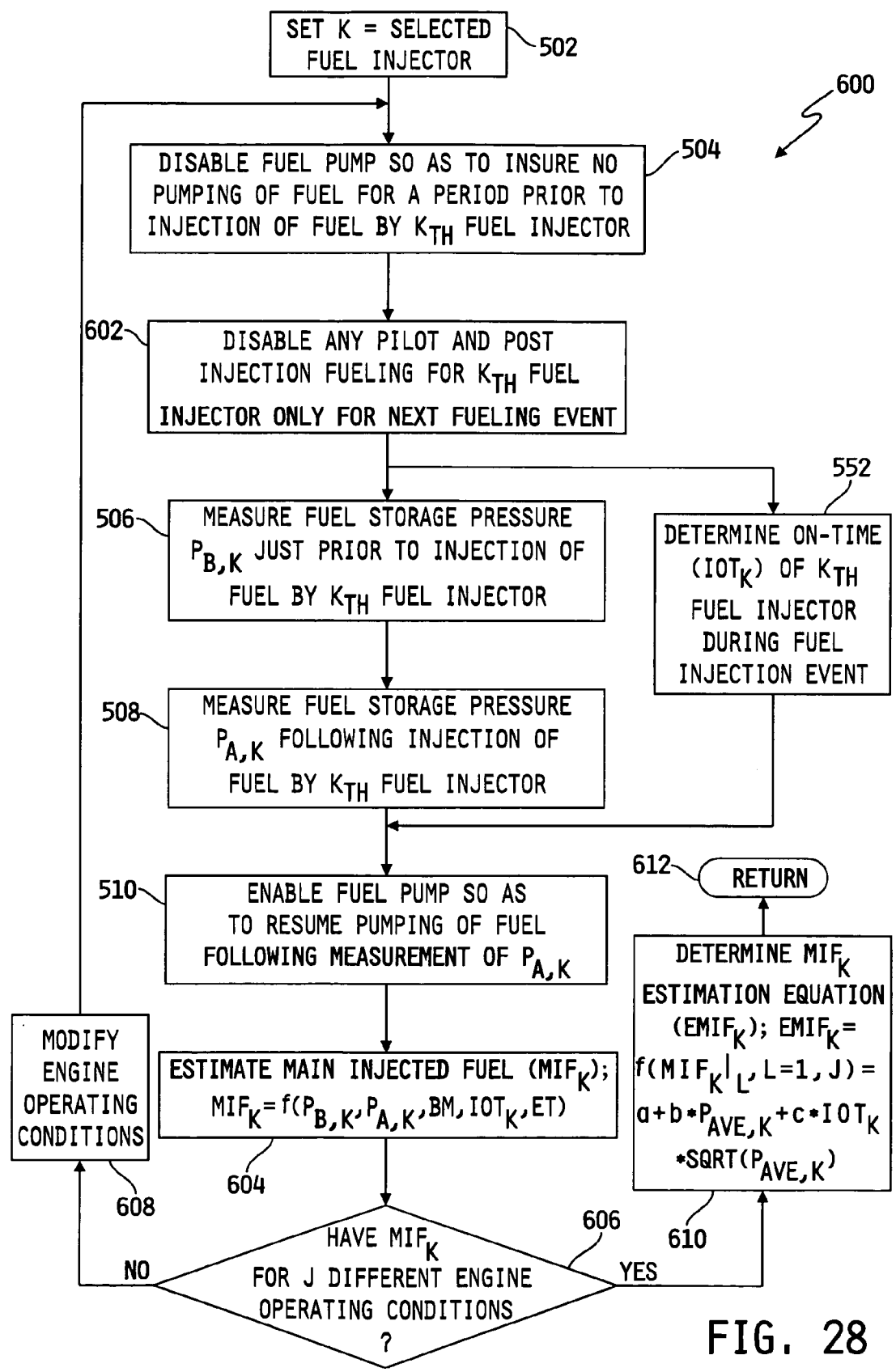
FIG. 28 is a flowchart illustrating one embodiment of a software algorithm for generating a main-injected fuel quantity estimation model.

Referring now to FIG. 28, a flowchart is shown illustrating one embodiment of a software algorithm 600 for generating a main-injected fuel quantity model for any Kth one of the "N" fuel injectors, wherein such a main-injected fuel quantity model may be used under any engine and fuel system operating conditions to estimate main-injected fuel quantities for the Kth injector. Algorithm 600 may be stored in memory 75, and is in any case executed by control circuit 68. Algorithm 600 shares many steps in common with each of algorithms 500 and 550, and such common steps are accordingly identified with common reference numbers in the illustration of algorithm 600 in FIG. 28. For example, steps 502–510 of algorithm 600 are identical to steps 502–510 of algorithms 500 and 550, and step 552 of algorithm 600 is identical to step 552 of algorithm 550, and a description of the operation of such steps will not be repeated here for brevity. In any case, algorithm 600 includes an additional step 602 between steps 504 and 506 wherein control circuit 68 is operable to disable any pilot- and post-injection fueling for the Kth injector only for the next fueling event. Control circuit 68 is operable to execute step 602 by modifying the injector on-time signal, IOT, to include only the main-injection on-time portion thereof and to omit from IOT any pilot-injection on-time as well as any post-injection on-time. This insures that subsequent fuel injection by the Kth fuel injector will include only a main-injection quantity without any pilot-injected fuel quantity or post-injected fuel quantity to thereby appropriately allow for estimation only of the main-injected fuel quantity injected by the Kth fuel injector. It is desirable, although not required, at step 602 to additionally increase the main-injection on-time portion of the injector on-time signal, $IOT_K$, so that the total quantity of injected fuel after disabling any pilot-injection or post-injection on-time is equal to what the total quantity of injected fuel would have been had the pilot-injection and/or post-injection on-times not been disabled. In embodiments wherein the main-injection fuel quantity model is continually or periodically updated during normal operation of the engine 66, increasing the main-injection on-time of the injector on-time signal, $IOT_K$, as just described will effectively maintain engine fueling levels near their requested fueling levels so that the engine operator generally will not notice any decrease in engine output power resulting from disablement of the pilot-injection or post-injection on-times.

Step 510 of algorithm 600 advances to step 604 where control circuit 68 is operable to estimate a main-injected fuel quantity value, $MIF_K$, corresponding to the total quantity of fuel injected by the Kth fuel injector between steps 506 and 508 of algorithm 570. In one embodiment, step 604 may accordingly be identical to step 554 of algorithm 550 (FIG. 27) since the main-injected fuel quantity, $MIF_K$ in this case corresponds to the total amount of fuel injected by the Kth fuel injector while the fuel pump 54 is disabled as described hereinabove with respect to FIG. 25, and while any pilot-injection and/or post-injection on-times of the injector on-time signal, $IOT_K$, are likewise disabled. Control circuit 68 is thus operable at step 604 in this embodiment to estimate $MIF_K$ as a function of $P_{B, K}$, $P_{A, K}$, the bulk modulus value, BM, the injector on-time, $IOT_K$, and the engine temperature value, ET, using the techniques described hereinabove with respect to FIGS. 1–19 as they relate to determination of the injected fuel estimate, IFE, produced by the fuel injection quantity estimation logic block first illustrated in FIG. 4. For example, control circuit 68 is operable in this embodiment to estimate a total discharged fuel estimate, $TDFE_K$, as a function of $P_{B, K}$, $P_{A, K}$ and the bulk modulus value, BM, or alternatively only as a function only of $P_{B, K}$ and $P_{A, K}$, to estimate a control flow leakage value, $CFLE_K$, as a function of $P_{B, K}$, $P_{A, K}$ and $IOT_K$, to optionally estimate a parasitic flow leakage value, $PFLE_K$, as a function of $P_{B, K}$, $P_{A, K}$ and the engine temperature value, ET, wherein ET may be the fuel temperature, FT, or the engine coolant temperature, CT, and to compute $MIF_K$ according to the equation $MIF_K = TDFE_K - CFLE_K$ or optionally according to the equation $MIF_K = TDFE_K - CFLE_K - PFLE_K$, all as described hereinabove with respect to FIGS. 5–19. Alternatively, control circuit 68 may be operable at step 604 to estimate $MIF_K$ in accordance with any known technique for estimating the total fuel injected by the Kth fuel injector while the fuel pump 54 is disabled as described hereinabove with respect to FIG. 25 and while any pilot-injection and/or post-injection on-times of the injector on-time signal, $IOT_K$ are also disabled.

Following step 604, algorithm execution advances to step 606 where control circuit 68 is operable to determine whether $MIF_K$ values have been determined for "J" different engine operating conditions, wherein "J" may be any integer. It is desirable for the "J" different engine operating conditions to cover wide ranges of fuel pressures within the fuel collection unit and injected fuel quantities. In one embodiment, J=20, although other values of "J" may be used. In any case, if control circuit 68 determines at step 606 that $MIF_K$ values have not been determined for "J" different engine operating conditions, algorithm execution advances to step 608 where control circuit 68 is operable either to modify engine operating conditions, or to delay further execution of algorithm 600 until engine operating conditions have been sufficiently modified as a result of changes in the engine or vehicle operating environment and/or changes in driver behavior. In either case, algorithm execution loops from step 608 back to step 504.

If, on the other hand, control circuit 68 determines at step 606 that $MIF_K$ values have been determined for "J" different engine operating conditions, algorithm execution advances to step 610 where control circuit 68 is operable to determine the $MIF_K$ estimation equation or model, $EMIF_K$, as a function of the "J" different $MIF_K$ values. In one embodiment, control circuit 68 is operable to execute step 610 by computing coefficients "a", "b" and "c" of an $EMIF_K$ model of the form $EMIF_K = a + b*P_{AVE,K} + c*IOT_K*SQRT(P_{AVE,K})$ applying a known regression technique; e.g., least squares, to the "J" different $MIF_K$ values, wherein $P_{AVE,K} = [(P_{B,K} + P_{A,K})/2]$ and represents an average pressure in the fuel collection unit during fuel injection by the Kth fuel injector. Alternatively, control circuit 68 may be operable at step 610 to generate the $EMIF_K$ model, as a function of $P_{B,K}$, $P_{A,K}$ and $IOT_K$ using other known curve fitting techniques. In any case algorithm execution advances from step 610 to step 612 where algorithm execution returns to its calling routine, or alternatively to step 502 for continual execution of algorithm 600.

Algorithm 600 may be configured to continually run in the background, independently of any other algorithm described herein to thereby continually update the main-injected fuel quantity model, $EMIF_K$, for the Kth fuel injector. Under experimental operating conditions, it was determined that control circuit 68 was operable to update the main-injected fuel quantity model, $EMIF_K$, approximately once every two hours under typical engine operating conditions. It will be understood, however, that control computer 68 may be operable to update the main-injected fuel quantity model, $EMIF_K$, more or less quickly, and that the actual time between model updates will depend largely upon how quickly or slowly engine operating conditions are changed sufficiently so that "J" different $MIF_K$ values may be obtained. Alternatively, algorithm 600 may be configured to run periodically in the background, independently of any other algorithm described herein, to thereby periodically update the main-injected fuel quantity model, $EMIF_K$, for the Kth fuel injector. Alternatively still, algorithm 600 may be configured to be executed only by a qualified service technician. In this embodiment algorithm 600 may be executed at the engine production facility to generate the main-injection fuel quantity model that will be used thereafter during engine operation to estimate main-injected fuel quantities. Algorithm 600 may additionally or alternatively be executed periodically or otherwise at an engine service facility to update the main-injection fuel quantity model. In any case, it will further be understood that while algorithm 600 is illustrated as generating a main-injected fuel quantity model, $EMIF_K$, for only the Kth fuel injector, control circuit 68 is operable to execute identical versions of algorithm 600 for each of the remaining "N" fuel injectors carried by engine 66 so that main-injected fuel quantity models accordingly exist for each of the "N" fuel injectors. The resulting "N" main-injected fuel quantity models may be used under any engine operating conditions to estimate main-injected fuel quantities for each of the "N" fuel injectors. It will be understood that the accuracy of any of the main-injected fuel quantity models is generally independent of, and not affected by, the structural and/or operational configuration of the one or more fuel pumps.

Figure 29A:
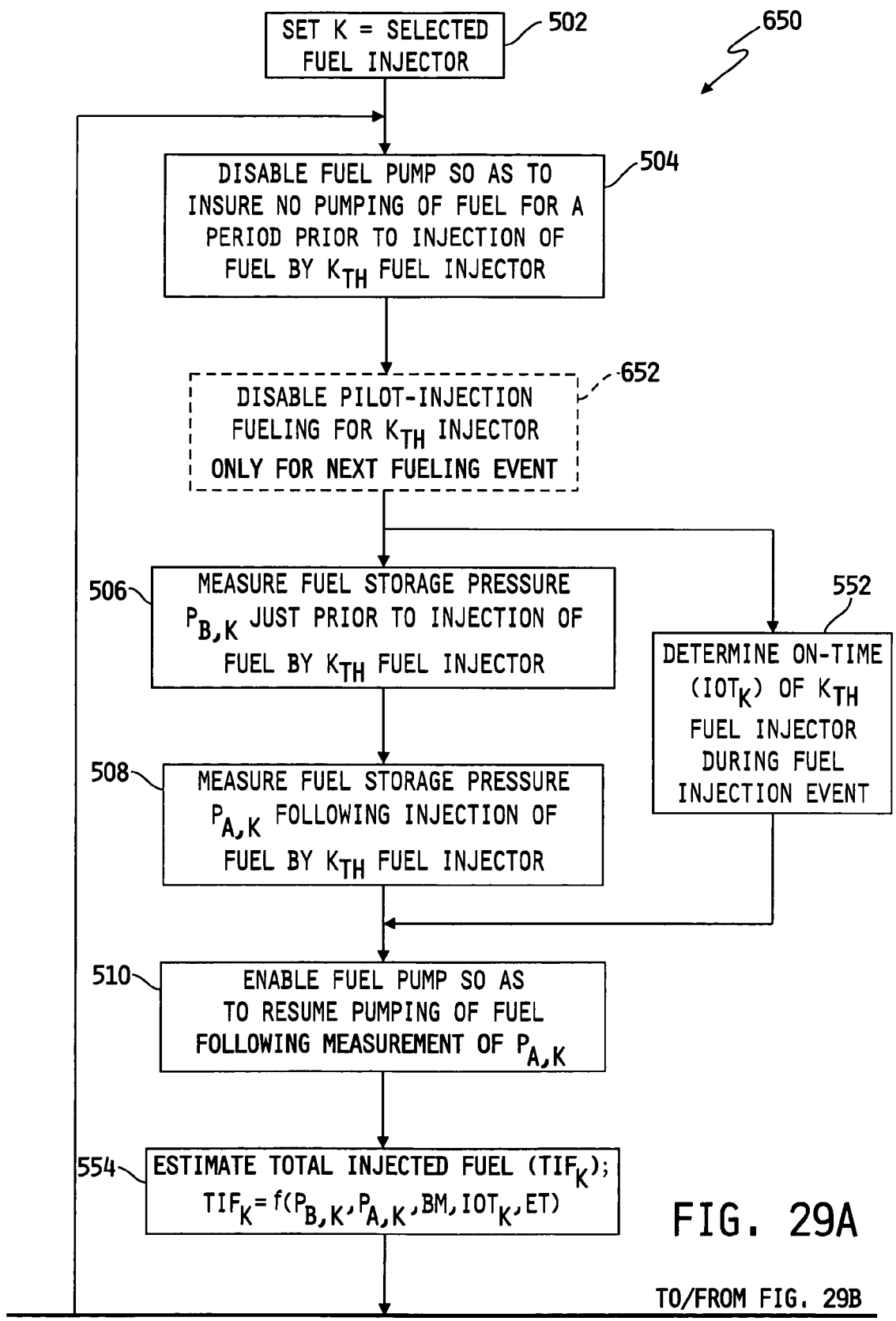
FIGS. 29A and 29B show a flowchart illustrating one embodiment of a software algorithm for generating a post-injected fuel quantity estimation model using the main-injected fuel quantity estimation model generated by the algorithm of FIG. 28.
Figure 29B:
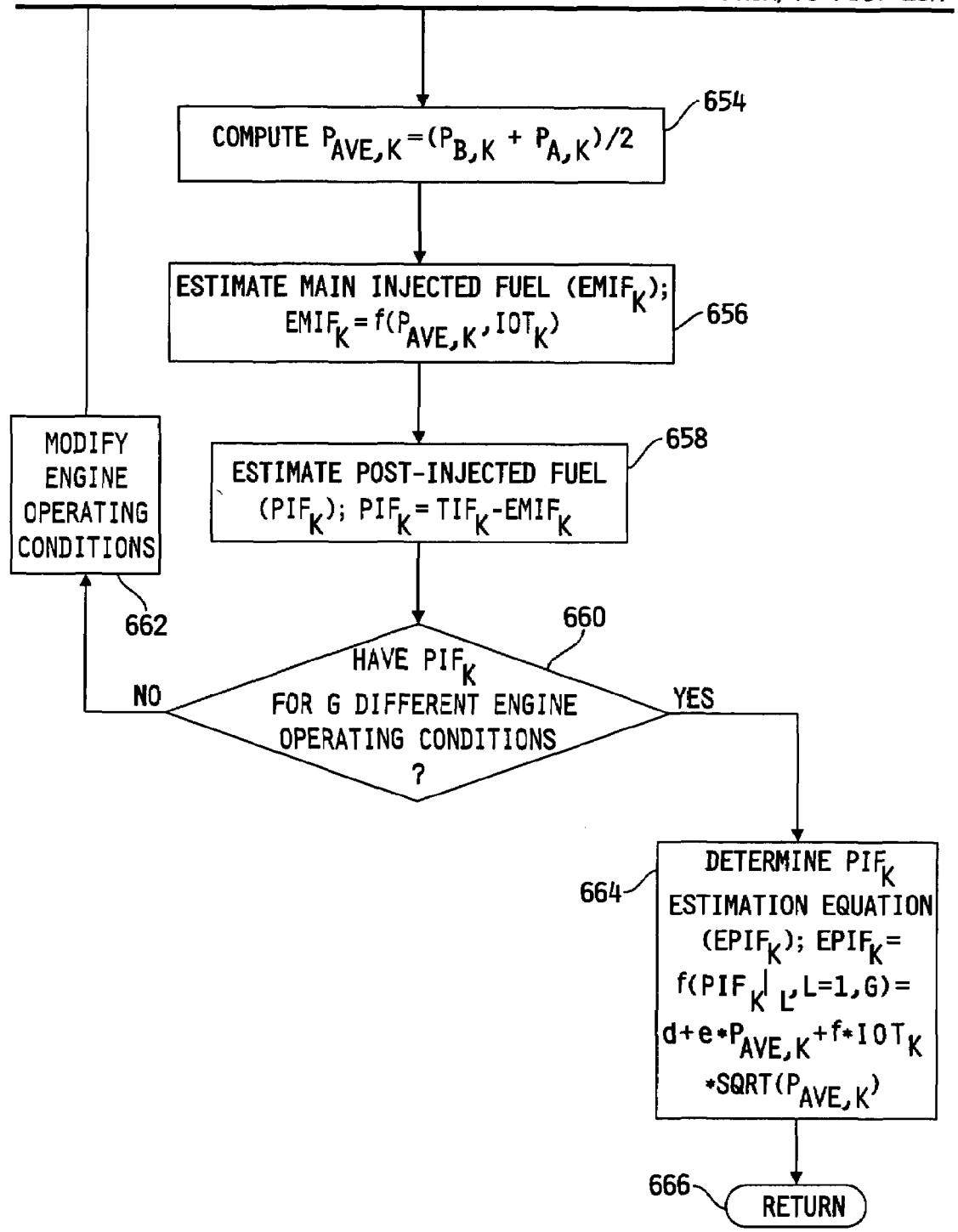

Referring now to FIGS. 29A and 29B, a flowchart is shown illustrating one embodiment of a software algorithm 650 for generating a post-injected fuel quantity model for any Kth one of the "N" fuel injectors, wherein such a post-injected fuel quantity model may be used under any engine and fuel system operating conditions to estimate post-injected fuel quantities for the Kth injector. Algorithm 650 may be stored in memory 75, and is in any case executed by control circuit 68. Algorithm 650 shares many steps in common with each of algorithms 500 and 550, and such common steps are accordingly identified with common reference numbers in the illustration of algorithm 650 in FIG. . 29. For example, steps 502–510 of algorithm 650 are identical to steps 502–510 of algorithms 500 and 550, and steps 552 and 554 of algorithm 650 are identical to steps 552 and 554 of algorithm 550, and a description of the operation of such steps will not be repeated here for brevity. In any case, algorithm 650 may include an additional step 652 between steps 504 and 506 wherein control circuit 68 is operable to disable any pilot-injection fueling for the Kth injector only for the next fueling event in embodiments where the injector on-time signal, $IOT_K$, includes pilot-injection, main-injection and post-injection on-times. Control circuit 68 is operable to execute step 652 by modifying the injector on-time signal, IOT, to include only the main-injection and post-injection on-times thereof, and to omit from IOT any pilot-injection on-time. This insures that subsequent fuel injection by the Kth fuel injector will include only the main-injection and post-injection fuel quantities without any pilot-injected fuel quantity to thereby appropriately allow for estimation of a total injected fuel at step 554 of algorithm 650 that includes only the main-injected fuel quantity and the post-injected fuel quantity injected by the Kth fuel injector. It is desirable, although not required, at step 652 to additionally increase the main-injection on-time portion of the injector on-time signal, $IOT_K$, so that the total quantity of injected fuel after disabling the pilot-injection on-time is equal to what the total quantity of injected fuel would have been had the pilot-injection on-time not been disabled. In embodiments wherein the post-injection fuel quantity model is continually or periodically updated during normal operation of the engine 66, increasing the main-injection on-time of the injector on-time signal, $IOT_K$, as just described will effectively maintain engine fueling levels near their requested fueling levels so that the engine operator generally will not notice any decrease in engine output power resulting from disablement of the pilot-injection on-time. In embodiments where the injector on-time signal, $IOT_K$, includes only main-injection and post-injection on-times, step 652 may be omitted.

Step 554 of algorithm 650 advances to step 654 where control circuit 68 is operable to compute an average pressure, $P_{AVE,K}$, in the fuel collection unit during fuel injection by the Kth injector; e.g., between steps 506 and 508 of algorithm 650, according to the equation $P_{AVE,K} = [(P_{B,K} + P_{A,K})/2]$. Thereafter at step 656, control circuit 68 is operable to estimate the main-injected fuel quantity portion of the total injected fuel quantity, $TIF_K$, determined at step 554 using the main-injected fuel quantity model generated by algorithm 600 of FIG. 28. Control circuit 68 is thus operable at step 656 to estimate the main-injected fuel quantity, $EMIF_K$, as a function of $P_{AVE,K}$ and $IOT_K$ according to the equation $EMIF_K = a + b*P_{AVE,K} + c*IOT_K*SQRT(P_{AVE,K})$. Thereafter at step 658, control circuit 68 is operable to estimate the post-injected fuel quantity value, $PIF_K$, as the difference between the total injected fuel quantity, $TIF_K$, estimated at step 554 and the main-injected fuel quantity, $EMIF_K$, estimated at step 656, according to the equation $PIF_K = TIF_K - EMIF_K$.

Following step 658, algorithm execution advances to step 660 where control circuit 68 is operable to determine whether $PIF_K$ values have been determined for "G" different engine operating conditions, wherein "G" may be any integer. It is desirable for the "G" different engine operating conditions to cover a wide range of fuel pressures within the fuel collection unit, and in one embodiment, G=10, although other values of "G" may be used. In any case, if control circuit 68 determines at step 660 that $PIF_K$ values have not been determined for "G" different engine operating conditions, algorithm execution advances to step 662 where control circuit 68 is operable either to modify engine operating conditions, or to delay further execution of algorithm 650 until engine operating conditions have been sufficiently modified as a result of changes in the engine or vehicle operating environment and/or changes in driver behavior. In either case, algorithm execution loops from step 662 back to step 504.

If, on the other hand, control circuit 68 determines at step 660 that $PIF_K$ values have been determined for "G" different engine operating conditions, algorithm execution advances to step 664 where control circuit 68 is operable to determine the $PIF_K$ estimation equation or model, $EPIF_K$, as a function of the "G" different $PIF_K$ values. In one embodiment, control circuit 68 is operable to execute step 664 by computing coefficients "d", "e" and "f" of an $EPIF_K$ model of the form $EPIF_K = d + e*P_{AVE,K} + f*IOT_K*SQRT(P_{AVE,K})$ applying a known regression technique; e.g., least squares, to the "G" different $PIF_K$ values, wherein $P_{AVE,K} = [(P_{B,K} + P_{A,K})/2]$ and represents an average, pressure in the fuel collection unit during fuel injection by the Kth fuel injector. Alternatively, control circuit 68 may be operable at step 664 to generate the $EPIF_K$ model, as a function of $P_{B,K}$, $P_{A,K}$ and $IOT_K$ using other known curve fitting techniques. In any case algorithm execution advances from step 664 to step 666 where algorithm execution returns to its calling routine, or alternatively to step 502 for continual execution of algorithm 650.

Algorithm 650 may be configured to continually run in the background, independently of any other algorithm described herein to thereby continually update the post-injected fuel quantity model, $EPIF_K$, for the Kth fuel injector. Under experimental operating conditions, it was determined that control circuit 68 was operable to update the post-injected fuel quantity model, $EPIF_K$, approximately once every hour under typical engine operating conditions. It will be understood, however, that control computer 68 may be operable to update the post-injected fuel quantity model, $EPIF_K$, more or less quickly, and that the actual time between model updates will depend largely upon how quickly or slowly engine operating conditions are changed sufficiently so that "G" different $PIF_K$ values may be obtained. Alternatively, algorithm 650 may be configured to run periodically in the background, independently of any other algorithm described herein, to thereby periodically update the post-injected fuel quantity model, $EPIF_K$, for the Kth fuel injector. Alternatively still, algorithm 650 may be configured to be executed only by a qualified service technician. In this embodiment algorithm 650 may be executed at the engine production facility to generate the post-injection fuel quantity model that will be used thereafter during engine operation to estimate post-injected fuel quantities. Algorithm 650 may additionally or alternatively be executed periodically or otherwise at an engine service facility to update the post-injection fuel quantity model. In any case, it will further be understood that while algorithm 650 is illustrated as generating a post-injected fuel quantity model, $EPIF_K$, for only the Kth fuel injector, control circuit 68 is operable to execute identical versions of algorithm 650 for each of the remaining "N" fuel injectors carried by engine 66 so that post-injected fuel quantity models accordingly exist for each of the "N" fuel injectors. The resulting "N" post-injected fuel quantity models may be used under any engine operating conditions to estimate post-injected fuel quantities for each of the "N" fuel injectors. It will be understood that the accuracy of any of the post-injected fuel quantity models is generally independent of, and not affected by, the structural and/or operational configuration of the one or more fuel pumps.

Figure 30:
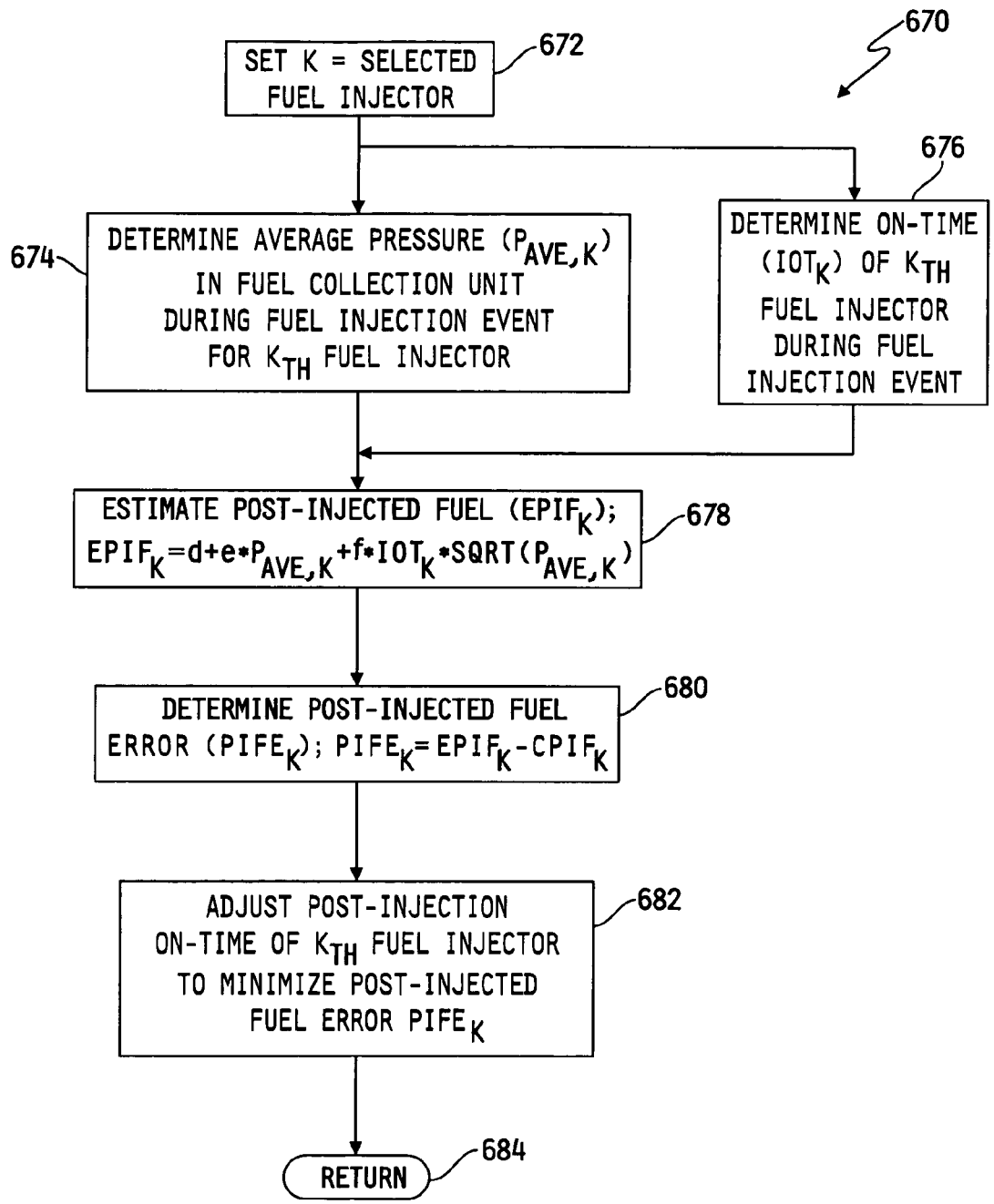
FIG. 30 is a flowchart illustrating another alternate embodiment of a software algorithm for minimizing post-injected fueling variations using the post-injected fuel quantity estimation model generated by the algorithm of FIGS. 29A and 29B.

Referring now to FIG. 30, is a flowchart is shown illustrating another alternate embodiment of a software algorithm 670 for minimizing post-injected fueling variations using the post-injected fuel quantity model generated by algorithm 650 of FIGS. 29A and 29B. Algorithm 670 may be stored in memory 75, and is in any case executed by control circuit 68. Algorithm 670 begins at step 672 where control circuit 68 is operable to set "K" equal to a selected one of the number, N, of fuel injectors carried by engine 66. Thereafter at step 674, control circuit 68 is operable to determine an average pressure, $P_{AVE,K}$, in the fuel collection unit during fuel injection by the Kth fuel injector. In one embodiment, control circuit 68 is operable to execute step 674 by sampling the fuel pressure in the fuel collection unit, via any of the techniques described hereinabove, just prior to fuel injection by the Kth fuel injector to determine a before-injection fuel pressure, $FP_{B,K}$, and just after fuel injection by the Kth fuel injector to determine an after-injection fuel pressure, $FP_{A,K}$, as illustrated and described hereinabove with respect to FIG. 6, and determining $P_{AVE,K}$ as an algebraic average of the two; e.g., $P_{AVE,K} = [(FP_{B,K} + FP_{A,K})/2]$. Alternatively, control circuit 68 may be operable at step 674 to determine an average fuel pressure in the fuel collection unit during a fuel injection event by the Kth fuel injector using other known signal averaging techniques. In any case, control circuit 68 is operable at step 676 to determine the injector on-time, $IOT_K$, during fuel injection by the Kth fuel injector as described hereinabove.

Following steps 674 and 676, control circuit 68 is operable at step 678 to estimate the quantity of post-injected fuel just injected by the Kth fuel injector using the post-injected fuel quantity model generated by algorithm 650 of FIGS. 29A and 29B; e.g., $EPIF_K = d + e*P_{AVE,K} + f*IOT_K*SQRT(P_{AVE,K})$. Thereafter at step 680, control circuit 68 is operable to determine for the Kth fuel injector a post-injected fueling error, $PIFE_K$, as the estimated post-injected fuel quantity, $EPIF_K$, less a commanded post-injected fuel quantity value for the Kth fuel injector, $CPIF_K$, wherein $CPIF_K$ corresponds to a post-injection fuel quantity portion of the desired fuel injection quantity, DF, illustrated and described hereinabove with respect to FIG. 4.

Thereafter at step 682, control circuit 68 is operable to adjust the post-injection on-time of the injector on-time signal, $IOT_K$, to minimize the post-injected fuel quantity error $PIFE_K$. In one embodiment, control circuit 68 is operable to execute steps 680 and 682 according to a conventional closed-loop control strategy that generates the post-injection fuel quantity error value, $PIFE_K$, and uses this error value to adjust the post-injection on-time of the injector on-time signal, $IOT_K$, in a manner that drives the error value to zero. Alternatively, control circuit 68 may be configured to implement other known closed-loop, open-loop or other known control strategies to adjust the post-injection on-time of the injector on-time signal in a manner that minimizes the post-injection fuel quantity error value, $PIFE_K$.

From the foregoing, it should be apparent that algorithm 670 illustrated in FIG. 30 is operable to adjust the injector on-time signal, $IOT_K$, for the Kth fuel injector in a manner that minimizes the post-injection fuel quantity error, $PIFE_K$, between the estimated post-injection fuel quantity value, $EPIF_K$, and the commanded post-injection fuel quantity value, $CPIF_K$. The estimated post-injection quantity value, $EPIF_K$, is estimated according to the post-injected fuel quantity model for the Kth fuel injector, which is based, in part, on a main-injected fuel quantity estimation model. It will be understood that an identical version of algorithm 670 is executed for each of the "N" fuel injectors carried by engine 66 to thereby minimize the post-injection fuel quantity errors between the estimated post-injection fuel quantity values, EPIF, and the commanded post-injection fuel quantity values, CPIF for each of the "N" fuel injectors. This approach accounts for any variations in the main-injection on-times of the various injector on-time signals, and algorithm 670 is accordingly operable to minimize cylinder-to-cylinder post- and main-injection fueling variations within engine 66 as well as engine-to-engine post- and main-injection fueling variations.

Figure 31A:
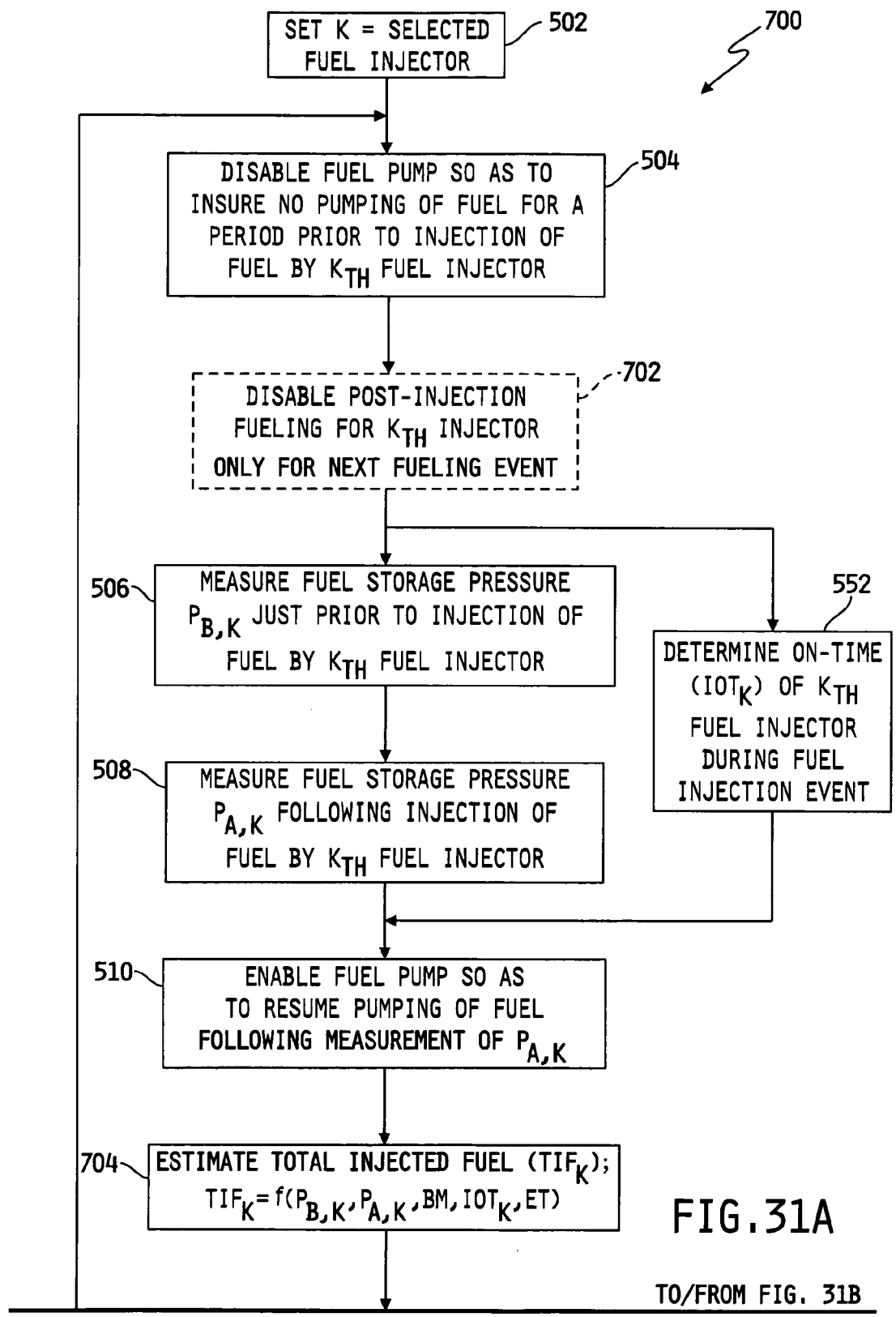
FIGS. 31A and 31B show a flowchart illustrating one embodiment of a software algorithm for generating a pilot-injected fuel quantity estimation model using the main-injected fuel quantity estimation model generated by the algorithm of FIG. 28.
Figure 31B:
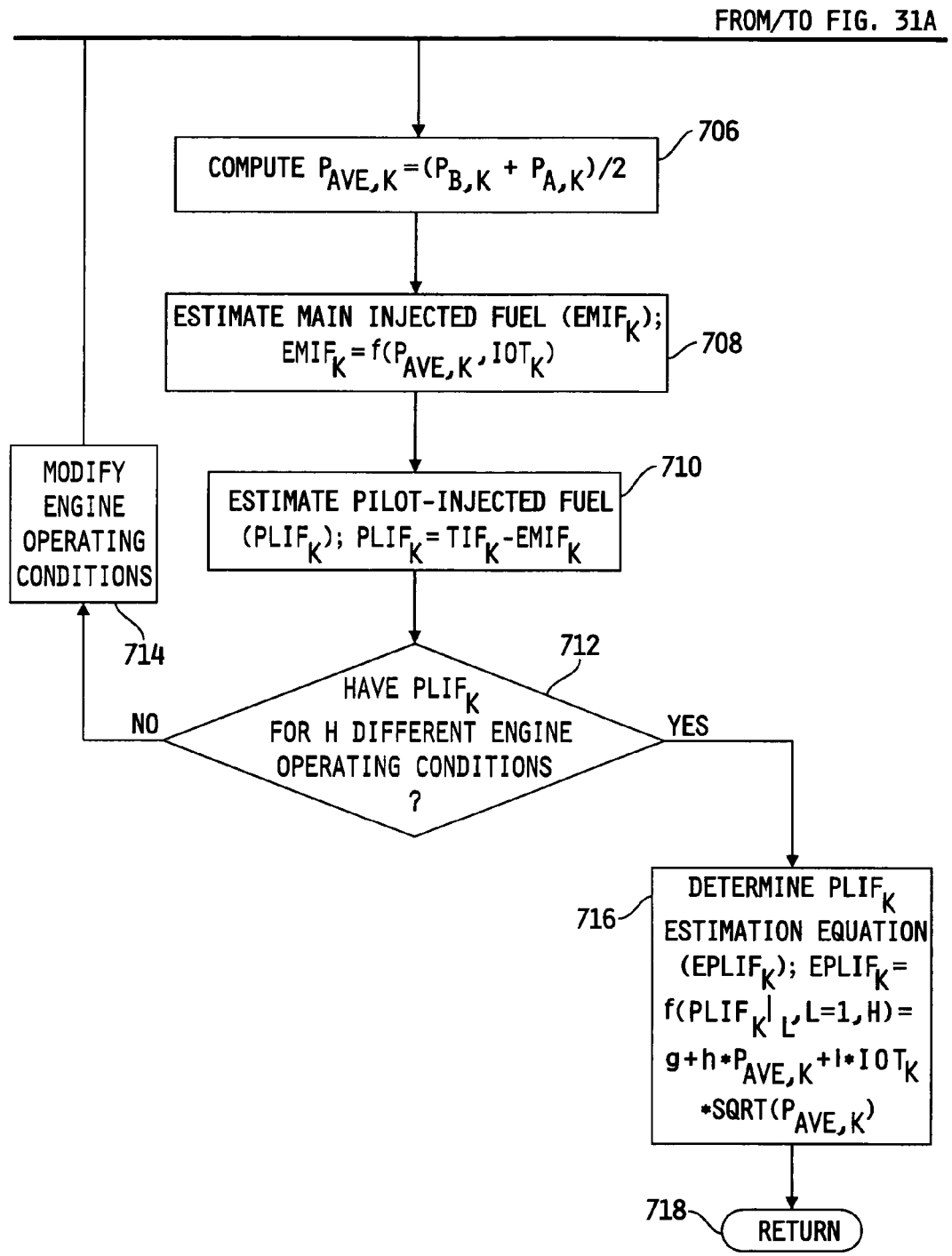

Referring now to FIGS. 31A and 31B, a flowchart is shown illustrating one embodiment of a software algorithm 700 for generating a pilot-injected fuel quantity model for any Kth one of the "N" fuel injectors, wherein such a pilot-injected fuel quantity model may be used under any engine and fuel system operating conditions to estimate pilot-injected fuel quantities for the Kth injector. Algorithm 700 may be stored in memory 75, and is in any case executed by control circuit 68. Algorithm 700 shares many steps in common with each of algorithms 500 and 550, and such common steps are accordingly identified with common reference numbers in the illustration of algorithm 700 in FIGS. 31A and 31B. For example, steps 502–510 of algorithm 700 are identical to steps 502–510 of algorithms 500 and 550, and steps 552 and 554 of s algorithm 700 are identical to steps 552 and 554 of algorithm 550, and a description of the operation of such steps will not be repeated here for brevity. In any case, algorithm 700 may include an additional step 702 between steps 504 and 506 wherein control circuit 68 is operable to disable any post-injection fueling for the Kth injector only for the next fueling event. Control circuit 68 is operable to execute step 702 by modifying the injector on-time signal, IOT, to include only the main-injection and pilot-injection on-times thereof, and to omit from IOT any post-injection on-time. This insures that subsequent fuel injection by the Kth fuel injector will include only the main-injection and pilot-injection fuel quantities without any post-injected fuel quantity to thereby appropriately allow for estimation of a total injected fuel at step 554 of algorithm 650 that includes only the main-injected fuel quantity and the pilot-injected fuel quantity injected by the Kth fuel injector. It is desirable, although not required, at step 702 to additionally increase the main-injection on-time portion of the injector on-time signal, $IOT_K$, so that the total quantity of injected fuel after disabling any post-injection on-time is equal to what the total quantity of injected fuel would have been had the post-injection on-time not been disabled. In embodiments wherein the pilot-injection fuel quantity model is continually or periodically updated during normal operation of the engine 66, increasing the main-injection on-time of the injector on-time signal, $IOT_K$, as just described will effectively maintain engine fueling levels near their requested fueling levels so that the engine operator generally will not notice any decrease in engine output power resulting from disablement of the post-injection on-time. In an alternate embodiment of algorithm 700, the post-injection fuel quantity model of algorithm 650 may be incorporated into algorithm 700, and in this embodiment step 702 may be omitted.

Step 510 of algorithm 700 advances to step 704 where control circuit 68 is operable to estimate a total injected fuel quantity value, $TIF_K$, corresponding to the sum of the pilot and main quantities of fuel injected by the Kth fuel injector between steps 506 and 508 of algorithm 700. In one embodiment, step 704 may accordingly be identical to step 554 of algorithm 550 (FIG. 27) since the total-injected fuel quantity, $TIF_K$ in this case corresponds to the total amount of fuel injected by the Kth fuel injector while the fuel pump 54 is disabled as described hereinabove with respect to FIG. 25. Control circuit 68 is thus operable at step 704 in this embodiment to estimate $TIF_K$ as a function of $P_{B,K}$, $P_{A,K}$, the bulk modulus value, BM, the injector on-time, $IOT_K$, and the engine temperature value, ET, using the techniques described hereinabove with respect to FIGS. 1–19 as they relate to determination of the injected fuel estimate, IFE, produced by the fuel injection quantity estimation logic block first illustrated in FIG. 4. For example, control circuit 68 is operable in this embodiment to estimate a total discharged fuel estimate, $TDFE_K$, as a function of $P_{B,K}$, $P_{A,K}$ and the bulk modulus value, BM, or alternatively only as a function only of $P_{B,K}$ and $P_{A,K}$, to estimate a control flow leakage value, $CFLE_K$, as a function of $P_{B,K}$, $P_{A,K}$ and $IOT_K$, to optionally estimate a parasitic flow leakage value, $PFLE_K$, as a function of $P_{B,K}$, $P_{A,K}$ and the engine temperature value, ET, wherein ET may be the fuel temperature, FT, or the engine coolant temperature, CT, and to compute $TIF_K$ according to the equation $TIF_K = TDFE_K - CFLE_K$ or optionally according to the equation $TIF_K = TDFE_K - CFLE_K - PFLE_K$, all as described hereinabove with respect to FIGS. 5–19. Alternatively, control circuit 68 may be operable at step 604 to estimate $TIF_K$ in accordance with any known technique for estimating the total fuel injected by the Kth fuel injector while the fuel pump 54 is disabled as described hereinabove with respect to FIG. 25 and while any post-injection on-times of the injector on-time signal, $IOT_K$ are also disabled.

Step 704 advances to step 706 where control circuit 68 is operable to compute an average pressure, $P_{AVE,K}$, in the fuel collection unit during fuel injection by the Kth injector; e.g., between steps 506 and 508 of algorithm 700, according to the equation $P_{AVE,K} = [(P_{B,K} + P_{A,K})/2]$. Thereafter at step 708, control circuit 68 is operable to estimate the main-injected fuel quantity portion of the total injected fuel quantity, $TIF_K$, determined at step 554 using the main-injected fuel quantity model generated by algorithm 600 of FIG. 28. Control circuit 68 is thus operable at step 700 to estimate the main-injected fuel quantity, $EMIF_K$, as a function of $P_{AVE,K}$ and $IOT_K$ according to the equation $EMIF_K = a + b*P_{AVE,K} + c*IOT_K*SQRT(P_{AVE,K})$. Thereafter at step 710, control circuit 68 is operable to estimate the pilot-injected fuel quantity value, $PLIF_K$, as the difference between the total injected fuel quantity, $TIF_K$, estimated at step 706 and the main-injected fuel quantity, $EMIF_K$, estimated at step 708, according to the equation $PLIF_K = TIF_K - EMIF_K$.

Following step 710, algorithm execution advances to step 712 where control circuit 68 is operable to determine whether $PLIF_K$ values have been determined for "H" different engine operating conditions, wherein "H" may be any integer. It is desirable for the "H" different engine operating conditions to cover a wide range of fuel pressures within the fuel collection unit, and in one embodiment, H=10, although other values of "H" may be used. In any case, if control circuit 68 determines at step 712 that $PLIF_K$ values have not been determined for "H" different engine operating conditions, algorithm execution advances to step 714 where control circuit 68 is operable either to modify engine operating conditions, or to delay further execution of algorithm 700 until engine operating conditions have been sufficiently modified as a result of changes in the engine or vehicle operating environment and/or changes in driver behavior. In either case, algorithm execution loops from step 714 back to step 504.

If, on the other hand, control circuit 68 determines at step 712 that $PLIF_K$ values have been determined for "H" different engine operating conditions, algorithm execution advances to step 716 where control circuit 68 is operable to determine the $PLIF_K$ estimation equation or model, $EPLIF_K$, as a function of the "H" different $PLIF_K$ values. In one embodiment, control circuit 68 is operable to execute step 716 by computing coefficients "g", "h" and "i" of an $EPLIF_K$ model of the form $EPLIF_K=g+h*P_{AVE,K}+i*IOT_K*SQRT(P_{AVE,K})$ applying a known regression technique; e.g., least squares, to the "H" different $PLIF_K$ values, wherein $P_{AVE,K}=[(P_{B,K}+P_{A,K})/2]$ and represents an average pressure in the fuel collection unit during fuel injection by the Kth fuel injector. Alternatively, control circuit 68 may be operable at step 716 to generate the $EPLIF_K$ model, as a function of $P_{B,K}$, $P_{A,K}$ and $IOT_K$ using other known curve fitting techniques. In any case algorithm execution advances from step 716 to step 718 where algorithm execution returns to its calling routine, or alternatively to step 502 for continual execution of algorithm 700.

It should be understood that the pilot-injected fueling model, $EPLIF_K$, generated by algorithm 700 of FIGS. 31A and 31B is based on an injector on-time signal, $IOT_K$, that includes only a main-injection on-time and a post-injection on-time. Alternatively, algorithm 700 may be modified to base the pilot-injected fueling model, $EPLIF_K$, on an injector on-time signal, $IOT_K$, that includes pilot-injection, main-injection and post-injection on-times. For example, algorithm 700 may be modified to account for inclusion of a post-injection on-time into the injector on-time signal by omitting step 702, including a step just before or just following step 708 that estimates the post-injected fuel quantity based on the post-injected fuel quantity model, $EPIF_K$, developed by algorithm 650, and modifying step 710 so that $PLIF_K=TIF_K-EMIF_K-EPIF_K$. The resulting pilot-injected fuel model, $EPLIF_K$, formed at step 716 will then be based on an injector on-time signal that includes a pilot-injection on-time, a main-injection on-time and a post-injection on-time. The foregoing modifications to algorithm 700 to generate a pilot-injected fuel quantity model for estimating pilot-injected fuel quantities based on an injector on-time signal includes pilot-injection, main-injection and post-injection on-times would be a mechanical step for a skilled artisan.

Algorithm 700 may be configured to continually run in the background, independently of any other algorithm described herein to thereby continually update the pilot-injected fuel quantity model, $EPLIF_K$, for the Kth fuel injector. Under experimental operating conditions, it was determined that control circuit 68 was operable to update the pilot-injected fuel quantity model, $EPLIF_K$, approximately once every hour under typical engine operating conditions. It will be understood, however, that control computer 68 may be operable to update the pilot-injected fuel quantity model, $EPLIF_K$, more or less quickly, and that the actual time between model updates will depend largely upon how quickly or slowly engine operating conditions are changed sufficiently so that "H" different $PLIF_K$ values may be obtained. Alternatively, algorithm 700 may be configured to run periodically in the background, independently of any other algorithm described herein, to thereby periodically update the pilot-injected fuel quantity model, $EPLIF_K$, for the Kth fuel injector. Alternatively still, algorithm 700 may be configured to be executed only by a qualified service technician. In this embodiment algorithm 700 may be executed at the engine production facility to generate the pilot-injection fuel quantity model that will be used thereafter during engine operation to estimate pilot-injected fuel quantities. Algorithm 700 may additionally or alternatively be executed periodically or otherwise at an engine service facility to update the pilot-injection fuel quantity model. In any case, it will further be understood that while algorithm 700 is illustrated as generating a pilot-injected fuel quantity model, $EPLIF_K$, for only the Kth fuel injector, control circuit 68 is operable to execute identical versions of algorithm 700 for each of the remaining "N" fuel injectors carried by engine 66 so that pilot-injected fuel quantity models accordingly exist for each of the "N" fuel injectors. The resulting "N" pilot-injected fuel quantity models may be used under any engine operating conditions to estimate pilot-injected fuel quantities for each of the "N" fuel injectors. It will be understood that the accuracy of the pilot-injected fuel quantity model is generally independent of, and not affected by, the structural and/or operational configuration of the one or more fuel pumps.

Figure 32:
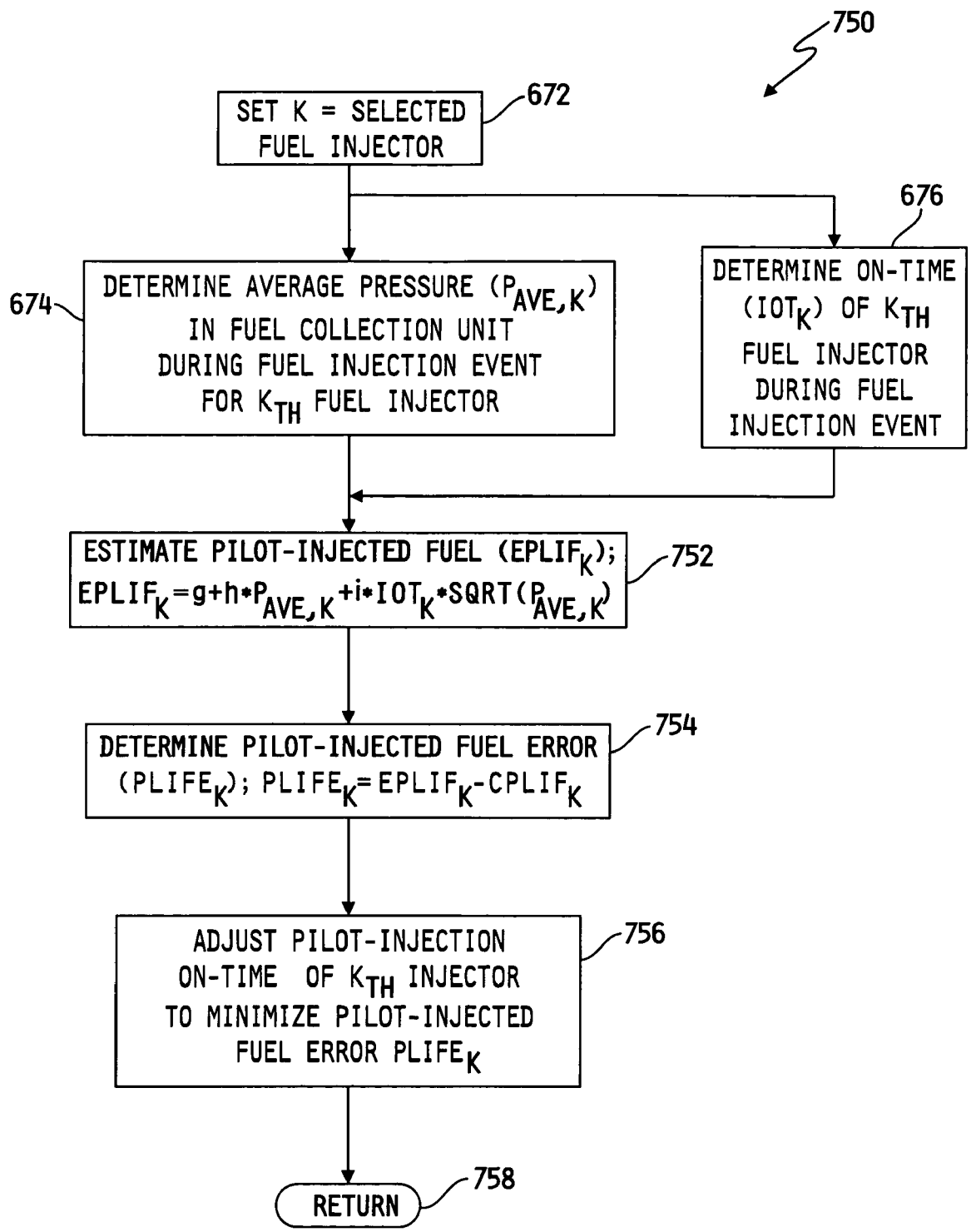
FIG. 32 is a flowchart illustrating one embodiment of a software algorithm for minimizing pilot-injected fueling variations using the pilot-injected fuel quantity estimation model generated by the algorithm of FIGS. 31A and 31B.

Referring now to FIG. 32, is a flowchart is shown illustrating one embodiment of a software algorithm 750 for minimizing pilot-injected fueling variations using the pilot-injected fuel quantity model generated by algorithm 700 of FIGS. 31A and 31B. Algorithm 750 may be stored in memory 75, and is in any case executed by control circuit 68. Algorithm 750 shares several steps in common with algorithm 670, and such common steps are accordingly identified with common reference numbers in the illustration of algorithm 750 in FIG. 32. For example, steps 672–676 of algorithm 750 are identical to steps 672–676 of algorithm 670, and a description of the operation of such steps will not be repeated here for brevity. In any case, algorithm 750 advances from steps 672 and 674 to step 752 where control circuit 68 is operable to estimate the quantity of pilot-injected fuel just injected by the Kth fuel injector using the pilot-injected fuel quantity model generated by algorithm 700 of FIGS. 31A and 31B; e.g., $EPLIF_K=g+h*P_{AVE,K}+i*IOT_K*SQRT(P_{AVE,K})$. Thereafter at step 754, control circuit 68 is operable to determine for the Kth fuel injector a pilot-injected fueling error, $PLIFE_K$, as the estimated pilot-injected fuel quantity, $EPLIF_K$, less a commanded pilot-injected fuel quantity value for the Kth fuel injector, $CPLIF_K$, wherein $CPLIF_K$ corresponds to a pilot-injection fuel quantity portion of the desired fuel injection quantity, DF, illustrated and described hereinabove with respect to FIG. 4.

Thereafter at step 756, control circuit 68 is operable to adjust the pilot-injection on-time of the injector on-time signal, $IOT_K$, to minimize the pilot-injected fuel quantity error $PLIFE_K$. In one embodiment, control circuit 68 is operable to execute steps 754 and 756 according to a conventional closed-loop control strategy that generates the pilot-injection fuel quantity error value, $PLIFE_K$, and uses this error value to adjust the pilot-injection on-time of the injector on-time signal, $IOT_K$, in a manner that drives the error value to zero. Alternatively, control circuit 68 may be configured to implement other known closed-loop, open-loop or other known control strategies to adjust the pilot-injection on-time of the injector on-time signal in a manner that minimizes the pilot-injection fuel quantity error value, $PLIFE_K$.

From the foregoing, it should be apparent that algorithm 750 illustrated in FIG. 32 is operable to adjust one or more of the injector on-time signals, IOT, in a manner that minimizes the pilot-injection fuel quantity error, $PLIFE_K$, between the estimated pilot-injection fuel quantity value, $EPLIF_K$, and the commanded pilot-injected fuel quantity value, $CPLIF_K$. In cases where the injector on-time signal, $IOT_K$, includes only pilot-injection and main-injection on-times, the estimated pilot-injection quantity value, EPLIF, is estimated according to a pilot-injected fuel quantity model based, in part, on estimation of a main-injected fuel quantity using a main-injected fuel quantity model. On the other hand, in cases where the injector on-time signal, $IOT_K$, includes pilot-injection, main-injection and post-injection on-times, the estimated pilot-injection quantity value, $EPLIF_K$, is estimated according to a pilot-injected fuel quantity model based, in part, on estimation of a main-injected fuel quantity using a main-injected fuel quantity model and on estimation of a post-injected fuel quantity using a post-injected fuel quantity model. In any case, it will be understood that an identical version of algorithm 750 is executed for each of the "N" fuel injectors carried by engine 66 to thereby minimize the pilot-injection fuel quantity errors between the estimated pilot-injection fuel quantity values, EPLIF, and the commanded pilot-injection fuel quantity values, CPLIF for each of the "N" fuel injectors. This approach accounts for any variations in the main-injection on-times, and in any pilot-injection on-times, of the various injector on-time signals, and algorithm 750 is accordingly operable to minimize cylinder-to-cylinder pilot- and main-injection fueling variations within engine 66 as well as engine-to-engine pilot- and main-injection fueling variations.

The foregoing control strategies for minimizing auxiliary-injected fuel variations may be incorporated into the overall total fuel injection quantity estimation techniques described hereinabove to allow such techniques to be applicable to fuel systems having either synchronous or asynchronous operation of the fuel pump 54, applicable to engines having any number of cylinders, and applicable under all engine operating conditions.

It should further be apparent from the foregoing description that the concepts of the present invention are applicable to variously configured fuel and fuel control systems, including those having either cyclically or non-cyclically operated fuel collection units. For example, two fuel systems particularly suited for use with the present invention are disclosed in U.S. Pat. Nos. 5,676,114 and 5,819,704, which are assigned to the assignee of the present invention, and the disclosures of which are incorporated herein by reference.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, while the main-injected fuel quantity, post-injected fuel quantity and pilot-injected fuel quantity models have been illustrated and described as each generally having the form $c1+c2*P_{AVE}+c3*IOT*SQRT(P_{AVE})$, wherein c1–c3 are con-stants, any one or more of these models may take different known forms and/or may be generated using any known data or curve fitting techniques.

Figure 33:
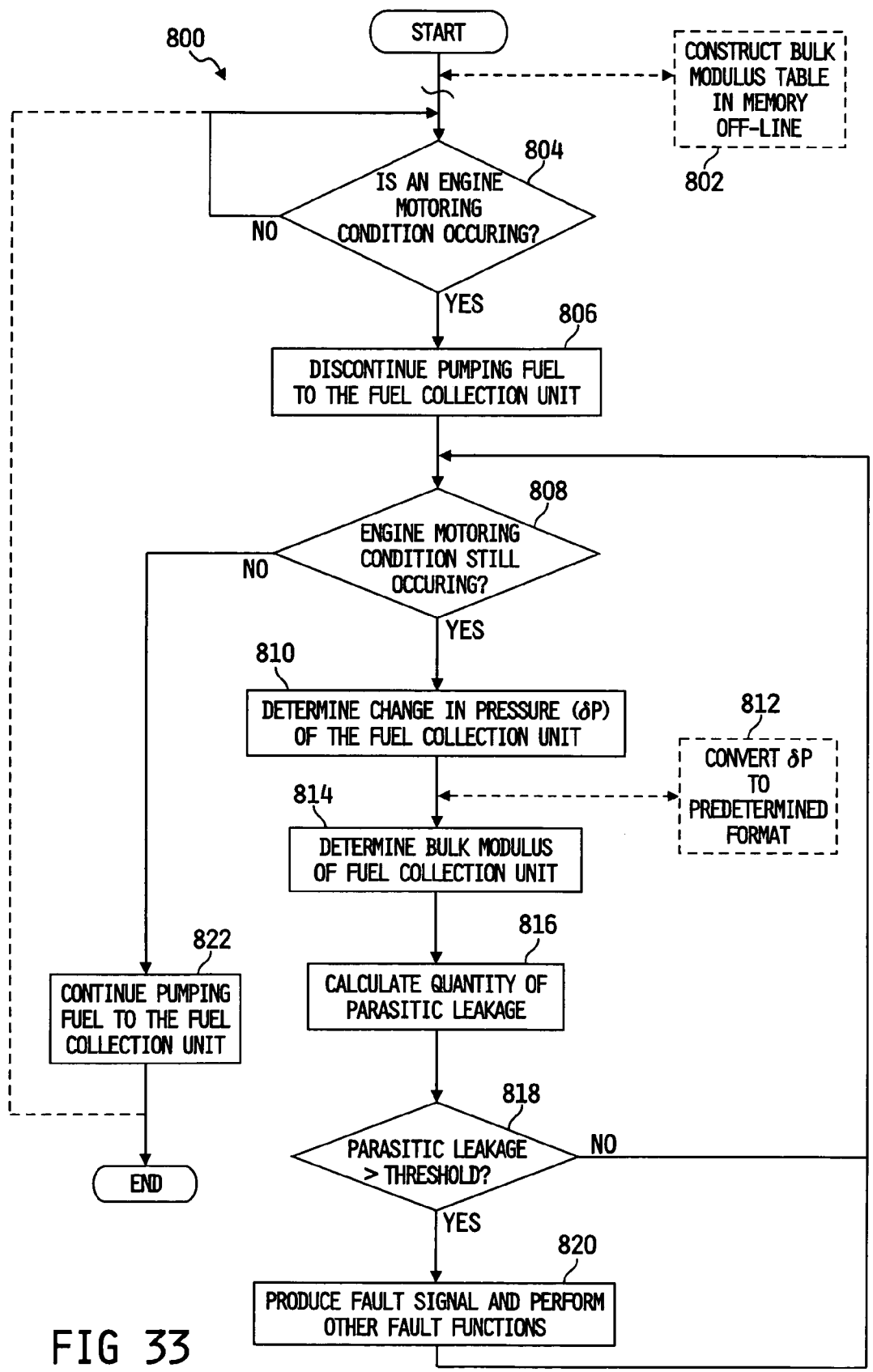
FIG. 33 is a flowchart illustrating one embodiment of a software algorithm for estimating a quantity of parasitic leakage for use with the parasitic flow leakage estimation block of FIG. 5.

In an alternative embodiment, the parasitic flow leakage estimate block 150 (see FIG. 5) is embodied as a software algorithm 800. A flowchart illustrating one embodiment of the software algorithm 800 is shown in FIG. 33. The algorithm 800 may be stored in the memory device 75 and is executed by the control circuit 68. The software algorithm 800 is operable to estimate a quantity of parasitic fuel leakage from a fuel injection system of the fuel control system 50. A typical fuel injection system includes a fuel collection unit, at least one fuel injector, and any interconnecting fuel lines or passages which fluidly couple the fuel collection unit to the fuel injector(s). For example, the fuel injection system of system 50 includes the fuel collection unit 56 or fuel rail 92, fuel injectors 60, and the supply passages 62, 64, 94.

In some embodiments of algorithm 800, a bulk modulus data table is stored in memory device 75 in process step 802. An exemplary bulk modulus data table 830 is illustrated in FIG. 34. The illustrative bulk modulus data table 830 is an m×n table having m input rows corresponding to values or value ranges of the fuel pressure, or alternatively average fuel pressure, of the fuel injection system of system 50 and n input columns corresponding to values or value ranges of the fuel temperature of fuel injection system of system 50. However, in other embodiments, the bulk modulus table 830 may be an m×n table having m rows corresponding to values or value ranges of the fuel temperature and n columns corresponding to values or value ranges of the fuel pressure. Regardless of the configuration of the bulk modulus data table 830, a bulk modulus value ($\beta_{xy}$) is stored in each output cell of the table 830. Each bulk modulus value is based on the fuel pressure and fuel temperature values or value ranges associated with the row and column of the output cell wherein the bulk modulus value is stored. Accordingly, the bulk modulus data table 830 maps values or value ranges of fuel pressure and fuel temperature to bulk modulus values. The bulk modulus value for each fuel pressure and temperature value or value range combination may be obtained from reference materials or experimentally determined for the particular fuel of interest.

In process step 804, the control circuit 68 is operable to monitor for an occurrence of an engine motoring condition. An engine motoring condition is a condition in which no fuel is supplied to the internal combustion engine 66 (i.e., a "zero-fueling" condition), and the control circuit 68 may be configured to monitor for such a "zero-fueling" condition. Alternatively, an engine motoring condition may be a condition in which the internal combustion engine 66 is not producing torque (i.e., a "zero-torque" condition), and, similarly, the control circuit 68 may be configured to monitor for such a condition. Regardless, if an engine motoring condition is detected, the control circuit 68 is operable to disable the operation of the fuel pump 54, by appropriately controlling the fuel pump actuator 53, so as to insure no pumping of fuel into the fuel collection unit. With the pump 54 shut off or otherwise restricted from pumping, the fuel collection unit is hydraulically locked during the motoring condition. Fuel is neither being supplied to or drawn from the fuel injection system of system 50. However, parasitic leakage of the fuel injection system may result in a quantity of fuel leaking or otherwise escaping from the fuel injection system (i.e., from the fuel collection unit 56 or fuel rail 92, from the fuel injectors 60, or from any supply passages 62, 64, 94). Accordingly, as used herein, the term "hydraulically locking" is defined as the condition of the volume of fuel contained within the fuel injection system including one or more of the fuel collection unit, any number of fuel injectors coupled thereto, and any interconnection fuel lines or passages when no fuel is being supplied to, or drawn from, the volume.

Following the disablement of the operation of fuel pump 54 in process step 806, the control circuit 68 is operable to determine if the engine motoring condition is still occurring in process step 808. If the control circuit 68 determines that the engine motoring condition is no longer occurring, the control circuit 68 enables the operation of the fuel pump 54 in process step 822 so as to resume the supplying of fuel to the fuel injection system described above in regard to FIGS. 1A and 1B. The algorithm 800 execution ends subsequent to step 822 or, in alternative embodiments, loops back to process step 804 wherein the control circuit 68 is operable to continue monitoring for an engine motoring condition.

If, however, in process step 808, the control circuit 68 determines that the engine motoring condition is still occurring, the control circuit 68 is operable to determine a change in pressure ($\delta P$) value of the fuel injection system in process step 810. The control circuit 68 may determine the change in pressure ($\delta P$) value by monitoring the fuel pressure within the fuel injection system; e.g., via the pressure sensor 70 (FIG. 1A), the pressure sensor 96 (FIG. 1B) or the pressure sensor 100 (FIG. 1B), over an appropriate period of time. For example, the fuel pressure signal (FP) received by the parasitic flow leakage estimate block 150 on the signal lines 72 (see FIG. 5) may be monitored over a predetermined period of time to determine the change in pressure ($\delta P$) value. In some embodiments, the control circuit 68 is operable to convert the change in pressure ($\delta P$) value to a predetermined data format in process step 812. For example, the change in pressure ($\delta P$) value may be converted to a change in pressure ($\delta P$) per crank degree value, a change in pressure ($\delta P$) per stroke value, or a change in pressure per time. The control circuit 68 may be operable to convert the change in pressure ($\delta P$) value to the exemplary predetermined formats by, for example, measuring the amount of degree displacement of a crankshaft of the engine 66 or the number of strokes of the engine 66 over the period in which the change in pressure ($\delta P$) value is determined and dividing the change in pressure ($\delta P$) value by the measured amount. The exemplary predetermined formats may be determined by using appropriate operating conditions such as the engine speed/position signal, ES/P, produced by sensor 76 on signal path 78.

Following process step 810 (or step 812 in alternative embodiments), the control circuit 68 is operable in process step 814 to determine a bulk modulus value of the fuel held within the fuel injection system. In those embodiments wherein the control circuit 68 in process step 802 is operable to construct the bulk modulus table 830 (see FIG. 34) in memory, the control circuit 68 may determine the bulk modulus value of the fuel by retrieving the bulk modulus value from the table 830 based on values of the fuel pressure and the fuel temperature. The control circuit 68 determines the appropriate row of the table 830 using the average fuel pressure determined over the period of time in which the motoring condition occurs. The appropriate column of the table 830 is determined by using the fuel temperature of the fuel within the fuel injection system. For example, if the average fuel pressure equals Fuel Pressure Value 3 and the fuel temperature equals Fuel Temperature Value 2, the bulk modulus value $\beta_{32}$ is retrieved. If the determined values of the fuel pressure and fuel temperature are not represented in the rows and columns, respectively, of the table 830, the appropriate bulk modulus value may be obtained by interpolation. Alternatively, if the fuel pressure and temperature ranges are used in table 830, average values of the bulk modulus may be retrieved based on the ranges of fuel pressure and temperature within which the determined fuel pressure and temperature values fall. The fuel pressure may be determined from the fuel pressure signal (FP) received by the parasitic flow leakage estimate block 150 on the signal lines 72. The fuel temperature may be determine from the engine temperature signal (ET) received by the parasitic flow leakage estimate block 150 on the signal lines 90. The values of the bulk modulus stored in the bulk modulus table 830 are based on the particular fuel type used in the system 50 and may be obtained from reference materials or experimentally determined as discussed above in regard to process step 802. Alternatively, the control circuit 68 may be operable in process step 814 to calculate online the bulk modulus value of the fuel held within the fuel injection system. For example, the instantaneous bulk modulus ($\beta_i$) value determined by the pre & post injection fuel pressure slope determination block 166 and produced on signal path 163 may be used in process step 814 to determine the bulk modulus value of the fuel.

Subsequent to process step 814, the control circuit 68 is operable in process step 816 to calculate a quantity of parasitic fuel leakage from the fuel injection system of system 50 based on the bulk modulus value determined in process step 814. Because the fuel injection system is hydraulically locked (as defined above), any leakage from the fuel injection system may be categorized as a parasitic fuel leakage. The control circuit calculates the quantity of parasitic fuel leakage from the fuel injection system using the following equation:

$$\text{ParasiticLeakage} = (\text{TotalVolume} * \delta P)/\beta$$

wherein ParasiticLeakage is the quantity of parasitic fuel leakage from the fuel injection system, TotalVolume is the total volume of the fuel injection system (i.e., the combined volume of the fuel collection unit 56 or fuel rail 92, the fuel injector 60, and any interconnecting fuel lines or supply passages 62, 64, 95) which may be predetermined off-line using known volume determination methods or from associated reference materials, $\delta P$ is the change in pressure value determined in process step 810, and $\beta$ is the bulk modulus value of the fuel held within the fuel injection system as determined in process step 814. The quantity of parasitic leakage calculated in the process step 814 is a quantity rate based on, for example, per time unit, per crank degree, per engine rotation, per stroke value, or similar engine conditions.

The control computer 68 compares the quantity of parasitic fuel leakage to a threshold value in process step 818. If the control computer 68 determines that the quantity of parasitic fuel leakage is less than the threshold value, the algorithm 800 execution loops back to process step 808 wherein the control computer 68 determines if the motoring condition is still occurring and, if so determined, repeats the parasitic fuel leakage quantity computation process of process steps 810–818. If, however, the quantity of parasitic fuel leakage is greater than the threshold value, the control circuit produces a fault signal in process step 820. The fault signal may be used by other sub-circuits of the control circuit 68 for fault determination processes, trigger events, and/or the like. For example, a sub-circuit of control circuit 68 may be configured to illuminate a fault light, activate an audible alarm, or otherwise alert an operator of the system 50 to the fault. Alternatively, in process step 820, the control computer 68 may be operable to monitor the quantity of parasitic fuel leakage over a period of time and produce a fault signal or perform a predetermine function based on an amount of increase in the determined parasitic fuel leakage quantity over such period of time. For example, the control computer 68 may be operable to produce a fault signal or alert a driver of a vehicle if the quantity of parasitic fuel leakage increases over time with a particular pattern. Regardless, after the control circuit 68 produces a fault signal or performs a fault associated function in process step 820, the algorithm 800 loops back to process 808 wherein the control computer 68 is operable to determine if the motoring condition is still occurring and, if so determined, to repeat the parasitic fuel leakage quantity computation process of process steps 810–818.

While the system and method for estimating a quantity of a parasitic leakage has been disclosed in the context of a fuel system, it is anticipated that the system and method are applicable to other applications to estimate quantities of parasitic leakage of a fluid from a fluid collection unit and, therefore, should not be construed as restricted to fuel collection unit applications. For example, the disclosed system and method for estimating a quantity of parasitic leakage may be used in other engine fluid applications, various motor vehicle fluid applications, and other applications in which an amount of fluid leakage from a fluid collection unit is to be determined.

What is claimed is:

1. A system for estimating parasitic fuel leakage from a fuel injection system for an internal combustion engine, the parasitic fuel leakage corresponding to a leakage of a fuel from the fuel injection system when no fuel is being supplied to, or drawn from, the fuel injection system, the fuel injection system including a fuel collection unit fluidly coupled to at least one fuel injector associated with the engine, the system comprising:
a pressure sensor producing a pressure signal indicative of fuel pressure within the fuel injection system;
means for determining an engine operating condition; and
a control circuit configured to estimate a quantity of parasitic fuel leakage as a function of the pressure signal and the engine operating condition.

2. The system of claim 1, wherein the pressure sensor is coupled to the fuel collection unit.

3. The system of claim 1, wherein the pressure sensor is coupled to the fuel injector.

4. The system of claim 1, wherein the pressure sensor is coupled a fuel line, the fuel line fluidly coupling the fuel collection unit to the at least one fuel injector.

5. The system of claim 1, wherein the control circuit is further configured to multiply the quantity of parasitic fuel leakage by an engine speed ratio, the engine speed ratio corresponding to a calibration engine speed divided by a measured engine speed of the internal combustion engine.

6. The system of claim 1, wherein the means for determining an engine operating condition includes means for determining an engine temperature.

7. The system of claim 6, further comprising a data storage medium having stored therein a data table mapping values of the pressure signal and the engine temperature to estimated parasitic fuel leakage values;
wherein the control circuit is configured to estimate the quantity of parasitic fuel leakage via the data table.

8. The system of claim 6, wherein the means for determining an engine temperature includes means for determining an engine coolant temperature.

9. The system of claim 6, wherein the means for determining an engine temperature includes means for determining a fuel temperature.

10. The system of claim 9, wherein the means for determining a fuel temperature includes a fuel temperature sensor producing a temperature signal indicative of a fuel temperature of the fuel injection system.

11. The system of claim 10, wherein the control circuit is further configured to determine a change in pressure value based on the pressure signal.

12. The system of claim 11, wherein the control circuit is further configured to determine a bulk modulus value of the fuel and estimate the quantity of parasitic fuel leakage based on the change in pressure value and the bulk modulus value.

13. The system of claim 12, further comprising a data storage medium having stored therein a bulk modulus data table mapping values of the pressure signal and the temperature signal to bulk modulus values of the fuel.

14. The system of claim 12, wherein the control circuit is configured to estimate the quantity of parasitic fuel leakage based on the following equation:

$$\text{Leakage}=(\text{Volume}**\text{Pressure})/\text{Bulk Modulus}$$

wherein Leakage is the estimated quantity of parasitic fuel leakage, Volume is a value of volume of the fuel injection system, *Pressure is the change in pressure value, and Bulk Modulus is the bulk modulus value of the fuel.

15. The system of claim 1, wherein the means for determining an engine operating condition includes means for determining an engine motoring condition.

16. The system of claim 1, wherein the means for determining an engine motoring condition includes means for determining a no fueling condition.

17. The system of claim 15, wherein the control circuit is further configured to determine a change in pressure value based on the pressure signal.

18. The system of claim 17, wherein the control circuit is further configured to determine a bulk modulus value of the fuel and estimate the quantity of parasitic fuel leakage based on the change in pressure value and the bulk modulus value.

19. The system of claim 18, further comprising a fuel temperature sensor producing a temperature signal indicative of a fuel temperature of the fuel injection system.

20. The system of claim 19, further comprising a data storage medium having stored therein a bulk modulus table mapping values of the pressure signal and the temperature signal to bulk modulus values of the fuel;
wherein the control computer is configured to determine the bulk modulus value of the fuel via the bulk modulus data table.

21. The system of claim 18, wherein the control circuit is configured to estimate the quantity of parasitic fuel leakage based on the following equation:

$$\text{Leakage}=(\text{Volume}**\text{Pressure})/\text{Bulk Modulus}$$

wherein Leakage is the estimated quantity of parasitic fuel leakage, Volume is a value of volume of the fuel injection system, *Pressure is the change in pressure value, and Bulk Modulus is the bulk modulus value of the fuel.

22. The system of claim 15, further comprising:
a fuel supply having stored therein a quantity of the fuel;
a fuel pump fluidly coupled to the fuel supply and fluidly coupled to the fuel injection system, the fuel pump configured to pump the fuel from the fuel supply to the fuel injection system in response to a trigger signal and to discontinue pumping the fuel to the fuel injection system in response to a stop signal;

wherein the control circuit is configured to produce the stop signal in response to the motoring condition.

23. The system of claim 17, wherein the control circuit is further configured to convert the change in pressure value to a predetermined data format.

24. The system of 23, wherein the predetermined data format includes a change in pressure per crank degree of the internal combustion engine data format.

25. The system of 23, wherein the predetermined data format includes a change in pressure per stroke of the internal combustion engine data format.

26. The system of claim 1, wherein the fluid collection unit includes a fuel accumulator.

27. The system of claim 1, wherein the fuel collection unit includes a fuel rail.

28. The system of claim 1, wherein the control circuit is further configured to produce a fault value if the estimated quantity of parasitic fuel leakage is greater than a threshold value.

29. The system of claim 1, wherein the control circuit is further configured to alert an operator of the internal combustion engine if the estimated quantity of parasitic fuel leakage is greater than a threshold value.

30. A method for estimating a quantity of parasitic fuel leakage from a fuel injection system for an internal combustion engine, the parasitic fuel leakage corresponding to a leakage of a fuel from the fuel injection system when no fuel is being supplied to, or drawn from, the fuel injection system, the fuel injection system including a fuel collection unit fluidly coupled to at least one fuel injector associated with the engine, the method comprising the steps of:

hydraulically locking the fuel injection system;

determining a pressure value indicative of fuel pressure within the fuel injection system when the fuel injection system is hydraulically locked;

determining an engine operating condition when the fuel injection system is hydraulically locked; and estimating the quantity of parasitic fuel leakage as a function of the engine operating condition and the pressure value.

31. The method of claim 30, wherein hydraulically locking the fuel injection system includes discontinuing supplying fuel to and drawing fuel from the fuel injection system.

32. The method of claim 30, wherein hydraulically locking the fuel injection system includes disabling the operation of a fuel pump.

33. The method of claim 30, wherein determining a pressure value includes receiving a pressure signal from a pressure sensor coupled to the fuel collection unit.

34. The method of claim 30, wherein determining a pressure value includes receiving a pressure signal from a pressure sensor coupled to the at least one fuel injector.

35. The method of claim 30, wherein determining a pressure value includes receiving a pressure signal from a pressure sensor coupled to a fuel line fluidly coupled to the fuel collection unit and the at least one fuel injector.

36. The method of claim 30, further comprising the step of multiplying the quantity of parasitic fuel leakage by an engine speed ratio corresponding to a calibration engine speed divided by a measured engine speed of the internal combustion engine.

37. The method of claim 30, wherein determining an engine operating condition includes determining an engine temperature.

38. The method of claim 37, wherein estimating the quantity of parasitic fuel leakage includes retrieving the quantity of parasitic fuel leakage from a data table stored in a data storage medium, the retrieving step being based on values of the pressure signal and the engine temperature.

39. The method of claim 37, wherein determining an engine temperature includes determining an engine coolant temperature.

40. The method of claim 37, wherein determining an engine temperature includes determining a fuel temperature.

41. The method of claim 40, wherein determining a fuel temperature includes receiving a temperature signal indicative of a fuel temperature of the fuel from a fuel temperature sensor.

42. The method of claim 41, further comprising the step of determining a change in pressure value based on the pressure value.

43. The method of claim 42, further comprising the step of determining a bulk modulus value of the fuel, wherein estimating the quantity of parasitic fuel leakage includes estimating the quantity of parasitic fuel leakage based on the change in pressure value and the bulk modulus value.

44. The method of claim 43, wherein determining a bulk modulus value of the fuel includes determining the bulk modulus value of the fuel based on the pressure value and the temperature signal.

45. The method of claim 43, wherein estimating the quantity of parasitic fuel leakage includes estimating the quantity of parasitic fuel leakage based on the following equation:

Leakage=(Volume**Pressure)/Bulk Modulus wherein Leakage is the estimated quantity of parasitic fuel leakage, Volume is a value of volume of the fuel injection system, *Pressure is the change in pressure value, and Bulk Modulus is the bulk modulus value of the fuel.

46. The method of claim 30, wherein determining an engine operating condition includes determining an engine motoring condition.

47. The method of claim 46, further comprising the step of determining a change in pressure value based on the pressure value.

48. The method of claim 47, wherein determining a change in pressure value based on the pressure value includes monitoring the pressure value over a period of time.

49. The method of claim 47, further comprising the step of determining a bulk modulus value of the fuel, wherein estimating the quantity of parasitic fuel leakage includes estimating the quantity of parasitic fuel leakage based on the change in pressure value and the bulk modulus value.

50. The method of claim 49, further comprising the step of determining a temperature value of the fuel.

51. The method of claim 50, wherein determining the bulk modulus value of the fuel includes determining the bulk modulus value of the fuel based on the pressure value and the temperature value.

52. The method of claim 50, further comprising the step of storing a bulk modulus data table having a first input corresponding to a value of fuel pressure, a second input corresponding to a value of fuel temperature, and an output corresponding to a bulk modulus value in a data storage medium.

53. The method of claim 52, wherein determining the bulk modulus of the fuel includes retrieving a bulk modulus value of the fuel from the bulk modulus data table based on the pressure value and the temperature value.

54. The method of claim 49, wherein estimating the quantity of parasitic fuel leakage includes estimating the quantity of parasitic fuel leakage based on the following equation:

Leakage=(Volume**Pressure)/Bulk Modulus wherein Leakage is the estimated quantity of parasitic fuel leakage, Volume is a value of volume of the fuel injection system, *Pressure is the change in pressure value, and Bulk Modulus is the bulk modulus value of the fuel.

55. The method of claim 30, further comprising the step of converting the change in pressure value to a predetermined data format.

56. The method of claim 55, wherein converting the change in pressure value to a predetermined data format includes converting the change in pressure value to a change in pressure per crank degree of the internal combustion engine data value.

57. The method of claim 55, wherein converting the change in pressure value to a predetermined data format includes converting the change in pressure value to a change in pressure per stroke of the internal combustion engine data format.

58. The method of claim 30, further comprising the step of comparing the quantity of parasitic fuel leakage to a threshold value.

59. The method of claim 58, further comprising the step of producing a fault value if the quantity of parasitic fuel leakage is greater than the threshold value.

60. The method of claim 58, further comprising alerting an operator of a motor vehicle if the quantity of parasitic fuel leakage is greater than the threshold value.

61. A method for estimating a quantity of parasitic fuel leakage from a fuel injection system for an internal combustion engine, the parasitic fuel leakage corresponding to a leakage of a fuel from the fuel injection system when no fuel is being supplied to, or drawn from, the fuel injection system, the fuel injection system including a fuel collection unit fluidly coupled to at least one fuel injector associated with the engine, the method comprising the steps of:

determining an engine motoring condition of the internal combustion engine;

discontinuing supplying fuel to and drawing fuel from the fuel injection system in response to the operating condition;

determining a temperature value of the fuel;

determining a pressure value of the fuel injection system;

determining a change in pressure value of the fuel injection system based on the pressure value;

determining a bulk modulus value of the fuel based on the temperature value and the pressure value; and estimating the quantity of parasitic fuel leakage based on the change in pressure value and the bulk modulus value.

* * * * *